(12) United States Patent
Shibata et al.

(10) Patent No.: US 9,171,517 B2
(45) Date of Patent: Oct. 27, 2015

(54) DISPLAY DEVICE, DRIVING DEVICE, AND DRIVING METHOD

(75) Inventors: Yoshinori Shibata, Osaka (JP); Masami Ozaki, Osaka (JP); Kohji Saitoh, Osaka (JP); Masaki Uehata, Osaka (JP); Kazuki Takahashi, Osaka (JP); Jun Nakata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 62 days.

(21) Appl. No.: 14/004,518

(22) PCT Filed: Mar. 12, 2012

(86) PCT No.: PCT/JP2012/056304
§ 371 (c)(1),
(2), (4) Date: Sep. 11, 2013

(87) PCT Pub. No.: WO2012/124660
PCT Pub. Date: Sep. 20, 2012

(65) Prior Publication Data
US 2014/0002431 A1    Jan. 2, 2014

(30) Foreign Application Priority Data
Mar. 17, 2011  (JP) .................................. 2011-059674

(51) Int. Cl.
*G06F 3/038* (2013.01)
*G09G 3/36* (2006.01)

(52) U.S. Cl.
CPC ............ *G09G 3/3685* (2013.01); *G09G 3/3614* (2013.01); *G09G 3/3648* (2013.01); *G02F 2201/52* (2013.01); *G02F 2203/30* (2013.01); *G09G 2300/0452* (2013.01); *G09G 2310/0213* (2013.01); *G09G 2310/0224* (2013.01); *G09G 2330/021* (2013.01)

(58) Field of Classification Search
USPC .................. 345/208, 87, 690, 603, 501, 660; 348/743
See application file for complete search history.

(56) References Cited

U.S. PATENT DOCUMENTS

| 6,727,907 B2 * | 4/2004 | Nonomura et al. ........... 345/603 |
| 7,898,556 B2 * | 3/2011 | Kinoshita ..................... 345/690 |
| 2002/0181003 A1 * | 12/2002 | Kakutani ..................... 358/1.13 |

(Continued)

FOREIGN PATENT DOCUMENTS

| JP | 2001-345928 A | 12/2001 |
| JP | 2006-064964 A | 3/2006 |
| JP | 2008-158811 A | 7/2008 |
| JP | 2009-42404 A | 2/2009 |
| JP | 2010-92036 A | 4/2010 |

OTHER PUBLICATIONS

Official Communication issued in International Patent Application No. PCT/JP2012/056304, mailed on Jun. 19, 2012.

*Primary Examiner* — Shaheda Abdin
(74) *Attorney, Agent, or Firm* — Keating & Bennett, LLP

(57) ABSTRACT

A liquid crystal display device (1) according to one embodiment of the present invention includes a timing controller (4) which, (i) in a first display mode, in which a number of tones that each pixel is capable of displaying is smaller than a predetermined number, controls a scanning signal and a data signal by an interlace driving method, by which a single frame includes a plurality of fields, and (ii) in a second display mode, in which the number of tones that each pixel is capable of displaying is equal to or greater than the predetermined number, controls the scanning signal and the data signal by a progressive driving method.

16 Claims, 29 Drawing Sheets

(56) References Cited

U.S. PATENT DOCUMENTS

| | | |
|---|---|---|
| 2004/0029546 A1 | 2/2004 | Tsuchi et al. |
| 2004/0100589 A1* | 5/2004 | Ben-David et al. ........... 348/743 |
| 2006/0044251 A1 | 3/2006 | Kato et al. |
| 2009/0109490 A1* | 4/2009 | Lau et al. .................... 358/3.06 |
| 2010/0065840 A1 | 3/2010 | Yamazaki et al. |

* cited by examiner

F I G. 2
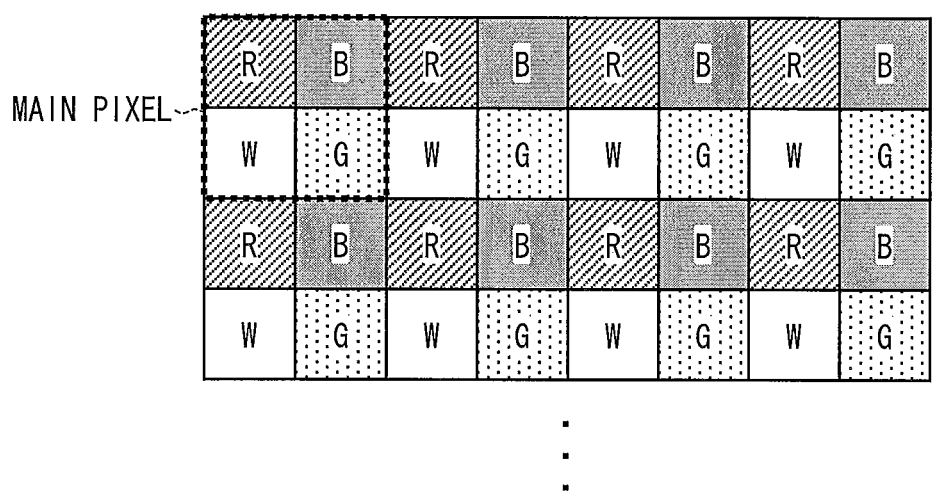
MAIN PIXEL

F I G. 1 0
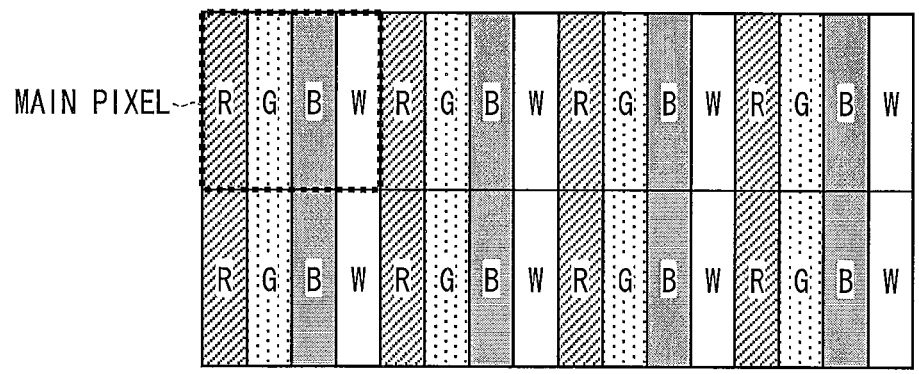

F I G. 1 5
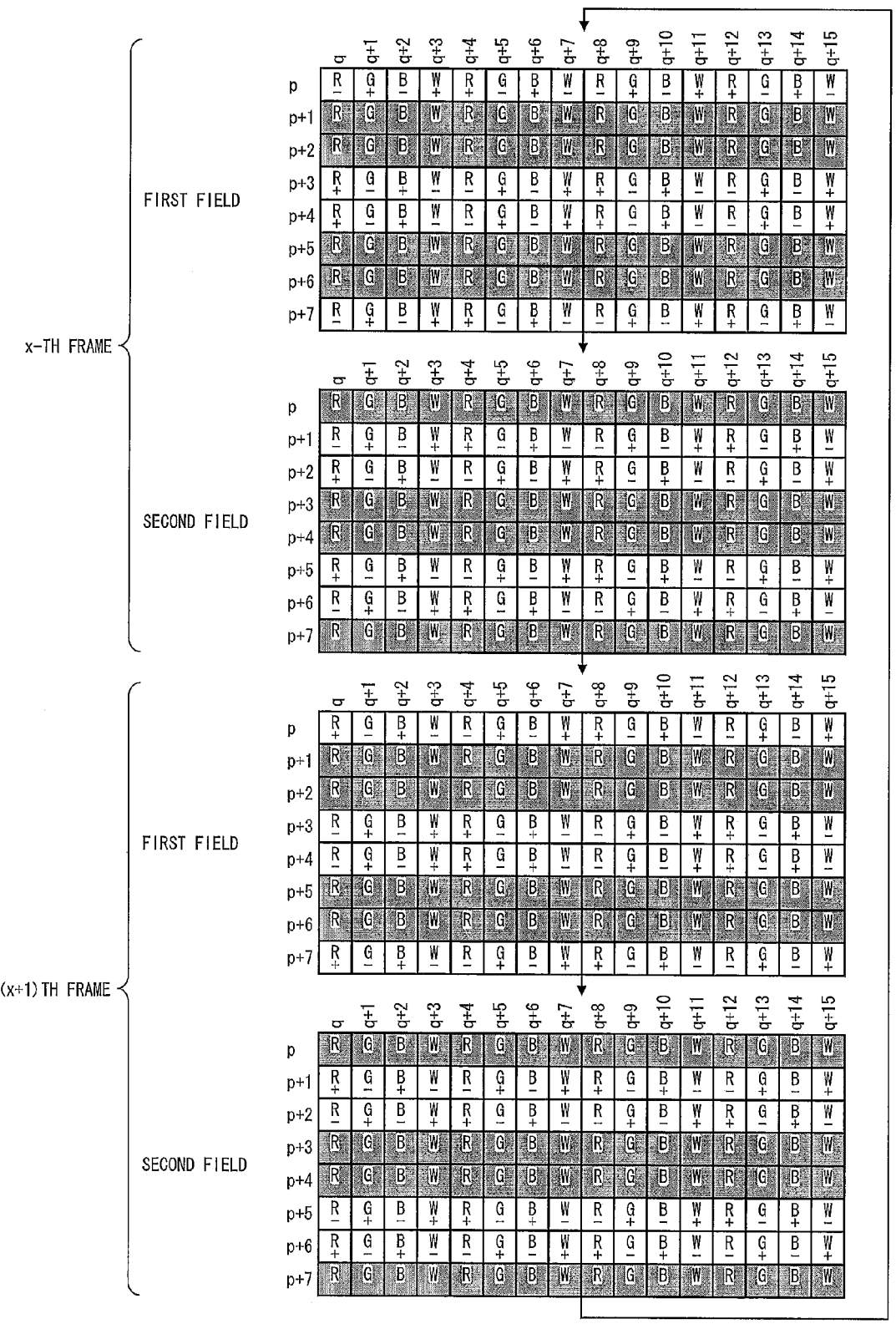

F I G. 1 6
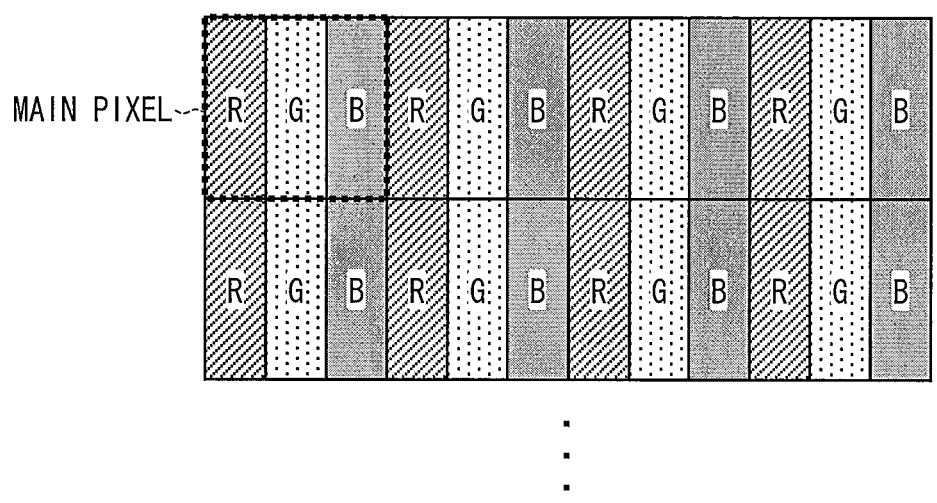

F I G. 2 9
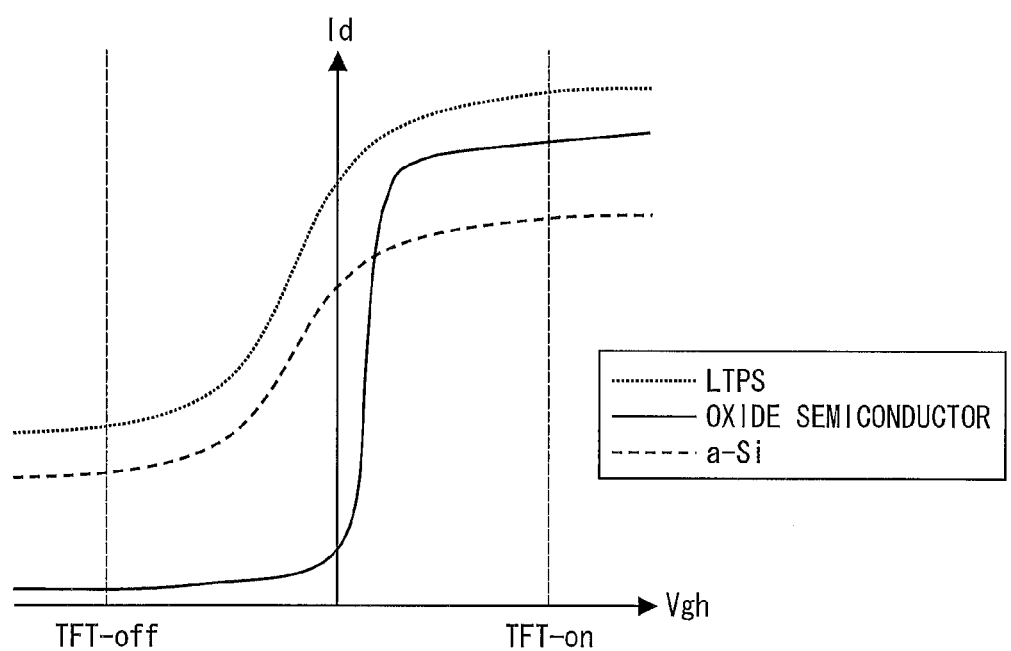

DISPLAY DEVICE, DRIVING DEVICE, AND DRIVING METHOD

TECHNICAL FIELD

The present invention relates to a display device, a driving device, and a driving method, each of which carries out interlace driving.

BACKGROUND ART

In recent years, there have been diligently developed techniques for reducing power consumption of liquid crystal display devices. Reduction of power consumption is particularly important for liquid crystal display devices provided in portable devices such as mobile phones, smartphones, and laptop personal computers.

As a technique for reducing power consumption, there is known interlace driving in which a plurality of frames form a single screen by reducing the number of scanning lines included in a display section and carrying out scanning (selecting) every other scanning line or every two or more scanning lines.

Patent Literature 1 discloses a technique in which interlace driving and non-interlace driving are switched depending on which image, a moving image or a still image, is displayed as a display image, and a single screen is formed by (j+1)th frames in total by carrying out the interlace driving in such a way that scanning are carried out every j scanning lines in order of the k-th scanning line, the (k+(j+1))th scanning line, the (k+2(j+1))th scanning line, ..., in the i-th frame, and scanning are carried out every j scanning lines in order of the k+1th scanning line, the (k+1+(j+1))th scanning line, the (k+1+2(j+1))th scanning line, ..., in the (i+1)th frame.

FIG. 28 is a timing chart of a flat display device disclosed in Patent Literature 1 which carries out scanning every other scanning line (j=1) and two frames in total form a single screen.

In the interlace driving, as illustrated in FIG. 28, first, (odd-number)th scanning lines (for example, the first line, the third line, and then the fifth line) are scanned in the i-th frame. Next, (even-number)th scanning lines (for example, the second line, the fourth line, and then the sixth line) are scanned in the (i+1)th frame. By carrying out such scanning in the i-th frame and in the (i+1)th frame, all scanning lines are scanned and a single image is formed.

As described above, by reducing the number of scanning lines and scanning the scanning lines thus reduced, the interlace driving can reduce power consumption.

CITATION LIST

Patent Literature 1
Japanese Patent Application Publication, Tokukai, No. 2006-64964 A (Publication date: Mar. 9, 2006)

SUMMARY OF INVENTION

Technical Problem

Simply using conventional interlace driving such as the technique of Patent Literature 1 for power consumption reduction, however, problematically causes display quality to decrease as a result of the interlace driving even in the case where high-quality display is required.

The present invention has been accomplished to solve the above problem. It is an object of the present invention to provide a display device that can (i) carry out display with high quality in the case where it is required to carry out high-quality display and (ii) reduce power consumption in the case where it is not necessarily required to carry out high-quality display.

Solution to Problem

In order to solve the above problem, a display device according to one embodiment of the present invention is a display device including: a display panel including: a plurality of gate lines; a plurality of data lines provided so as to intersect the plurality of gate lines; and a plurality of pixels provided so as to correspond to intersections of the plurality of gate lines and the plurality of data lines; a gate line driving circuit for supplying a gate signal to the plurality of gate lines; a data line driving circuit for supplying a data signal to the plurality of data lines; and controlling means for controlling the gate signal and the data signal, the controlling means, (i) in a first display mode, in which a number of tones that each pixel is capable of displaying is smaller than a predetermined number, controlling the gate signal and the data signal by an interlace driving method, by which a single frame includes a plurality of fields obtained by selecting every other gate line, and (ii) in a second display mode, in which the number of tones that each pixel is capable of displaying is equal to or greater than the predetermined number, controlling the gate signal and the data signal by a progressive driving method, by which the plurality of gate lines are selected sequentially.

The display device having the above arrangement switches between (i) operation in the first display mode, in which the number of tones that each pixel is capable of displaying is smaller than a predetermined number, and (ii) operation in the second display mode, in which the number of tones that each pixel is capable of displaying is equal to or greater than the predetermined number. Further, the controlling means controls the gate line driving circuit and the data line driving circuit such that the display device uses (i) an interlace driving method when the data line driving circuit operates in the first display mode and (ii) a progressive driving method when the data line driving circuit operates in the second display mode.

With the above arrangement, the controlling means allows, (i) in the second display mode (in which the number of tones that each pixel is capable of displaying is equal to or greater than the predetermined number), that is, in the case where high-quality display is required, progressive driving to be carried out for high display quality, and (ii) in the first display mode (in which the number of tones that each pixel is capable of displaying is smaller than the predetermined number), that is, in the case where high-quality display is not necessarily required, interlace driving to be carried out for power consumption reduction.

As described above, the display device switches, depending on the number of tones that each pixel is capable of displaying, between an interlace driving method and a progressive driving method. This arrangement allows the display device to (i) carry out display with high quality in the case where it is required to carry out high-quality display and (ii) reduce power consumption in the case where it is not necessarily required to carry out high-quality display.

In the case where, for instance, the predetermined number is 3, the number of tones that each pixel is capable of displaying in the first display mode is 2. Thus, in this case, each pixel displays either of tone 0 and tone 1. Similarly, in the case where the predetermined number is 5, each pixel displays one of tone 0, tone 1, tone 2, and tone 3.

In order to solve the above problem, a driving device according to one embodiment of the present invention for driving a display device is a driving device for driving a display panel including a plurality of gate lines, a plurality of data lines provided so as to intersect the plurality of gate lines, and a plurality of pixels provided so as to correspond to intersections of the plurality of gate lines and the plurality of data lines, the driving device including: a gate line driving circuit for supplying a gate signal to the plurality of gate lines; a data line driving circuit for supplying a data signal to the plurality of data lines; and controlling means for controlling the gate signal and the data signal, the controlling means, (i) in a first display mode, in which a number of tones that each pixel is capable of displaying is smaller than a predetermined number, controlling the gate signal and the data signal by an interlace driving method, by which a single frame includes a plurality of fields obtained by selecting every other gate line, and (ii) in a second display mode, in which the number of tones that each pixel is capable of displaying is equal to or greater than the predetermined number, controlling the gate signal and the data signal by a progressive driving method, by which the plurality of gate lines are selected sequentially.

The display device having the above arrangement switches between (i) operation in the first display mode, in which the number of tones that each pixel is capable of displaying is smaller than a predetermined number, and (ii) operation in the second display mode, in which the number of tones that each pixel is capable of displaying is equal to or greater than the predetermined number. Further, the controlling means controls the gate line driving circuit and the data line driving circuit such that the display device uses (i) an interlace driving method when the data line driving circuit operates in the first display mode and (ii) a progressive driving method when the data line driving circuit operates in the second display mode.

With the above arrangement, the controlling means allows, (i) in the second display mode (in which the number of tones that each pixel is capable of displaying is equal to or greater than the predetermined number), that is, in the case where high-quality display is required, progressive driving to be carried out for high display quality, and (ii) in the first display mode (in which the number of tones that each pixel is capable of displaying is smaller than the predetermined number), that is, in the case where high-quality display is not necessarily required, interlace driving to be carried out for power consumption reduction.

As described above, the display device switches, depending on the number of tones that each pixel is capable of displaying, between an interlace driving method and a progressive driving method. This arrangement allows the display device to (i) carry out display with high quality in the case where it is required to carry out high-quality display and (ii) reduce power consumption in the case where it is not necessarily required to carry out high-quality display.

In the case where, for instance, the predetermined number is 3, the number of tones that each pixel is capable of displaying in the first display mode is 2. Thus, in this case, each pixel displays either of tone 0 and tone 1. Similarly, in the case where the predetermined number is 5, each pixel displays one of tone 0, tone 1, tone 2, and tone 3.

In order to solve the above problem, a driving method according to one embodiment of the present invention for driving a display device is a driving method for driving a display panel including a plurality of gate lines, a plurality of data lines provided so as to intersect the plurality of gate lines, and a plurality of pixels provided so as to correspond to intersections of the plurality of gate lines and the plurality of data lines, the driving method including the step of: carrying out, (i) in a first display mode, in which a number of tones that each pixel is capable of displaying is smaller than a predetermined number, control by an interlace driving method, by which a single frame includes a plurality of fields obtained by selecting every other gate line, and (ii) in a second display mode, in which the number of tones that each pixel is capable of displaying is equal to or greater than the predetermined number, control by a progressive driving method, by which the plurality of gate lines are selected sequentially.

The display device having the above arrangement switches between (i) operation in the first display mode, in which the number of tones that each pixel is capable of displaying is smaller than a predetermined number, and (ii) operation in the second display mode, in which the number of tones that each pixel is capable of displaying is equal to or greater than the predetermined number. Further, the display device uses (i) an interlace driving method when the data line driving circuit operates in the first display mode and (ii) a progressive driving method when the data line driving circuit operates in the second display mode.

The above arrangement allows, (i) in the second display mode (in which the number of tones that each pixel is capable of displaying is equal to or greater than the predetermined number), that is, in the case where high-quality display is required, progressive driving to be carried out for high display quality, and (ii) in the first display mode (in which the number of tones that each pixel is capable of displaying is smaller than the predetermined number), that is, in the case where high-quality display is not necessarily required, interlace driving to be carried out for power consumption reduction.

As described above, the display device switches, depending on the number of tones that each pixel is capable of displaying, between an interlace driving method and a progressive driving method. This arrangement allows the display device to (i) carry out display with high quality in the case where it is required to carry out high-quality display and (ii) reduce power consumption in the case where it is not necessarily required to carry out high-quality display.

In the case where, for instance, the predetermined number is 3, the number of tones that each pixel is capable of displaying in the first display mode is 2. Thus, in this case, each pixel displays either of tone 0 and tone 1. Similarly, in the case where the predetermined number is 5, each pixel displays one of tone 0, tone 1, tone 2, and tone 3.

Advantageous Effects of Invention

In order to solve the above problem, a display device according to one embodiment of the present invention is a display device including: a display panel including: a plurality of gate lines; a plurality of data lines provided so as to intersect the plurality of gate lines; and a plurality of pixels provided so as to correspond to intersections of the plurality of gate lines and the plurality of data lines; a gate line driving circuit for supplying a gate signal to the plurality of gate lines; a data line driving circuit for supplying a data signal to the plurality of data lines; and controlling means for controlling the gate signal and the data signal, the controlling means, (i) in a first display mode, in which a number of tones that each pixel is capable of displaying is smaller than a predetermined number, controlling the gate signal and the data signal by an interlace driving method, by which a single frame includes a plurality of fields obtained by selecting every other gate line, and (ii) in a second display mode, in which the number of tones that each pixel is capable of displaying is equal to or greater than the predetermined number, controlling the gate signal and the data signal by a progressive driving method, by which the plurality of gate lines are selected sequentially.

The above arrangement allows the display device to (i) carry out display with high quality in the case where it is required to carry out high-quality display and (ii) reduce power consumption in the case where it is not necessarily required to carry out high-quality display.

BRIEF DESCRIPTION OF DRAWINGS

FIG. 2 is a view of an arrangement of sub-pixels constituting main pixels included in a display panel of the liquid crystal display device illustrated in FIG. 1.

FIG. 10 is a view of an arrangement of four sub-pixels which are included in a display panel of a liquid crystal display device in accordance with another embodiment of the present invention and form a main pixel.

FIG. 15 is a transitional diagram schematically illustrating how a polarity of each sub-pixel is changed in a case where two-dot reversal driving is carried out while two-line interlace driving is carried out in a liquid crystal display device in accordance with another embodiment of the present invention.

FIG. 16 is a view of an arrangement of three sub-pixels which are included in a display panel of a liquid crystal display device in accordance with still another embodiment of the present invention and form a main pixel.

FIG. 29 is a graph illustrating respective properties of various TFTs.

DESCRIPTION OF EMBODIMENTS

Embodiment 1

The following description will discuss, with reference to FIG. 1 through FIG. 9, a display device according to one embodiment of the present invention. The arrangements described in Embodiment 1 do not, however, intend to limit the scope of the invention, provided that there is no particular description, and Embodiment 1 is merely an example explanation.

Note that, in Embodiment 1, the following description will discuss an example where a display device is a liquid crystal display device including a display panel which is a liquid crystal display (LCD). The present invention is, however, not limited to such an arrangement. The display device in accordance with the present invention may be, for example, a PDP display device including a plasma display (PD), or may be an EL display device including an electro luminescence (EL) display.

(Arrangement of Liquid Crystal Display Device)

Figure 1:
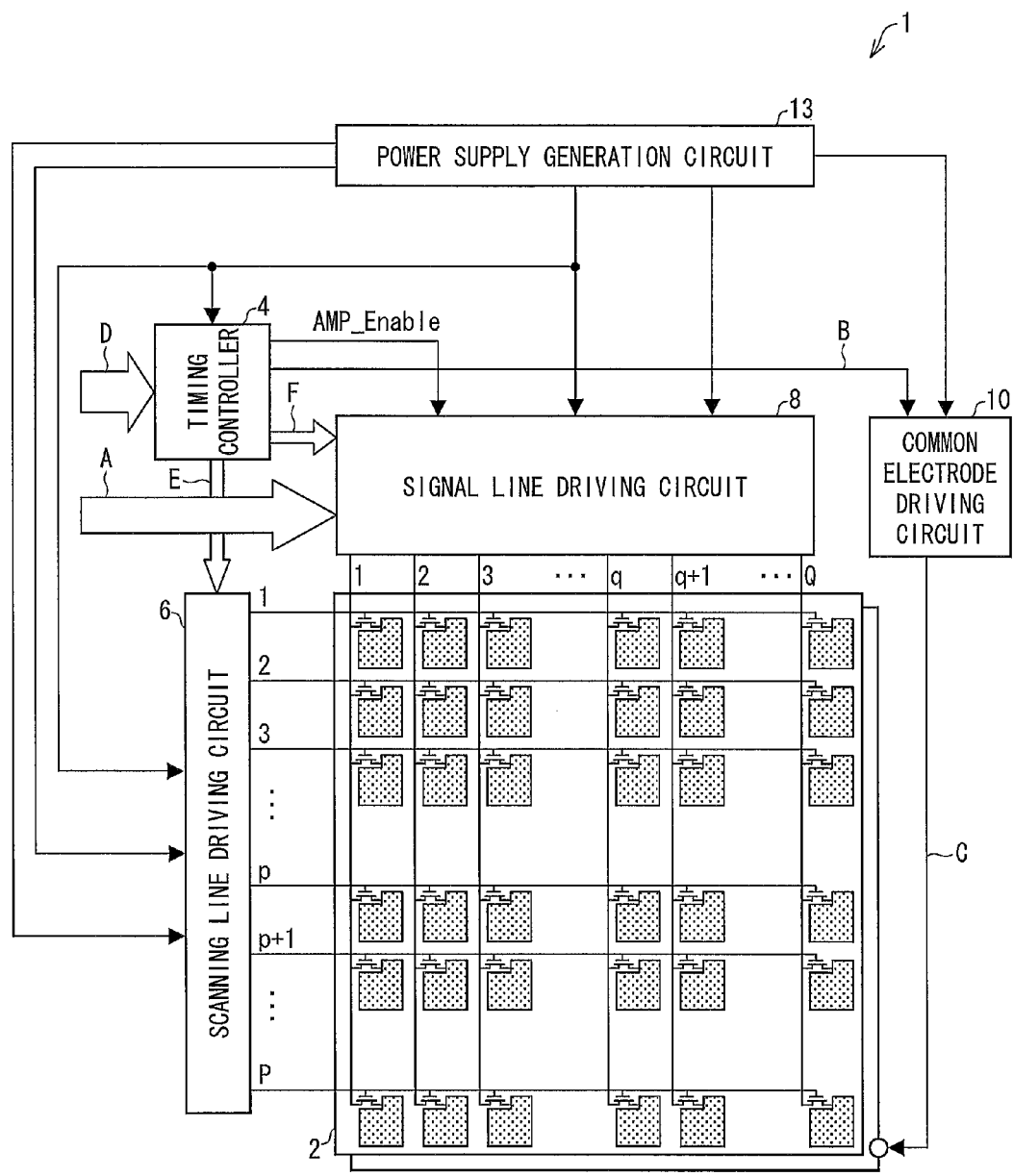
FIG. 1 is a view of a general arrangement of a liquid crystal display device in accordance with one embodiment of the present invention.

The following description will discuss, with reference to FIG. 1, an arrangement of a liquid crystal display device 1 according to Embodiment 1. FIG. 1 is a view of a general arrangement of the liquid crystal display device 1 according to Embodiment 1.

As illustrated in FIG. 1, the liquid crystal display device 1 includes a display panel (liquid crystal display panel) 2, a timing controller 4 (controlling means), a scanning line driving circuit 6 (gate line driving circuit), a signal line driving circuit 8 (data line driving circuit), a common electrode driving circuit 10, and a power supply generation circuit 13.

The display panel 2 includes: scanning lines (gate lines) of P rows in total (P is an integer of 1 or greater); data signal lines (data lines) of Q columns in total (Q is an integer of 1 or greater), which are arranged to intersect the scanning lines; and a plurality of sub-pixels which are arranged to correspond to intersections of the scanning lines and the data signal lines. Note that, as described below, a predetermined number of sub-pixels are grouped to form a main pixel (picture element).

The timing controller 4 receives a sync signal and a gate clock signal which are supplied from outside (arrow D), and outputs, to each circuit, a signal serving as a reference for operating the circuits provided in the liquid crystal display device 1 while synchronizing the circuits. Specifically, the timing controller 4 supplies a gate start pulse signal, a gate clock signal GCK, and a gate output control signal GOE to the scanning line driving circuit 6 (arrow E). Further, the timing controller 4 outputs a source start pulse signal, a source latch strobe signal, a source clock signal, and a polarity inverting signal to the signal line driving circuit 8 (arrow F).

Further, the timing controller 4 controls respective operations of the scanning line driving circuit 6 and the signal line driving circuit 8, thereby driving the liquid crystal display device 1 by use of an interlace driving method in which a single frame includes a plurality of fields.

Specifically, the timing controller 4 controls, with use of a gate output control signal GOE, a timing at which the scanning line driving circuit 6 scans (selects) a scanning line. Further, the timing controller 4 also controls, with use of a polarity inverting signal, the polarity of a data signal supplied from the signal line driving circuit 8.

The timing controller 4 controls the signal line driving circuit 8 so that a signal line driving current (data line driving current) I2 is reduced by a predetermined ratio, as compared with a signal line driving current I1. Here, the signal line driving current I2 is a current which is to be supplied to an arbitrary data line (i) after a scanning signal (gate signal) is supplied to a scanning line (selected scanning line) which has been selected for a certain field and (ii) until a scanning signal is supplied to a scanning line to be selected after the selected scanning line. The signal line driving current I1 is a current which has been supplied to the arbitrary data line when the scanning signal has been supplied to the selected scanning line. The arbitrary data line may be a part of a data line in the Q column, or may be all data lines in the Q column.

In response to a command from the timing controller 4, the signal line driving circuit 8 carries out driving to reduce the signal line driving current I2 by the predetermined ratio, as compared with the signal line driving current I1. Note that, in order to reduce the signal line driving current I2 by the predetermined ratio in comparison with the signal line driving current I1, the signal line driving circuit 8 may set a data signal line to a high-impedance state or may decrease a signal line driving current capability of an output stage amplifier (so-called voltage follower) provided in the signal line driving circuit 8.

For example, the signal line driving circuit 8 may carry out driving so that the signal line driving current I2 is approximately 30% less than the signal line driving current I2. In this case, the signal line driving current I2 is approximately 70% as large as the signal line driving current I1. Note that the description above will discuss, in Embodiment 1, an example where the signal line driving circuit 8 reduces 100% of the signal line driving current I2 so that (i) the value of the signal line driving current I2 becomes zero and (ii) the absolute value of the potential of a data signal to be applied is 0 (zero) V. In this case, the signal line driving circuit 8 stops supplying a signal line driving current, that is, stops applying a data signal.

Further, the timing controller 4 is capable of selecting either of a first display mode, in which the number of tones that each sub-pixel is capable of displaying is smaller than a predetermined number, and a second display mode, in which the number of tones that each pixel is capable of displaying is equal to or greater than the predetermined number. The timing controller 4 controls the scan line driving circuit 6 and the signal line driving circuit 8 such that the liquid crystal display device 1 carries out (i) interlace driving in the case where the timing controller 4 has selected the first display mode and (ii) progressive driving in the case where the timing controller 4 has selected the second display mode.

The above predetermined number serves as a threshold of the number of tones, the threshold being for use to switch between the first display mode and the second display mode. Assuming that, for instance, the predetermined number is 3, the liquid crystal display device 1 may carry out (i) interlace driving in the case where each sub-pixel is capable of displaying two tones (capable of displaying two levels of gradation) and (ii) progressive driving in the case where each sub-pixel is capable of displaying three or more tones (capable of displaying three or more levels of gradation).

The predetermined number is, needless to say, not limited to 3, and simply needs to be a value to serve as an indicator for use in switching between a case requiring high-quality image display and a case otherwise. A later description will deal with tones.

The scanning line driving circuit 6 starts to scan the scanning lines upon receipt of a gate start pulse signal from the timing controller 4. Then, in response to a gate clock signal GCK and a gate output control signal GOE which have been received from the timing controller 4, the scanning line driving circuit 6 sequentially applies a selected voltage to the scanning lines, specifically, starts application of the selected voltage from a scanning line in the first row of the display panel 2. The scanning line driving circuit 6 sequentially supplies, to the scanning lines, scanning signals which are voltages for turning on switching elements (TFT) provided in respective sub-pixels on the scanning lines. Thus, the scanning line driving circuit 6 sequentially selects scanning lines and scans the scanning lines thus selected. Note that, hereinafter, the expression "to supply a scanning signal which is a voltage for turning on a switching element" is also referred to as "to scan a scanning line".

Specifically, the scanning line driving circuit 6 sequentially selects scanning lines in response to the gate clock signal GCK that the scanning line driving circuit 6 has received. Then, the scanning line driving circuit 6 applies a selected voltage (i.e., scanning signal) to the scanning lines selected by supplying a scanning line driving current (gate line driving current) to the scanning lines selected at a timing when fall of the gate output control signal GOE, which has been received by the scanning line driving circuit 6, is detected. In this way, the scanning line driving circuit 6 scans the scanning lines selected. Further, the scanning line driving circuit 6 can carry out interlace driving as described below. Hereinafter, the expression "to apply a scanning signal to a scanning line by supplying a scanning line driving current to the scanning line" is simply referred to also as "to apply (or supply) a scanning signal".

In response to a source clock signal, the signal line driving circuit 8 causes a register to store inputted image data for sub-pixels on the basis of a source start pulse signal that the signal line driving circuit 8 has received from the timing controller 4. The signal line driving circuit 8 supplies a data signal, which serves as image data, to data signal lines of the display panel 2 in response to a next source latch strobe signal, and charges pixel electrodes provided in the sub-pixels including the data signal lines.

Specifically, the signal line driving circuit 8 calculates, in the display mode selected by the timing controller 4 and on the basis of an inputted image signal (arrow A), a voltage to be supplied to the sub-pixels on the scanning lines selected. Then, the signal line driving circuit 8 supplies the voltage (i.e., data signal) thus calculated to the data signal lines by supplying a signal line driving current. As a result, the image data is supplied to the sub-pixels on the scanning lines selected. Hereinafter, the expression "to apply a data signal to data signal lines by supplying a signal line driving current" is simply referred to as "to apply (or supply) a data signal".

In response to a polarity inverting signal from the timing controller 4, the signal line driving circuit 8 applies data signals, which are to be applied to selected pixels serving as sub-pixels selected for a certain field, in such a manner that polarities of the data signals are inverted every predetermined number of selected pixels in the row and column directions. Further, the signal line driving circuit 8 inverts the polarities of the data signals to be applied to the selected pixels for the certain field so that the polarity of the data signal is opposite to polarities of data signals which have been applied to the selected pixels in a previous field before the certain field where the selected pixels are selected.

The power supply generation circuit 13 generates a voltage necessary to cause the circuits in the liquid crystal display device 1 to operate. Then, the power supply generation circuit 13 supplies the voltage thus generated to the scanning line driving circuit 6, the signal line driving circuit 8, the timing controller 4, and the common electrode driving circuit 10.

The liquid crystal display device 1 includes a common electrode (not shown) provided for all of the sub-pixels provided in the display panel 2. Based on a signal supplied from the timing controller 4 (arrow B), the common electrode driving circuit 10 supplies, to the common electrode, a predetermined common voltage (arrow C) for driving the common electrode.

(Arrangement of Main Pixel)

The following description will discuss, with reference to FIG. 2, an arrangement of sub-pixels which constitute a main pixel included in the display panel 2 of the liquid crystal display device 1 according to Embodiment 1. FIG. 2 is a view of an arrangement of sub-pixels constituting main pixels included in the display panel 2 of the liquid crystal display device 1 according to Embodiment 1.

As illustrated in FIG. 2, the following four sub-pixels are grouped to constitute a main pixel (picture element): three sub-pixels which show three primary colors, respectively (a sub-pixel R displaying red, a sub-pixel B displaying blue, and a sub-pixel G displaying green); and one sub-pixel (a sub-pixel W displaying white) which displays one color obtained from a combination of at least two of the three primary colors. Those four sub-pixels are arranged so that two sub-pixels are arrayed in the column direction and the other two sub-pixels are arrayed in the row direction. As illustrated in, for example, FIG. 2, the four sub-pixels are arranged so that the sub-pixel R and the sub-pixel B are adjacent to each other in the row direction, and the sub-pixel W and the sub-pixel G are adjacent to each other also in the row direction, whereas the sub-pixel R and the sub-pixel W are adjacent to each other in the column direction, and the sub-pixel B and the sub-pixel G are adjacent to each other also in the column direction.

Note that Embodiment 1 exemplifies a case where four sub-pixels are arranged so that the sub-pixel R and the sub-pixel B are adjacent to each another in the row direction, and the sub-pixel W and the sub-pixel G are adjacent to each another also in the row direction, whereas the sub-pixel R and the sub-pixel W are adjacent to each other in the column direction, and the sub-pixel B and the sub-pixel G are adjacent to each other also in the column direction. The present invention is, however, not limited to such an arrangement. The four sub-pixels can be arranged in 4 factorial combinations, that is, 24 ways. For example, the four pixels may be arranged so that the sub-pixel R and the sub-pixel G are adjacent to each other in the row direction, and the sub-pixel W and the sub-pixel B are adjacent to each other also in the row direction, whereas the sub-pixel R and the sub-pixel W are adjacent to each other in the column direction, and the sub-pixel G and the sub-pixel B are adjacent to each other also in the column direction.

Note that Embodiment 1 exemplifies a case where four sub-pixels including three sub-pixels R, G, B and one sub-pixel W which displays white as one color obtained from a combination of at least two of the three primary colors. The present invention is, however, not limited to such an arrangement. The sub-pixel W displaying white may be replaced by, for example, (i) a sub-pixel Y displaying yellow, (ii) a sub-pixel displaying only one of the three primary colors (red, blue, and green), or as a matter of course, (iii) a sub-pixel displaying another color.

The above has discussed an example where a main pixel includes four sub-pixels as a set. The present embodiment is, however, not limited to such an arrangement, and may be arranged such that a main pixel includes three sub-pixels as a set. In this case, the three sub-pixels may display the three primary colors, respectively.

The following description will discuss tones that each sub-pixel is capable of displaying. Tones refer to the number of levels of gradation in the color that an individual sub-pixel displays. A larger number of tones allows an image to be displayed more smoothly.

In the case where (i) a main pixel includes three sub-pixels as a set and (ii) each sub-pixel is capable of displaying 256 tones, the main pixel is capable of displaying the cube of 256 colors (so-called full-color display). In the case where each sub-pixel is capable of displaying two tones, the main pixel is capable of displaying the cube of 2 colors, that is, eight colors (so-called eight-color display).

In the case where (i) a main pixel includes four sub-pixels as a set and (ii) each sub-pixel is capable of displaying 256 tones, the main pixel is capable of displaying the biquadrate of 256 colors. In the case where each sub-pixel is capable of displaying two tones, the main pixel is capable of displaying the biquadrate of 2 colors, that is, 16 colors.

The present embodiment may be arranged such that the liquid crystal display device 1 carries out (i) progressive driving in the case where it performs full-color display and (ii) interlace driving in the case where it performs eight-color display.

(Interlace Driving)

The following description will discuss an example case where in the case where each sub-pixel is capable of displaying two tones, the timing controller 4 selects the first display mode to control the scan line driving circuit 6 and the signal line driving circuit 8 such that the liquid crystal display device 1 carries out interlace driving.

In a case where the interlace driving is carried out, a single frame is divided into units called fields (scanning lines for scanning a single frame are sorted by field into a plurality of groups of scanning lines for carrying out scanning), and the fields are scanned sequentially.

For example, in a case where a single frame is divided into two fields, the scanning line driving circuit 6 reduces the number of scanning lines to which scanning signals are supplied, and carries out scanning every other scanning line in a certain field (hereinafter, referred to also as "first field"). In the next field (hereinafter, referred to also as "second field"), scanning lines which were not scanned in the first field are scanned. That is, in a case where scanning lines in odd-number rows are scanned in the first field, scanning lines in even-numbered rows are scanned in the second field.

Embodiment 1 is not limited to a case where scanning is carried out every other scanning line in the first and second fields. The scanning may alternatively be carried out every two scanning lines in each field.

In the interlace driving method according to Embodiment 1, (j+1) fields in total may constitute a single frame by carrying out the interlace driving such that (i) scanning is carried out every j scanning line(s) in order of the k-th, the (k+(j+1))th, the (k+2(j+1))th, . . . in the i-th field, and (ii) scanning is carried out every j scanning line(s) in order of (k+1)th, the (k+1+(j+1))th, the (k+1+2(j+1))th, . . . in the (i+1)th field.

(Data Signal)

The following description will discuss timings of operations of the scanning line driving circuit 6 and of the signal line driving circuit 8 by exemplifying a case where, in the first display mode, the signal line driving circuit 8, in the interlace driving in which scanning is carried out every other scanning line, causes the signal line driving current I2 to be zero and therefore a potential of a data signal to be applied by supplying the signal line driving current I2 becomes zero.

First, supply of a data signal to each data signal line is started at a substantially same time as a certain scanning line(s) is(are) selected in a first field of a certain frame. A potential of the data signal supplied to each data signal line becomes 0 V at a substantially same time as the selection of the certain scanning line(s) ends (i.e., supply of a gate signal to the certain scanning line(s) ends), the potential of the data signal maintains 0 V until a scanning line(s) to be selected after the certain scanning line is(are) selected (i.e., until supply of a gate signal to the scanning line(s) to be selected after the certain scanning line(s) is started).

Next, supply of another data signal to the each data signal line is started at a substantially same time as a scanning line(s) to be selected after the certain scanning line(s) is selected. A potential of the another data signal supplied to each data signal line becomes 0 V at a substantially same time as the selection of a scanning line(s) subsequent to the certain scanning line(s) ends.

As described above, the signal line driving circuit 8 is operated so that a potential of the data signal becomes 0 V in the first field of the certain frame after the scanning line driving circuit 6 selects the certain scanning line(s) but before the next scanning line(s) (which is(are) to be selected after the certain scanning line(s) is(are) selected) is(are) selected.

Further, the scanning line driving circuit 6 and the signal line driving circuit 8 operate similarly in the first field and in the second field of the certain frame. Furthermore, the operations of the scanning line driving circuit 6 and the signal line driving circuit 8 in the first field (or second field) of the certain frame are similar to those in a first field (or a second field) of a next frame after the certain frame.

As described above, the liquid crystal display device 1 having the above arrangement switches between operation in the first display mode and operation in the second display mode with use of the timing controller 4. The timing controller 4 controls the scan line driving circuit 6 and the signal line driving circuit 8 such that the liquid crystal display device 1 uses (i) an interlace driving method when it operates in the first display mode and (ii) a progressive driving method in the case where it operates in the second display mode.

With the above arrangement, the timing controller 4 allows, (i) in the second display mode, that is, in the case where high-quality display is required, progressive driving to be carried out for high display quality and (ii) in the first display mode, that is, in the case where high-quality display is not necessarily required, interlace driving to be carried out for power consumption reduction.

The liquid crystal display device 1, as described above, switches, depending on the number of tones that each sub-pixel is capable of displaying, between an interlace driving method and a progressive driving method. The liquid crystal display device 1 can thus (i) carry out display with high quality in the case where it is required to carry out high-quality display and (ii) reduce power consumption in the case where it is not necessarily required to carry out high-quality display.

Note that the operation of the signal line driving circuit 8 described above may or may not be carried out in combination with reversal driving. The following description will discuss a case where the operation of the signal line driving circuit 8 is carried out in combination with reversal driving.

[One-Line Interlace Driving and One-Dot Reversal Driving]

The following description will discuss a case where in the first display mode, (i) the scanning line drive circuit 6 carries out scanning every n scanning line(s) (where n is an integer of 1 or greater) by interlace driving and (ii) the signal line drive circuit 8 inverts polarities of data signals to be supplied to a selected scanning line(s) every m selected scanning line(s) (where m is an integer of 1 or greater). Embodiment 1 will discuss, by taking m-dot reversal driving as an example, driving in which a polarity or polarities are inverted every m selected scanning line(s). The present invention is, however, not limited to such an arrangement.

Figure 3:
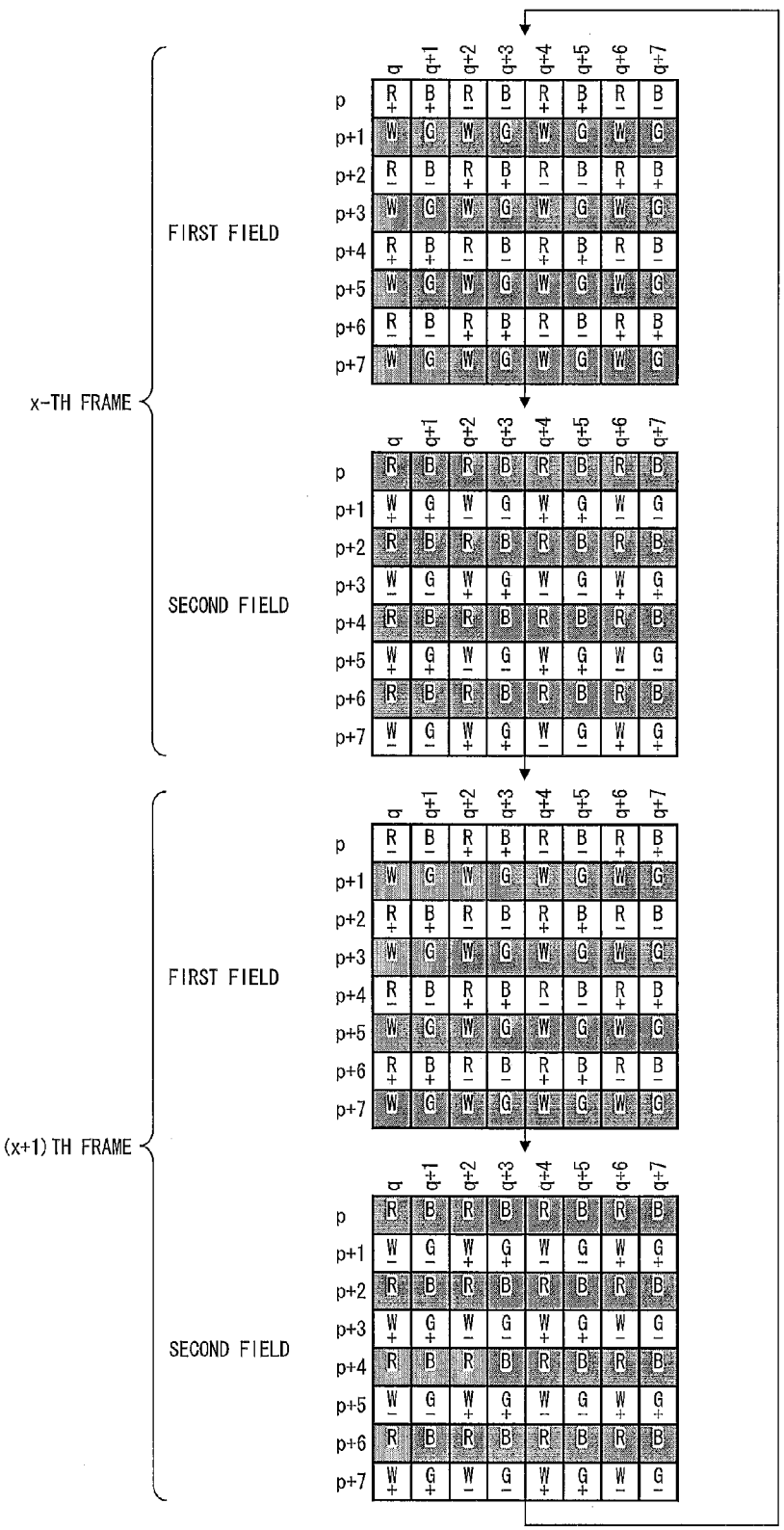
FIG. 3 is a transitional diagram schematically illustrating how a polarity of each sub-pixel is changed in a case where one-dot reversal driving and one-line interlace driving are carried out in a liquid crystal display device in accordance with one embodiment of the present invention.

The following description will first discuss, with reference to FIG. 3, a case where one-line interlace driving (n=1) is carried out while one-dot reversal driving (m=1) is carried out. FIG. 3 is a transitional diagram schematically illustrating how a polarity of each sub-pixel is changed.

The one-line interlace driving according to Embodiment 1, a p-th (1≤p≤P−11) scanning line, a (p+2)th scanning line, a (p+4)th scanning line, and a (p+6)th scanning line are scanned in a first field, and a (p+1)th scanning line, a (p+3)th scanning line, a (p+5)th scanning line, and a (p+7)th scanning line are scanned in a second field (see FIG. 3). That is, scanning is carried out every other scanning line in the first field and the second field.

(First Field of x-Th Frame)

As illustrated in FIG. 3, the scanning line drive circuit 6 sequentially scans the p-th scanning line, the (p+2)th scanning line, the (p+4)th scanning line, and the (p+6)th scanning line in the first field of an x-th frame. In the first field, the (p+1)th, the (p+3)th, the (p+5)th, and the (p+7)th scanning lines, which are to be scanned in the second field, are not scanned. In this way, the scanning line drive circuit 6 carries out scanning every other scanning line from a first scanning line through a P-th scanning line.

As illustrated in FIG. 3, in a case where the scanning line drive circuit 6 scans the p-th scanning line in the first field of the x-th frame, the signal line drive circuit 8 supplies the q-th (1≤q≤Q−15) data signal line with a data signal whose polarity is positive, and supplies the (q+1)th data signal line with a data signal whose polarity is positive. The signal line drive circuit 8 further supplies (i) the (q+2)th and (q+3)th data signal lines with respective data signals whose polarity is negative, (ii) the (q+4)th and (q+5)th data signal lines with respective data signals whose polarity is positive, and (iii) the (q+6)th and (q+7)th data signal lines with respective data signals whose polarity is negative.

In Embodiment 1, in a case where the scanning line drive circuit 6 scans the p-th scanning line, the signal line drive circuit 8 supplies data signals having the same polarity to every two sub-pixels from a first data signal line to a Q-th data signal line which two sub-pixels constitute a main pixel (indicated by a dashed line in FIG. 2) and which are adjacent to each other in the row direction. In other words, the signal line drive circuit 8 inverts polarities of data signals every set of two sub-pixels which constitute a main pixel and which are adjacent to each other in the row direction.

In a case where the scanning line drive circuit 6 scans the (p+2)th scanning line in the first field of an x-th frame, the signal line drive circuit 8 supplies (i) the q-th data signal line with a data signal whose polarity is negative and (ii) the (q+1)th data signal line with a data signal whose polarity is negative. The signal line drive circuit 8 further supplies (i) the (q+2)th and the (q+3)th data signal lines with respective data signals whose polarity is positive, (ii) the (q+4)th and the (q+5)th data signal lines with respective data signals whose polarity is negative, and (iii) the (q+6)th and the (q+7)th data signal lines with respective data signals whose polarity is positive.

In this way, in a case where the scanning line drive circuit 6 scans the (p+2)th scanning line, the signal line drive circuit 8 supplies data signals having the same polarity to every two sub-pixels from a first data signal line to a Q-th data signal line which two sub-pixels constitute a main pixel and which are adjacent to each other in the row direction.

As illustrated in FIG. 3, the scanning line drive circuit 6 and the signal line drive circuit 8 carry out the driving as described above, so that the polarity of a data signal to be applied to a sub-pixel R which is defined by the p-th scanning line and the q-th data signal line (hereinafter also referred to as a (p, q)th sub-pixel) becomes positive. Meanwhile, as illustrated in FIG. 3, polarities of data signals to be applied to a (p+2, q)th sub-pixel R and a (p, q+2)th sub-pixel R become negative.

A polarity of a data signal to be applied to a (p, q+1)th sub-pixel B is positive as illustrated in FIG. 3. Polarities of data signals to be applied to a (p+2, q+1)th sub-pixel B and a (p, q+3)th sub-pixel B are negative as illustrated in FIG. 3.

Thus, in Embodiment 1, the signal line drive circuit 8 applies data signals in such a manner that polarities of data signals are inverted every sub-pixel among sub-pixels which display the identical color and which are the closest to each other, the sub-pixels being among sub-pixels defined by scanning lines to be scanned in the first field.

That is, the signal line drive circuit 8 inverts polarities of data signals every two sub-pixels in both the row and column directions, which two sub-pixels are arranged to constitute a main pixel in a pattern of 2 (in the row direction)×1 (in the column direction) (i.e., a group of 2×1 selected pixels is determined as a set).

(Second Field of x-Th Frame)

The scanning line drive circuit 6 sequentially scans the (p+1)th, (p+3)th, (p+5)th, and (p+7)th scanning lines in a second field of the x-th frame (see FIG. 3). In the second field, the p-th, (p+2)th, (p+4)th, and (p+6)th scanning lines, which have been scanned in the first field, are not scanned. In this way, the scanning line drive circuit 6 carries out scanning every other scanning line from the first scanning line through the P-th scanning line. That is, as illustrated in FIG. 3, the scanning line drive circuit 6 carries out one-line interlace driving by repeating the scanning of the scanning lines in the first field and the scanning of the scanning lines in the second field.

As illustrated in FIG. 3, in a case where the scanning line drive circuit 6 scans the (p+1)th scanning line in the second field of the x-th frame, the signal line drive circuit 8 supplies (i) the q-th data signal line with a data signal whose polarity is positive and (ii) the (q+1)th data signal line with a data signal whose polarity is positive. The signal line drive circuit 8 further supplies (i) the (q+2)th and (q+3)th data signal lines with respective data signals whose polarity is negative, (ii) the (q+4)th and (q+5)th data signal lines with respective data signals whose polarity is positive, and (iii) the (q+6)th and (q+7)th data signal lines with respective data signals whose polarity is negative.

In a case where the scanning line drive circuit 6 scans the (p+3)th scanning line in the second field of the x-th frame, the signal line drive circuit 8 supplies (i) the q-th data signal line with a data signal whose polarity is negative and (ii) the (q+1)th data signal line with a data signal whose polarity is negative. The signal line drive circuit 8 further supplies (i) the (q+2)th and (q+3)th data signal lines with respective data signals whose polarity is positive, (ii) the (q+4)th and (q+5)th data signal lines with respective data signals whose polarity is negative, and (iii) the (q+6)th and (q+7)th data signal lines with respective data signals whose polarity is positive.

In this way, in Embodiment 1, in a case where the scanning line drive circuit 6 scans the p-th scanning line, the signal line drive circuit 8 supplies, from the first data signal line to the Q-th data signal line, data signals having the same polarity to every two sub-pixels which are adjacent to each other in the row direction.

As illustrated in FIG. 3, the scanning line drive circuit 6 and the signal line drive circuit 8 carry out the driving as described above, so that the polarity of a data signal to be applied to a (p+1, q)th sub-pixel W becomes positive. Meanwhile, as illustrated in FIG. 3, polarities of data signals to be applied to a (p+3, q)th sub-pixel W and a (p+1, q+2)th sub-pixel W becomes negative.

A polarity of a data signal to be applied to a (p+1, q+1)th sub-pixel B is positive as illustrated in FIG. 3. Polarities of data signals to be applied to a (p+3, q+1)th sub-pixel B and a (p+1, q+3)th sub-pixel B are negative as illustrated in FIG. 3.

Specifically, the signal line drive circuit 8 applies data signals in such a manner that polarities of data signals are inverted every sub-pixel among sub-pixels which display the identical color and which are the closest to each other, the sub-pixels being among sub-pixels defined by scanning lines to be scanned in the second field.

(First Field and Second Field of (x+1)th Frame)

As illustrated in FIG. 3, the polarity of the data signal to be applied to each sub-pixel in the first field of the (x+1)th frame is opposite to the polarity of the data signal which has been applied to the each sub-pixel in the first field of the x-th frame. The polarity of the data signal to be applied to each sub-pixel in a second field of the (x+1)th frame is opposite to the polarity of the data signal which has been applied to the each sub-pixel in the second field of the x-th frame.

As such, the polarity of the data signal to be applied to the each selected pixel which has been selected for the certain field is opposite to the polarity of the data signal which had been applied to the selected pixels in a previous field of the certain field where the selected pixel has been selected.

As described above, the scanning line drive circuit 6 repeatedly carries out, with respect to all scanning lines, scanning and non-scanning on a field-by-field basis, and the signal line drive circuit 8 inverts polarities of data signals to be supplied to the data signal lines on a frame-by-frame basis.

(Timing of Scanning Signal and Data Signal)

Figure 4:
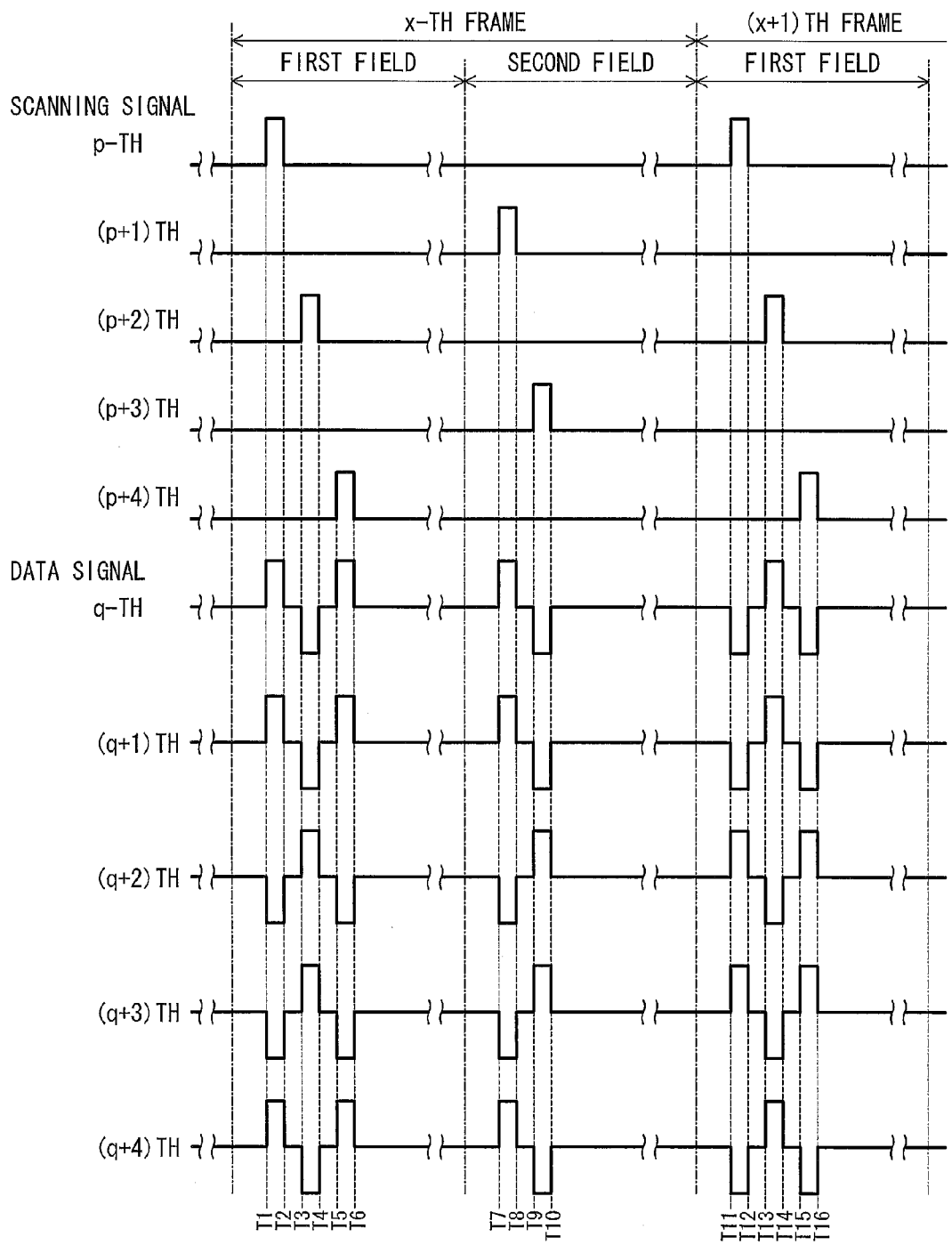
FIG. 4 is a timing chart illustrating a relationship between a scanning signal and a data signal.

The following description will discuss, with reference to FIG. 4, timing of scanning signals and data signals in a case where the liquid crystal display device in Embodiment 1 carries out the one-line interlace driving and one-dot reversal driving as illustrated in FIG. 3. FIG. 4 is a timing chart illustrating a relationship between a scanning signal and a data signal.

As illustrated in FIG. 4, supply of data signals having the positive polarity to the q-th, (q+1)th, and (q+4)th data signal lines is started as illustrated in FIG. 3 at a substantially same time as a scanning signal having a high-level (H level) voltage is applied to the p-th scanning line (i.e., the p-th scanning line is selected) at a time T1 in the first field of the x-th frame. Supply of data signals to the (q+2)th and (q+3)th data signal lines having the negative polarity is started at a substantially same time as the p-th scanning line is selected at the time T1.

Potentials of data signals supplied to the data signal lines become 0 V at a substantially same time as the selection of the p-th scanning line ends at a time T2. That is, supply of the data signals to the data signal lines is stopped at the time T2, That is, supply of the data signals is stopped until the (p+2)th scanning line is selected at a time T3.

At a substantially same time as the (p+2)th scanning line is selected at the time T3, supply of data signals to the data signal lines is started, polarities of which data signals are opposite to those of data signals which have been supplied at the time T1. Potentials of data signals to be supplied to the data signal lines become 0 V at a substantially same time as the selection of the (p+2)th scanning line ends at a time T4. The potentials remain 0 V until the (p+2)th scanning line is selected at a time 5.

At a substantially same time as the (p+4)th scanning line is selected at the time 5, data signals having polarities identical to those of data signals which have been supplied at the time T1 are started to be supplied to the data signal lines. Potentials of data signals to be supplied to the data signal lines become 0 V at a substantially same time as scanning of the p-th scanning line is terminated at a time T6.

At a substantially same time as the (p+1)th scanning line is selected at a time T7, data signals having positive polarities are started to be supplied to the q-th, (q+1)th, and (q+4)th data signal lines in the second field of the x-th frame (see FIG. 4). Moreover, at a substantially same time as the p-th scanning line is selected at the time T7, data signals having negative polarities are started to be supplied to the (q+2)th and (q+3)th data signal lines. Potential of each of the data signals supplied to the respective data signal lines becomes 0 V at a substantially same time as scanning of the (p+1)th scanning line ends at a time T8. That is, supply of data signals to the data signal lines is suspended at the time T8. The suspension of the supply of data signals remains until the (p+3)th scanning line is selected at a time T9.

At a substantially same time as the (p+3)th scanning line is selected at the time T9, data signals having polarities opposite to the those of data signals which have been supplied at the time T7 are started to be supplied to the data signal lines. Potentials of data signals supplied to the data signal lines become 0 V at a substantially same time as the selection of the (p+3)th scanning line ends at a time T10.

Similarly, at a substantially same time as the p-th scanning line is selected at a time T11, data signals having polarities opposite to those of data signals which have been supplied in the first field of the x-th frame are started to be supplied to the data signal lines in the first field of the (x+1)th frame. Potentials of data signals to be supplied to the data signal lines become 0 V at a substantially same time as the selection of the p-th scanning line ends, at a substantially same time as (p+2)th scanning line is selected at a time T13, data signals having polarities opposite to those of the data signals which have been supplied in the first field of the x-th frame are started to be supplied to the data signal lines. Potentials of data signals to be supplied to the data signal lines become 0 V at a substantially same time as scanning of the (p+2)th scanning line is terminated at a time T14.

At a substantially same time as scanning lines are sequentially selected in the second field of the (x+1)th frame, data signals having polarities opposite to those of the data signals which have been supplied in the second field of the x-th frame are started to be supplied to the data signal lines. Potentials of data signals to be supplied to the data signal lines become 0 V at a substantially same time as each of the scanning lines is selected.

As described above, the timing controller 4 controls the data line driving circuit so as to invert polarities of data signals every predetermined number of selected pixels, which data signals are to be applied to every predetermined number of selected pixels in a direction along the scan lines and in a direction along the data signal lines which selected pixels are selected for a certain field. As such, it is possible to reduce occurring of flickers.

Further, the timing controller 4 controls the signal line driving circuit 8 so as to invert polarities of the data signals to be applied to the predetermined number of selected pixels which are selected for the certain field so that the polarities are opposite to those of data signals which had been applied to the predetermined number of selected pixels in a previous field before the certain field where the predetermined number of selected pixels were selected. As such, it is possible to reduce burn-in in sub-pixels.

The above arrangement allows the liquid crystal display device 1 to (i) carry out display with high quality when it is required to carry out high-quality display and (ii) use interlace driving for power consumption reduction when it is not required to carry out high-quality display. The above arrangement further allows occurring of flickers to be reduced by use of dot-reversal driving.

The above arrangement allows the liquid crystal display device 1 to, when it is not required to carry out display with high quality, simultaneously (i) use interlace driving for power consumption reduction and (ii) display a color image based on a mixture of four colors.

In the case where the above predetermined number is 3, the pixels for displaying the individual colors each display either tone 0 or tone 1. The predetermined number being 3 allows a total of 16 colors to be displayed. Similarly, in the case where the above predetermined number is 5, the pixels each display one of tone 0, tone 1, tone 2, and tone 3. The predetermined number being 5 allows a total of 256 colors to be displayed.

Note that Embodiment 1 has described an example where the scanning line drive circuit 6 and the signal line drive circuit 8 (i) carry out the one-line interlace driving and one-dot reversal driving and (ii) invert polarities of data signals every set of two sub-pixels which constitute a main pixel and which are adjacent to each other in the row direction. Embodiment 1 is, however, not limited to such an arrangement. For example, the signal line drive circuit 8 may (i) apply data signals in such a manner that polarities of the data signals are inverted every two sub-pixels which constitute a main pixel and which are adjacent to each other in the row direction, and (ii) invert polarities of data signals every set of two sub-pixels which constitute a main pixel and which are adjacent to each other in the row direction.

Figure 5:
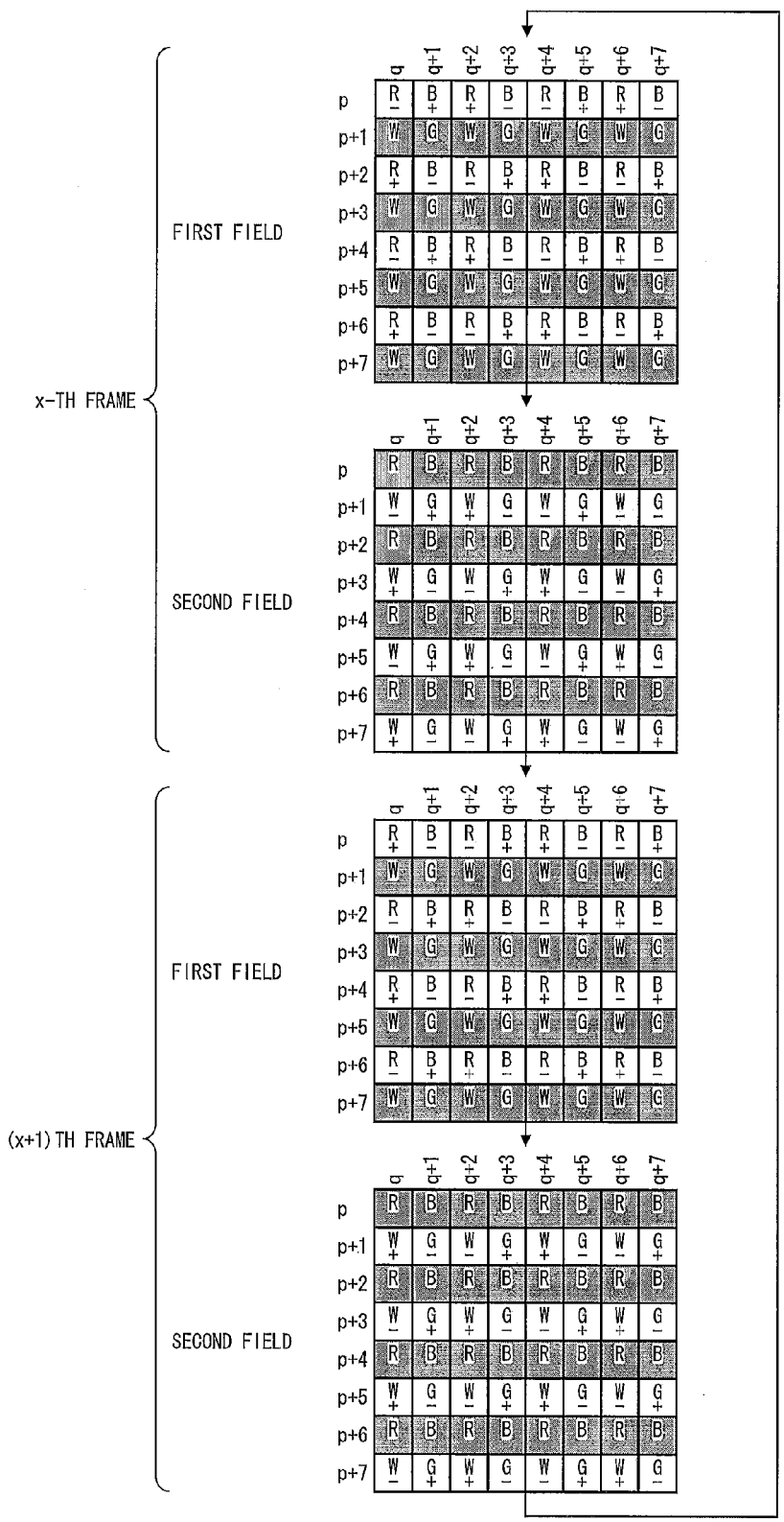
FIG. 5 is a transitional diagram schematically illustrating how a polarity of each sub-pixel is changed in a case where one-dot reversal driving is carried out while one-line interlace driving is carried out in a liquid crystal display device in accordance with one embodiment of the present invention.

The following description will discuss, with reference to FIG. 5, driving in a case where in the first display mode, (i) the one-line interlace driving and the one-dot reversal driving are carried out and (ii) polarities of data signals are inverted every set of two sub-pixels (i.e., a group of 2×1 selected pixels is determined as a set) which constitute different main pixels and which are adjacent to each other in the row direction. FIG. 5 is a transitional diagram schematically illustrating how a polarity of each sub-pixel is changed.

(x-Th Frame)

As illustrated in FIG. 5, the scanning line drive circuit 6 sequentially scans the p-th, the (p+2)th, the (p+4)th, and the (p+6)th scanning lines in the first field of the x-th frame. The (p+1)th, the (p+3)th, the (p+5)th, and the (p+7)th scanning lines, which are to be scanned in the second field, are not scanned.

In this way, the scanning line drive circuit 6 carries out scanning every other scanning line from the first through P-th scanning lines and switches, every field, which scanning lines to be scanned.

At this time, the signal line drive circuit 8 applies data signals having the same polarity to every two sub-pixels which constitute different main pixels and which are adjacent to each other in the row direction. The signal line drive circuit 8 also inverts polarities of data signals to be applied to every sub-pixel in the column direction among sub-pixels defined by scanning lines to be scanned in each field.

Since the scanning line drive circuit 6 and the signal line drive circuit 8 carry out the driving as described above, polarities of data signals to be applied to a (p, q+1)th sub-pixel B and a (p, q+2)th sub-pixel R are positive as illustrated in FIG. 5. Meanwhile, polarities of data signals to be applied to a (p+2, q+1)th sub-pixel B, a (p, q+3)th sub-pixel B, a (p+2, q+2)th sub-pixel R, and a (p, q+4)th sub-pixel R are negative as illustrated in FIG. 5.

((x+1)th Frame)

As illustrated in FIG. 5, in the first field of the (x+1)th frame, the polarity of a data signal to be applied to each sub-pixel is opposite to the polarity of a data signal which has been applied to the each sub-pixel in the first field of the x-th frame. In the second field of the (x+1)th frame, the polarity of a data signal to be applied to each sub-pixel is opposite to that of a data signal which has been applied to the each sub-pixel in the second field of the x-th frame.

As such, the polarity of a data signal to be applied to each selected pixel which has been selected for a certain field is opposite to the polarity of a data signal which had been applied to the each selected pixel in a previous field of the certain field where the each selected pixel has been selected.

As described above, the scanning line drive circuit 6 repeatedly carries out, with respect to all scanning lines, scanning and non-scanning on a field-by-field basis, and the signal line drive circuit 8 carries out driving so as to invert the polarity of a data signal to be supplied to each data signal line on a field-by-field basis.

(Timing of Scanning Signal and Data Signal)

The following description will discuss timing of scanning signals and data signals in the above example.

At a substantially same time as the p-th scanning line is selected (time t1), data signals having polarities as illustrated in FIG. 5 are started to be supplied to data signal lines in the first field of the x-th frame. Potentials of the data signals thus supplied become 0 V at a substantially same time as the selection of the p-th scanning line ends, and remain 0 V until the (p+2)th scanning line is selected.

At a substantially same time as the (p+2)th scanning line is selected, supply of data signals to data signal lines is started, which data signals have polarities opposite to that of the data signals which have been supplied at the time t1. Potentials of the data signals supplied to the data signal line b in the (p+2)th scanning line become 0 V at a substantially same time as the selection of the (p+2)th scanning line ends.

At a substantially same time as the (p+1)th scanning line is selected (time t2), data signals having polarities as illustrated in FIG. 5 are started to be supplied to data signal lines in the second field of the x-th frame. Potentials of the data signals thus supplied become 0 V at a substantially same time as the selection of the (p+1)th scanning line ends, and remain 0 V until the (p+3)th scanning line is selected.

Supply of data signals to data signal lines is started at a substantially same time as the (p+3)th scanning line is scanned, which data signals have polarities opposite to that of data signals which have been supplied at the time t2. Potentials of the data signals supplied to the data signal lines become 0 V at a substantially same time as the selection of the (p+3)th scanning line ends.

Similarly, at a substantially same time as the scanning lines are sequentially selected, supply of data signals to data signal lines is sequentially started in the first field (or the second field) of the (x+1)th frame, which data signals have polarities opposite to those of the data signals which have been supplied in the first field (or the second field) of the x-th frame. Potentials of the data signals supplied to the data signal lines become 0 V at a substantially same time as the scanning of each of the scanning lines ends.

[One-Line Interlace Driving and Two-Dot Reversal Driving]

Figure 6:
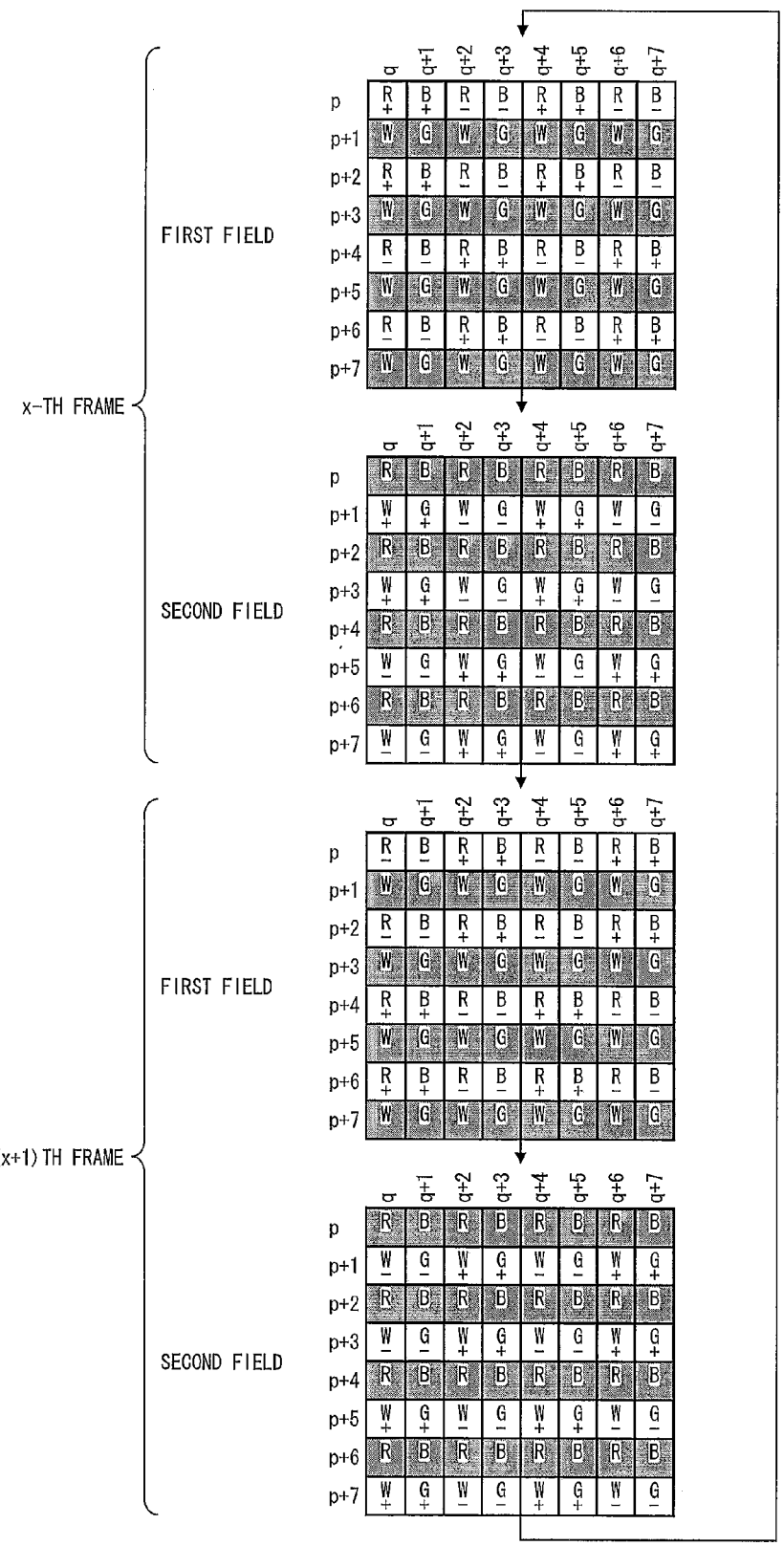
FIG. 6 is a transitional diagram schematically illustrating how a polarity of each sub-pixel is changed in a case where two-dot reversal driving is carried out while one-line interlace driving is carried out in a liquid crystal display device in accordance with one embodiment of the present invention.

The following description will discuss, with reference to FIG. 6, a case where in the first display mode, one-line interlace driving (n=1) and two-dot reversal driving (m=2) are carried out. FIG. 6 is a transitional diagram schematically illustrating how a polarity of each sub-pixel is changed in the liquid crystal display device 1 of Embodiment 1 in a case where one-line interlace driving and two-dot reversal driving are carried out.

(x-Th Frame)

The scanning line drive circuit 6 sequentially scans the p-th, the (p+2)th, the (p+4)th, and the (p+6)th scanning lines in a first field of the x-th frame, as illustrated in FIG. 6. The scanning line drive circuit 6 does not carry out scanning of the (p+1)th, the (p+3)th, the (p+5)th, and the (p+7)th scanning lines which are to be scanned in the second field.

In this way, the scanning line drive circuit 6 carries out scanning every other scanning line from a first scanning line through a P-th scanning line and switches, every field, which scanning lines to be scanned.

At this time, the signal line drive circuit 8 applies data signals having the same polarity to every two sub-pixels which constitute a main pixel and which are adjacent to each other in the row direction. The signal line drive circuit 8 inverts polarities every sub-pixel in the column direction among sub-pixels which are defined by scanning lines to be scanned in each field.

In this way, in a case where the scanning line drive circuit 6 carries out scanning, the signal line drive circuit 8 supplies, from a first data signal line to a Q-th data signal line, data signals having the same polarity every two sub-pixels which constitute a main pixel and which are adjacent to each other in the row direction.

Since the scanning line drive circuit 6 and the signal line drive circuit 8 carry out the driving as described above, polarities of data signals to be applied to a (p, q)th sub-pixel R and a (p+2, q)th sub-pixel R are positive, as illustrated in FIG. 6. Meanwhile, polarities of data signals to be applied to a (p+4, q)th sub-pixel R, a (p+6, q)th sub-pixel R, a (p, q+2)th sub-pixel R, and a (p+2, q+2)th sub-pixel R are negative, as illustrated in FIG. 6.

Similarly, as illustrated in FIG. 6, polarities of data signals to be applied to a (p+1, q)th sub-pixel W and a (p+3, q)th sub-pixel W is positive in the second field of the x-th frame. Meanwhile, as illustrated in FIG. 6, polarities of data signals to be applied to a (p+5, q)th sub-pixel W, a (p+7, q)th sub-pixel W, a (p+1, q+2)th sub-pixel W, and a (p+3, q+2)th sub-pixel W is negative.

Thus, in Embodiment 1, the signal line drive circuit 8 carries out the two-dot reversal driving by supplying data signals in such a manner that polarities of data signals are inverted (i) every two sub-pixels among sub-pixels which display the identical color and which are the closest to each other in the column direction and (ii) every sub-pixel in the row direction, the sub-pixels being among sub-pixels defined by scanning lines to be scanned in the first or second field of the x-th frame.

In other words, the signal line drive circuit 8 inverts, in each field, polarities of data signals every four sub-pixels in both the row and column directions, which four sub-pixels are constituted by (i) two sub-pixels constituting a main pixel in the row direction and (ii) two sub-pixels in the column direction (i.e., a group of 2×2 selected pixels is determined as a set).

((x+1)th Frame)

As illustrated in FIG. 6, the polarity of a data signal to be applied to each sub-pixel in a first field of an (x+1)th frame is opposite to the polarity of a data signal which has been applied to the each sub-pixel in the first field of the x-th frame. In a second field of the (x+1)th frame, the polarity of a data signal to be applied to each sub-pixel is opposite to the polarity of a data signal which has been applied to the each sub-pixel in the second field of the x-th frame.

As such, the polarity of a data signal to be applied to each selected pixel, which has been selected for a certain field, is opposite to the polarity of a data signal which had been applied to the each selected pixel in a previous field before the certain field where the each selected pixel has been selected.

(Timing of Scanning Signal and Data Signal)

The following description will discuss timing of scanning signals and data signals in the above case.

At a substantially same time as the p-th scanning line is selected (time t3), data signals having polarities as illustrated in FIG. 6 are started to be supplied to data signal lines in the first field of the x-th frame. Potentials of the data signals thus supplied become 0 V at a substantially same time as scanning of the p th scanning line is terminated, and remain 0 V until the (p+2)th scanning line is selected.

At a substantially same time as the (p+2)th scanning line is selected, data signals having polarities identical to those of data signals which have been supplied at the time t3 are started to be supplied to data signal lines. Potentials of the data signals supplied to the data signal lines become 0 V at a substantially same time as the selection of the (p+2)th scanning line ends.

At a substantially same time as the (p+4)th scanning line is selected, supply of data signals to the data signal lines is started, which data signals have polarities opposite to those of data signals which have been supplied at the time t3. Potentials of the data signals supplied to the data signal lines become 0 V at a substantially same time as the selection of the (p+4)th scanning line ends, and remain 0 V until the (p+4)th scanning line is selected.

At a substantially same time as the (p+1)th scanning line is selected (time t4), supply of data signals having polarities as illustrated in FIG. 6 are started to be supplied to the data signal lines in the second field of the x-th frame. Potentials of the data signals supplied to the data signal lines become 0 V at a substantially same time as the selection of the (p+1)th scanning line ends, and remain 0 V until the (p+3)th scanning line is selected.

At a substantially same time as the (p+3)th scanning line is selected, supply of data signals to the data signal lines is started, which data signals have polarities identical to those of data signals which have been supplied at the time t4. Potentials of the data signals supplied to the data signal lines become 0 V at a substantially same time as the selection of the (p+3)th scanning line ends.

Similarly, at a substantially same time as the scanning lines are sequentially selected, supply of data signals to data signal lines is sequentially started in the first field (or the second field) of the (x+1)th frame, which data signals have polarities opposite to that of data signals which have been supplied in the first field (or the second field) of the x-th frame. Potentials of the data signals supplied to the data signal lines become 0 V at a substantially same time as the selection of each of the scanning lines ends.

[Two-Line Interlace Driving, Two-Dot Reversal Driving]

In the above description, Embodiment 1 has described an example where the one-line interlace driving and the one-dot reversal driving are carried out. The present invention is, however, not limited to such an arrangement, and it is also possible to carry out two-line interlace driving (n=2) and two-dot reversal driving (m=2), for example.

Figure 7:
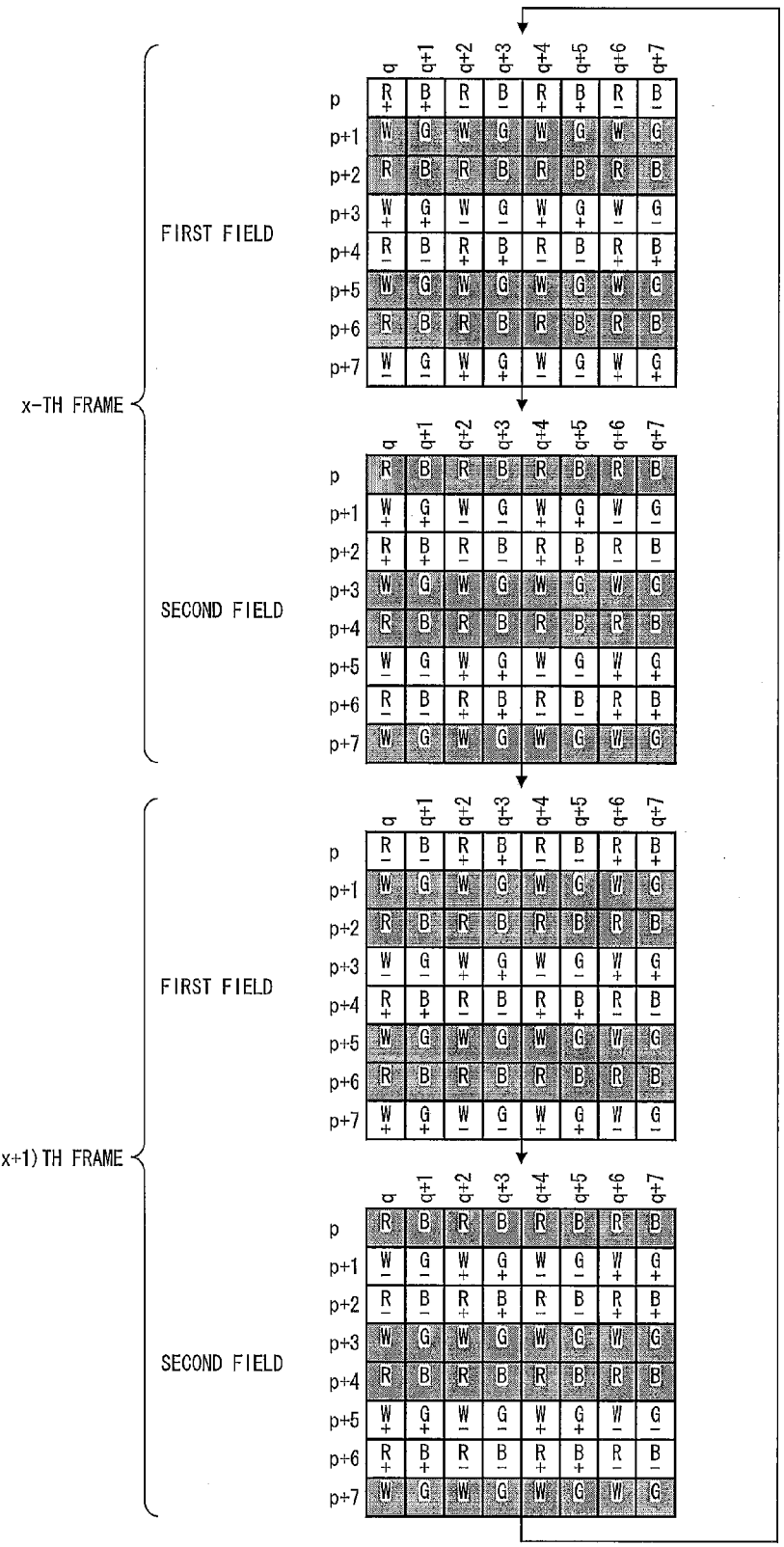
FIG. 7 is a transitional diagram schematically illustrating how a polarity of each sub-pixel is changed in a case where two-dot reversal driving is carried out while two-line interlace driving is carried out in a liquid crystal display device in accordance with one embodiment of the present invention.

The following description will discuss, with reference to FIG. 7, a case where in the first display mode, the two-line interlace driving and the two-dot reversal driving are carried out. FIG. 7 is a transitional diagram schematically illustrating how a polarity of each sub-pixel is changed in a case where the two-line interlace driving and the two-dot reversal driving are carried out in the liquid crystal display device 1 of Embodiment 1.

In order to carry out the two-line interlace driving, the p-th scanning line, the (p+3)th scanning line, the (p+4)th scanning line, and the (p+7)th scanning line are scanned in a first field as illustrated in FIG. 7. The (p+1)th scanning line, the (p+2)th scanning line, the (p+5)th scanning line, and the (p+6)th scanning line are scanned in a second field. That is, scanning is carried out every two scanning lines in both the first field and the second field.

(x-Th Frame)

In the first field of the x-th frame, the scanning line drive circuit 6 sequentially scans the p-th scanning line, the (p+3)th scanning line, the (p+4)th scanning line, and the (p+7)th scanning line as illustrated in FIG. 7. The scanning line drive circuit 6 does not carry out scanning of the (p+1)th, the (p+2)th, and the (p+5)th scanning line which are to be scanned in the second field.

In this way, the scanning line drive circuit 6 carries out scanning every other scanning line from the first scanning line through the P-th scanning line, and switches, every field, which scanning lines to be scanned.

At this time, the signal line drive circuit 8 applies data signals having the same polarity to every two sub-pixels which constitute a main pixel and which are the closest to each other in the row direction. The signal line drive circuit 8 inverts polarities of data signals every two sub-pixels which are closest to each other in the column direction among sub-pixels defined by scanning lines scanned in each field.

In this way, in a case where the scanning line drive circuit 6 scans the scanning lines, the signal line drive circuit 8 carries out the driving from the first data signal line to the q-th data signal line so that data signals having the same polarity are applied to two sub-pixels which constitute a main pixel and which are adjacent to each other in the row direction.

Since the scanning line drive circuit 6 and the signal line drive circuit 8 carry out the driving as described above, data signals having the positive polarity are applied to the (p, q)th sub-pixel R and the (p+3, q)th sub-pixel W (see FIG. 7). Further, data signals having the negative polarity are applied to the (p+4, q)th sub-pixel R, the (p, q+2)th sub-pixel R, the (p+7, q)th sub-pixel W, and the (p+3, q+2)th sub-pixel W, respectively (see FIG. 7).

Similarly, in the second field of the x-th frame, data signals having the positive polarity are applied to the (p+1, q)th sub-pixel W and the (p+2, q)th sub-pixel R, respectively (see FIG. 7). Further, data signals having the negative polarity are applied to the (p+5, q)th sub-pixel W, the (p+6, q)th sub-pixel R, a (p+1, q+2)th sub-pixel W, and the (p+2, q+2)th sub-pixel R (see FIG. 7).

With this arrangement, the signal line drive circuit 8 of Embodiment 1 carries out the one-dot reversal driving in such a manner that polarities of data signals are inverted every sub-pixel among sub-pixels which display the identical color and which are the closest to each other in the row and column directions, the sub-pixels being among the sub-pixels defined by scanning lines scanned in the first field or the second field of the first frame.

In other words, in each field, the signal line drive circuit 8 inverts polarities of data signals every four sub-pixels in both the row and column directions, which four sub-pixels are constituted by (i) two sub-pixels, which constitute a main pixel and are adjacent in the row direction, and (ii) two sub-pixels, which are adjacent in the column direction (i.e., a group of 2×2 selected pixels is determined as a set).

((x+1)th Frame)

As illustrated in FIG. 7, the polarity of a data signal which is applied to each sub-pixel in the first field of the (x+1)th frame is opposite to the polarity of a data signal which has been applied to the each sub-pixel in the first field of the x-th frame. Further, the polarity of a data signal which is applied to each sub-pixel in the second field of the (x+1)th frame is opposite to the polarity of a data signal which has been applied to each sub-pixel in the second field of the x-th frame.

That is, the polarity of a data signal applied to each of the selection pixels selected for a certain field is inverted with respect to the polarity of a data signal which has been applied to each of the selection pixels in a previous field before the certain field where the selection pixels have been selected.

(Timing of Scanning Signal and Data Signal)

The following description will discuss a timing of a scanning signal and a data signal in this case.

At a substantially same time as selection of the p-th scanning line (time t5), data signals having the polarities as illustrated in FIG. 7 are started to be supplied to the data signal lines in the first field of the x-th frame. Potentials of the data signals supplied to the data signal lines become 0 V at a substantially same time as the selection of the p-th scanning line ends, and remain 0 V until the (p+3)th scanning line is selected.

At a substantially same time as the (p+3)th scanning line is selected, supply of data signals to the data signal lines is started, which data signals have the same polarity as the data signals which have been supplied at the time t5. Potentials of the data signal supplied to the data signal lines become 0 V at a substantially same time as the selection of the (p+4)th scanning line subsequent to the (p+3)th scanning line ends, and remain 0 V until the (p+7)th scanning line is selected.

At a substantially same time (time t6) as the (p+1)th scanning line is selected, data signals having the polarities illustrated in FIG. 7 are started to be supplied to the data signal lines in the second field of the x-th frame. Potentials of the data signals supplied to the data signal lines become 0 V at a substantially same time as the selection of the (p+2)th scanning line subsequent to the (p+1)th scanning line ends, and remain 0 V until the (p+5)th scanning line is selected.

Similarly, at a substantially same time as scanning lines are sequentially selected, supply of data signals to data signal lines in the first field (or the second field) of the (x+1)th frame is started, which data signals have polarities opposite to that of the data signals which have been supplied in the first field (or the second field) of the x-th frame. Then, potentials of the data signals supplied to the data signal lines become 0 V at a substantially same time as the selection of each of the scanning lines ends.

In the above description, Embodiment 1 has described an example where (i) the two-line interlace driving and the two-dot reversal driving are carried out and (ii) the signal line drive circuit 8 inverts polarities of data signals every two sub-pixels which constitute a main pixel and are adjacent in the row direction. The present invention is, however, not limited to such an arrangement. For example, the signal line drive circuit 8 may (i) apply data signals having opposite polarities to two sub-pixels which constitute a main pixel and which are adjacent to each other in the row direction, and (ii) invert polarities of data signals every two sub-pixels which constitute adjacent main pixels and are adjacent in the row direction.

Figure 8:
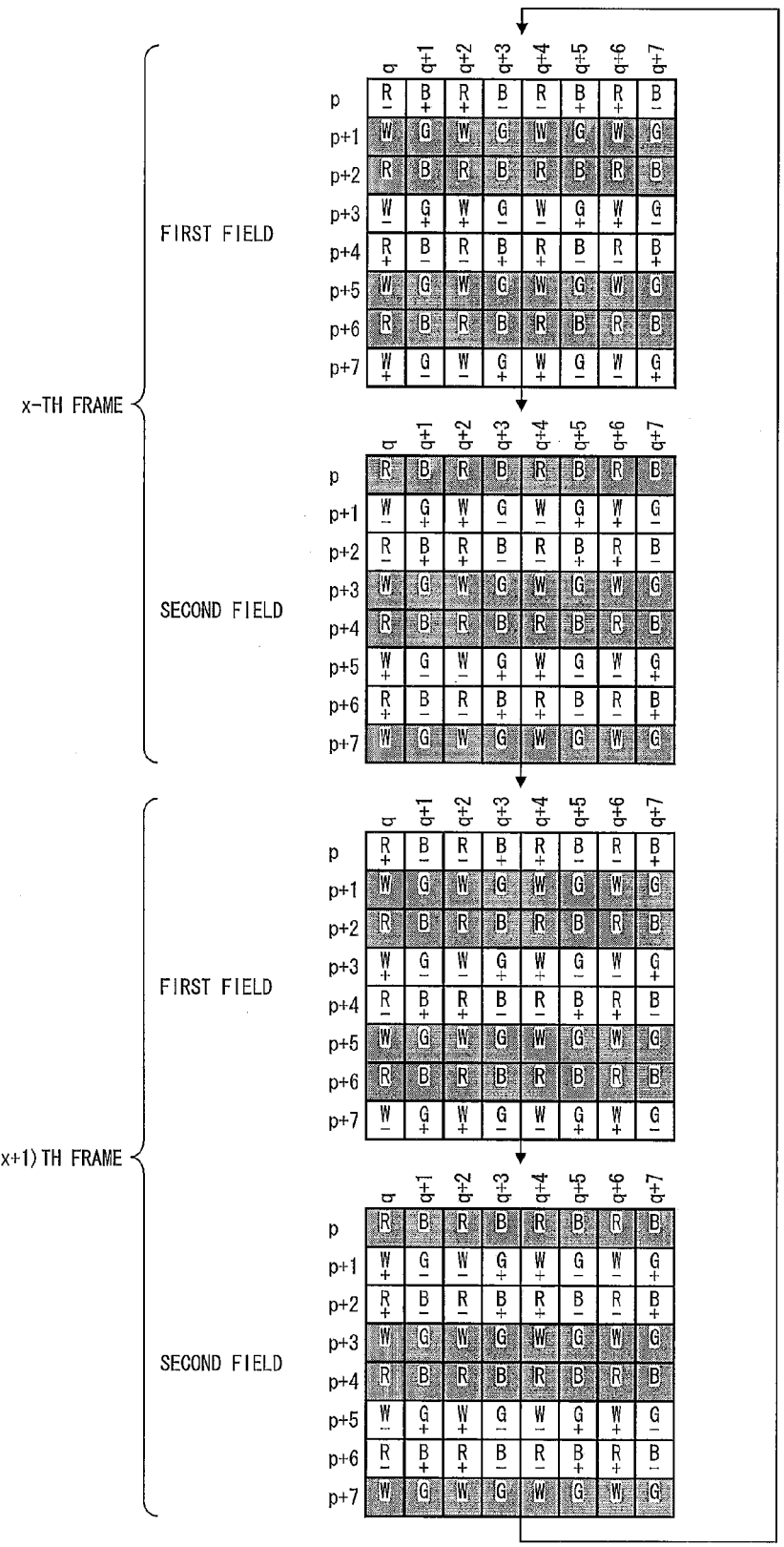
FIG. 8 is a transitional diagram schematically illustrating how a polarity of each sub-pixel is changed in a case where two-dot reversal driving is carried out while two-line interlace driving is carried out in a liquid crystal display device in accordance with one embodiment of the present invention.

The following description will discuss, with reference to FIG. 8, driving in a case where in the first display mode, (i) the two-line interlace driving and the two-dot reversal driving are carried out and (ii) the polarity of a data signal applied to each sub-pixel is inverted every two sub-pixels which constitute different main pixels and which are adjacent to each other in the row direction. FIG. 8 is a transitional diagram schematically illustrating how a polarity of each sub-pixel is changed in the liquid crystal display device 1 of Embodiment 1.

(x-Th Frame)

As illustrated in FIG. 8, the scanning line drive circuit 6 sequentially scans the p-th scanning line, the (p+3)th scanning line, the (p+4)th scanning line, and the (p+7)th scanning line in the first field of the x-th frame. The scanning line drive circuit 6 does not carry out scanning of the (p+1)th, the (p+2)th, the (p+5)th, and the (p+6)th scanning lines which are to be scanned in the second field of the x-th frame.

In this way, the scanning line drive circuit 6 carries out scanning every two scanning lines from the first through p-th scanning lines, and switches, every field, which scanning lines to be scanned.

At this time, the signal line drive circuit 8 applies data signals having the same polarity to every two sub-pixels which constitute different main pixels and which are the closest to each other in the row direction. The signal line drive circuit 8 inverts polarities of data signals every sub-pixel in the column direction among sub-pixels defined by scanning lines scanned in each field.

In this way, in a case where the scanning line drive circuit 6 scans the scanning lines, the signal line drive circuit 8 carries out the driving from the first through the q-th data signal lines so that data signals having the same polarity are applied to two sub-pixels which constitute different main pixels and which are adjacent to each other in the row direction.

Since the scanning line drive circuit 6 and the signal line drive circuit 8 each carry out driving as described above, data signals having the negative polarity are applied to the (p, q)th sub-pixel R and the (p+3, q)th sub-pixel W (see FIG. 8). Further, data signals having the positive polarity are applied to the (p+4, q)th sub-pixel R, the (p, q+2)th sub-pixel R, the (p+7, q)th sub-pixel W, and the (p+3, q+2)th sub-pixel W (see FIG. 8).

Similarly, in the second field of the x-th frame, data signals having the negative polarity are applied to the (p+1, q)th sub-pixel W and the (p+2, q)th sub-pixel R (see FIG. 8). Further, data signals having the positive polarity are applied to the (p+5, q)th sub-pixel W, the (p+6, q)th sub-pixel R, the (p+1, q+2)th sub-pixel W, and the (p+2, q+2)th sub-pixel R (see FIG. 8).

With this arrangement, in this example, the signal line drive circuit 8 supplies, in the first field or in the second field, data signals in such a manner that polarities are inverted every sub-pixel among sub-pixels which display the identical color and which are the closest to each other.

In other words, in each field, the signal line drive circuit 8 inverts polarities of data signals every four sub-pixels in both the row and column directions, which four sub-pixels are constituted by two sub-pixels, which constitute different main pixels and which are adjacent to each other in the row direction, and two sub-pixels, which are adjacent to each other in the column direction.

((x+1)th Frame)

A polarity of a data signal which is applied to each sub-pixel in the first field of the (x+1)th frame is opposite to that of the data signal which has been applied to the each sub-pixel in the first field of the x-th frame (see FIG. 8). Further, the polarity of a data signal which is applied to each sub-pixel in the second field of the (x+1)th frame is opposite to that of the data signal which has been applied to the each sub-pixel in the second field of the x-th frame.

That is, the polarity of a data signal applied to each selection pixel which has been selected for a certain field is inverted with respect to the polarity of a data signal which has been applied to each of the selection pixels in a previous field before the certain field where the selection pixels have been selected.

Embodiment 1 has described the case where (i) the two-line interlace driving and the two-dot reversal driving are carried out and (ii) the signal line drive circuit 8 inverts, in the column direction, polarities of data signals every two sub-pixels defined by scanning lines (e.g., the p-th scanning line and the (p+3)th scanning line in FIG. 7), which have not been scanned in the first field of each frame and sandwich adjacent two scanning lines. The present invention is, however, not limited to such an arrangement. For example, the signal line drive circuit 8 may invert, in the column direction, polarities of data signals every two adjacent sub-pixels which are defined by scanning lines sandwiched between two scanning lines which are not scanned in the first field of each frame.

Figure 9:
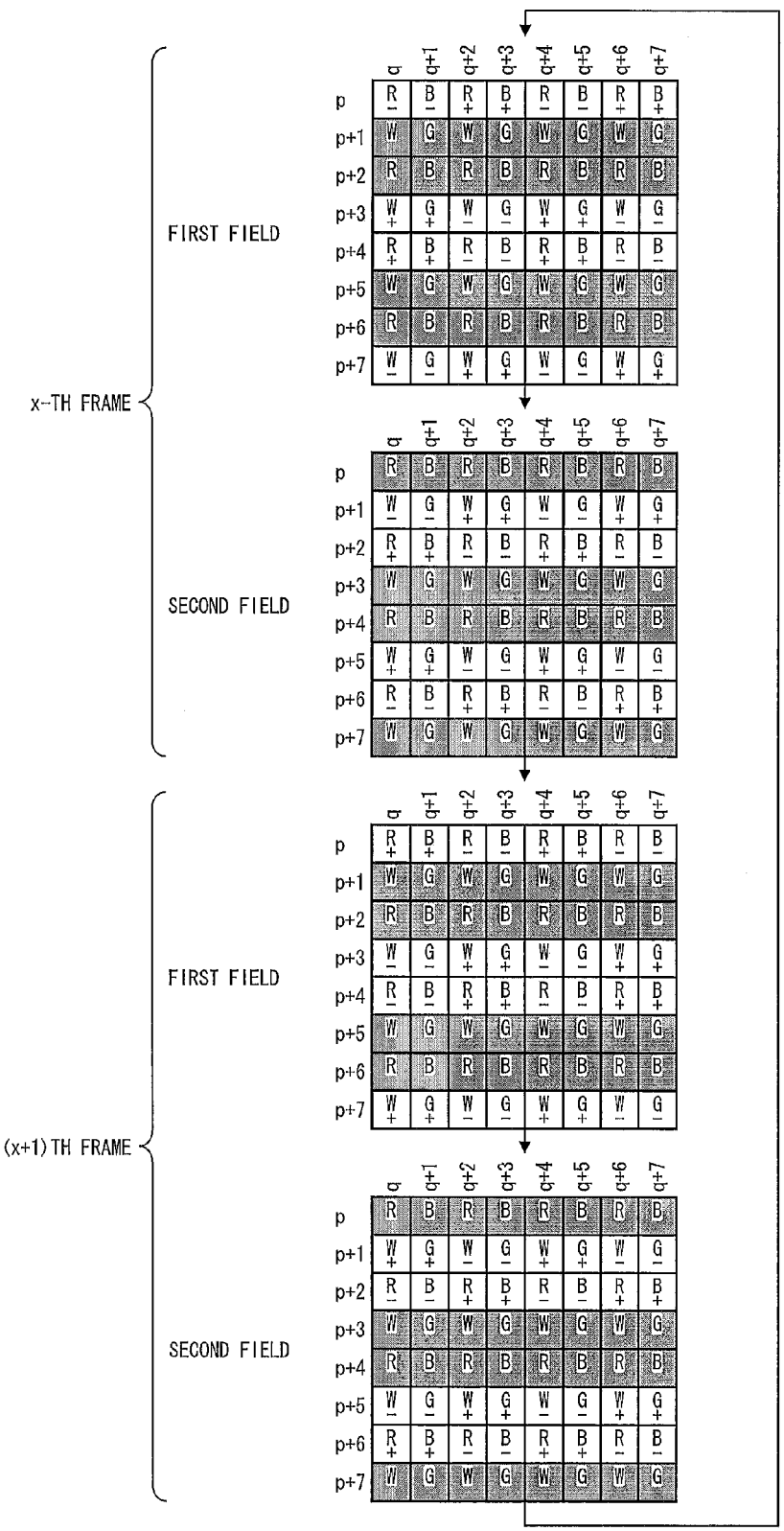
FIG. 9 is a transitional diagram schematically illustrating how a polarity of each sub-pixel is changed in a case where two-dot reversal driving is carried out while two-line interlace driving is carried out in a liquid crystal display device in accordance with one embodiment of the present invention.

The following description will discuss, with reference to FIG. 9, a case where in the first display mode, (i) the two-line interlace driving and the two-dot reversal driving are carried out and (ii) polarities of data signals to be applied to sub-pixels are inverted, in the column direction, every two adjacent sub-pixels defined by scanning lines sandwiched between two scanning lines which have not been scanned in the first field of each frame. FIG. 9 is a transitional diagram schematically illustrating how a polarity of each sub-pixel is changed in a case where (i) the two-line interlace driving and the two-dot reversal driving are carried out in the liquid crystal display device 1 of Embodiment 1, and (ii) polarities of data signals applied to sub-pixels are inverted every two adjacent sub-pixels which are defined by scanning lines sandwiched between two scanning lines which are not scanned in the first field of each frame.

In order to carry out the two-line interlace driving, the scanning line drive circuit 6 sequentially scans, in the first field of the x-th frame, the p-th scanning line, the (p+3)th scanning line, the (p+4)th scanning line, and the (p+7)th scanning line (see FIG. 9). The (p+2)th, the (p+3)th, the (p+5)th, and the (p+6)th scanning lines, which are to be scanned in the second field of the x-th frame, are not scanned.

In this way, the scanning line drive circuit 6 scans the first scanning line through the p-th scanning line every two scanning lines. That is, the scanning line drive circuit 6 repeatedly carries out, with respect to all scanning lines, scanning and non-scanning every two scanning lines, and switches, every field, which scanning lines to be scanned.

At this time, the signal line drive circuit 8 applies data signals in such a manner that polarities of the data signals are inverted every two sub-pixels which constitute a main pixel and which are adjacent to each other in the row direction, and inverts polarities of data signals every main pixel in the row direction. The signal line drive circuit 8 further applies data signals in such a manner that polarities of the data signals are inverted every two sub-pixels which are adjacent to each other among sub-pixels defined by scanning lines sandwiched between two scanning lines which are not scanned in the first field. Furthermore, the signal line drive circuit 8 applies each data signal so that a polarity of the each data signal is inverted on a frame-by-frame basis.

In this way, in a case where the scanning line drive circuit 6 scans the scanning lines, the signal line drive circuit 8 carries out driving from the first through the Q-th data signal lines so as to apply data signals having the same polarity every two sub-pixels which constitute a main pixel and which are arranged adjacent to each other in the row direction.

With this arrangement, the polarity of a data signal to be applied to each sub-pixel in the first field of the (x+1)th frame is opposite to that of the data signal which has been applied to the each sub-pixel in the first field of the x-th frame (see FIG. 9). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

[One-Line Interlace Driving, m-Dot Reversal Driving]

Figure 30:
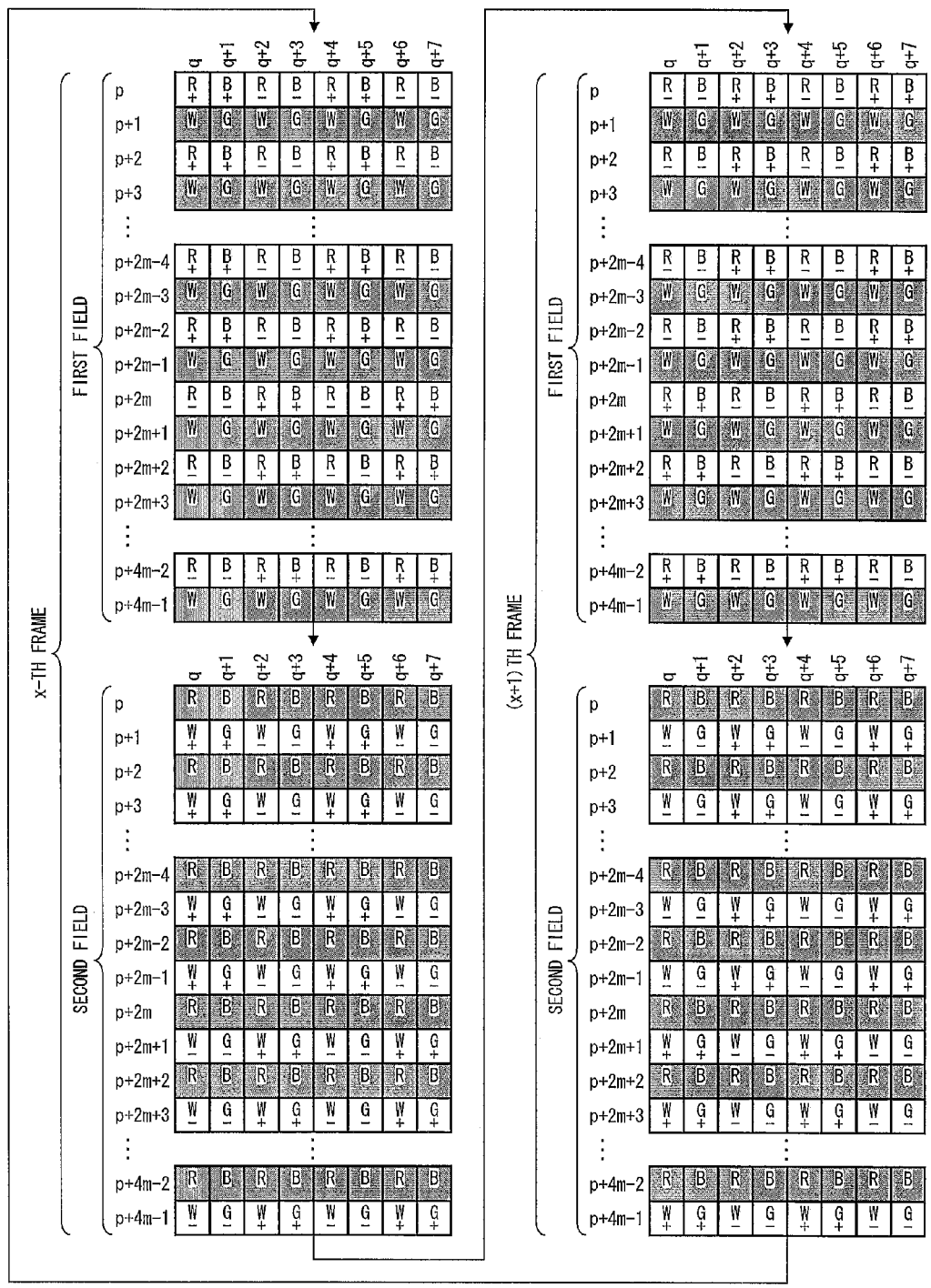
FIG. 30 is a transitional diagram schematically illustrating how a polarity of each sub-pixel is changed in a case where m-dot reversal driving and one-line interlace driving are carried out in a liquid crystal display device in accordance with one embodiment of the present invention.

The following description will discuss a case where one-line interlace driving (n=1) and m-dot reversal driving are carried out, with reference to FIG. 30. FIG. 30 is a transitional diagram schematically illustrating how a polarity of each sub-pixel is changed in a case where the one-line interlace driving and the m-dot reversal driving are carried out in the liquid crystal display device 1 of Embodiment 1. The term "m dot inversion drive" as used herein indicates, for example, driving in which the polarity of a data signal is inverted for each "m rows×2 columns" selection pixel among selection pixels on selected scanning lines selected in each field. Embodiment 1 is, however, not limited to such an arrangement, and the "m rows×2 columns" is merely an example of such driving that polarities of data signals is inverted per "m rows×an arbitrary number of columns" selection pixels.

In order to carry out the one-line interlace driving, as illustrated in FIG. 30, scanning lines are scanned every other scanning in the first field and the second field in each frame.

(x-Th Frame)

In the first frame of the x-th frame, the scanning line drive circuit 6 sequentially scans the p-th scanning line, the (p+2)th scanning line, . . . , the (p+2m−2)th scanning line, the (p+2m)th scanning line, . . . , and the (p+4m−2)th scanning line (see FIG. 30). In this way, the scanning line drive circuit 6 carries out scanning every other scanning line from the first through p-th scanning lines, and switches, every field, which scanning lines to be scanned.

The signal line drive circuit 8 applies data signals having the same polarity to every two sub-pixels which constitute a main pixel and which are arranged adjacent to each other in the row direction. Further, the signal line drive circuit 8 inverts polarities of data signals every two sub-pixels which are the closest to each other in the column direction among sub-pixels defined by scanning lines to be scanned in each field.

The scanning line drive circuit 6 and the signal line drive circuit 8 carry out the driving as described above, so that data signals having the positive polarity are applied to the (p, q)th sub-pixel R, the (p+2, q)th sub-pixel R, . . . , and the (p+2m−2, q)th sub-pixel R (see FIG. 30). Further, data signals having the negative polarity are applied to the (p+2m, q)th sub-pixel R, . . . , the (p+4m−2, q)th sub-pixel R, (p, q+2)th sub-pixel R, . . . , and the (p+2m−2, q+2)th sub-pixel R (see FIG. 30).

Similarly, in the second field of the x-th frame, data signals having the positive polarity are applied to the (p+2 m+1, q)th sub-pixel W, . . . , and the (p+4m−1, q)th sub-pixel W. Further, data signals having the negative polarity are applied to the (p+1, q)th sub-pixel W, . . . , the (p+2m−1, q)th sub-pixel W, the (p+1, q+2)th sub-pixel W, . . . , and the (p+2m−1, q+2)th sub-pixel W.

((x+1)th Frame)

Polarities of data signals to be applied to sub-pixels in the first field of the (x+1)th frame are opposite to those of the data signals which have been applied to the sub-pixels in the first field of the x-th frame (see FIG. 30). Further, polarities of data signals to be applied to sub-pixels in the second field of the (x+1)th frame are opposite to those of the data signals which have been applied to the sub-pixels in the second field of the x-th frame.

That is, polarities of data signals to be applied to the selection pixels in a certain field are inverted with respect to those of data signals which have been applied to the selection pixels in a previous field before the certain field where the selection pixels has been selected.

With this arrangement described above, the signal line drive circuit 8 supplies data signals in such a manner that (I) polarities of data signals to be supplied to sub-pixels are inverted every m sub-pixels among pixels which display the identical color and which are the closest to each other in the column direction, among sub-pixels defined by scanning lines scanned in each field, and (II) polarities of data signals to be supplied to the sub-pixels which are the closest to each other are inverted every sub-pixel in the row direction. In other words, the signal line drive circuit 8 supplies data signals in such a manner that (I) polarities of data signals to be supplied to sub-pixels are inverted every m sub-pixels among sub-pixels which constitute a picture element, which display the identical color, and which are the closest to each other in the column direction, and (II) polarities of data signals to be supplied to the sub-pixels which are the closest to each other are inverted every sub-pixel in the row direction.

Embodiment 2

In the above description, Embodiment 1 has described an example where a main pixel includes four sub-pixels in which two sub-pixels are arranged adjacent to each other in the row direction and two sub-pixels are arranged adjacent to each other in the column direction. The present invention is, however, not limited to such an arrangement. For example, it is possible to employ an arrangement in which four sub-pixels are arranged in line in the row direction so as to constitute a main pixel.

The following description will discuss, with reference to FIGS. 10 through 15, a liquid crystal display device according to another embodiment of the present invention.

(Arrangement of Pixels)

The following description will discuss, with reference to FIG. 10, an arrangement of four sub-pixels which are included in a display panel 2 of a liquid crystal display device 1 in Embodiment 2 and which constitute a main pixel. FIG. 10 is a view illustrating the arrangement of the four sub-pixels which are included in the display panel 2 of the liquid crystal display device 1 in Embodiment 2 and which constitute a main pixel.

As illustrated in FIG. 10, a main pixel includes a sub-pixel R, a sub-pixel B, a sub-pixel G, and a sub-pixel W. Further, the four sub-pixels are arranged in line in the row direction. For example, the sub-pixel R, the sub-pixel G, the sub-pixel B, and the sub-pixel W are adjacent to one another in the row direction in this order (see FIG. 10).

Embodiment 2 will discuss an example where the sub-pixel R, the sub-pixel G, the sub-pixel B, and the sub-pixel W are adjacent to one another in the row direction in this order. The present invention is, however, not limited to such an arrangement. It is possible to employ any of factorial four combinations (i.e., 24 combinations) of the arrangement of the four sub-pixels. For example, it is possible to arrange the sub-pixel R, the sub-pixel B, the sub-pixel G, and the sub-pixel W so as to be adjacent to one another in line in the row direction in this order.

Embodiment 2 will discuss an example where a main pixel includes the sub-pixel R, the sub-pixel B, the sub-pixel G, and the sub-pixel W. The present invention is, however, not limited to such an arrangement. For example, it is possible to employ an arrangement in which a sub-pixel Y is employed in place of the sub-pixel W, or, as a matter of course, an arrangement in which a sub-pixel for another color is employed in place of the sub-pixel W.

[One-Line Interlace Driving and One-Dot Reversal Driving]

Figure 11:
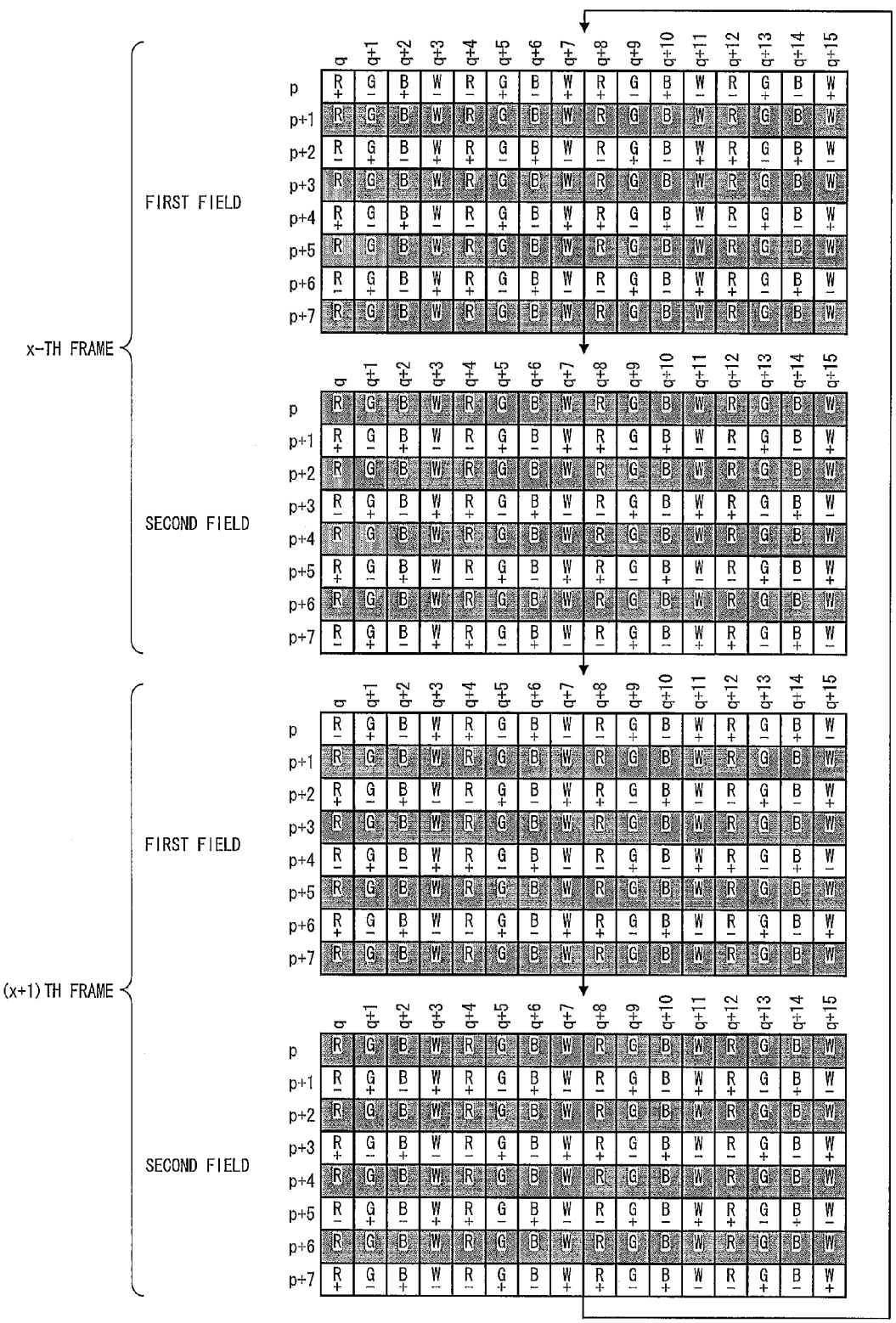
FIG. 11 is a transitional diagram schematically illustrating how a polarity of each sub-pixel is changed in a case where one-dot reversal driving is carried out while one-line interlace driving is carried out in a liquid crystal display device in accordance with another embodiment of the present invention.

First, the following description will discuss, with reference to FIG. 11, a case where in the first display mode, the one-line interlace driving (n=1) and the one-dot reversal driving (m=1) are carried out. FIG. 11 is a transitional diagram schematically illustrating how a polarity of each sub-pixel is changed in the liquid crystal display device 1 of Embodiment 2.

In order to carry out the one-line interlace driving, a p-th scanning line, a (p+2)th scanning line, a (p+4)th scanning line, and a (p+6)th scanning line are scanned in a first field as illustrated in FIG. 11. Further, a (p+1)th scanning line, a (p+3)th scanning line, a (p+5)th scanning line, and a (p+7)th scanning line are scanned in a second field. That is, the scanning lines are scanned every other scanning line in both the first field and the second field.

(x-Th Frame)

As illustrated in FIG. 11, a scanning line drive circuit 6 sequentially drives the p-th scanning line, the (p+2)th scanning line, the (p+4)th scanning line, and the (p+6)th scanning line in a first field of an x-th frame. Here, the scanning line drive circuit 6 does not carry out scanning of the (p+1)th, the (p+3)th, the (p+5)th, and the (p+7)th scanning lines which are to be scanned in a second field of the x-th frame. In this way, the scanning line drive circuit 6 scans the first scanning line through the p-th scanning line every other scanning line.

In a case where the scanning line drive circuit 6 scans the p-th scanning line in the first field of the x-th frame, a signal line drive circuit 8 supplies data signals having positive polarity to the q-th data signal line and to the (q+2)th data signal line, and supplies data signals having negative polarity to the (q+1)th data signal line and to the (q+3)th data signal line (see FIG. 11). Further, the signal line drive circuit 8 supplies data signals having the negative polarity to the (q+4)th data signal line and to the (q+6)th data signal line, and supplies data signals having the positive polarity to the (q+5)th data signal line and to the (q+7)th data signal line. Furthermore, the signal line drive circuit 8 supplies data signals having the positive polarity to the (q+8)th data signal line, to the (q+10)th data signal line, to the (q+13)th data signal line, and to the (q+15)th data signal line, and supplies data signals having the negative polarity to the (q+9)th data signal line, to the (q+11)th data signal line, to the (q+12)th data signal line, and to the (q+14)th data signal line.

Moreover, in a case where the scanning line drive circuit 6 scans the (p+2)th scanning line in the first field of the x-th frame, the signal line drive circuit 8 supplies data signals having the negative polarity to the q-th data signal line and to the (q+2)th data signal line, and supplies data signals having the positive polarity to the (q+1)th data signal line and to the (q+3)th data signal lines. Further, the signal line drive circuit 8 supplies data signals having the positive polarity to the (q+4)th data signal line and to the (q+6)th data signal line, and supplies data signals having the negative polarity to the (q+5)th data signal line and the (q+7)th data signal line. Furthermore, the signal line drive circuit 8 supplies data signals having the negative polarity to the (q+8)th data signal line, to the (q+10)th data signal line, to the (q+13)th data signal line, and to the (q+15)th data signal line, and (ii) supplies data signals having the positive polarity to the (q+9)th data signal line, to the (q+11)th data signal line, to the (q+12)th data signal line, and to the (q+14)th data signal line.

In this way, in a case where the scanning line drive circuit 6 scans the (p+2)th scanning line, the signal line drive circuit 8 in this example applies data signals in such a manner polarities of the data signals are alternately inverted in each set of four sub-pixels which constitute a main pixel and are adjacent to one another in the row direction. Further, the signal line drive circuit 8 inverts polarities of data signals every main pixel in the row direction.

The scanning line drive circuit 6 and the signal line drive circuit 8 each carry out driving as described above, so that data signals having the positive polarity are applied to the (p, q)th sub-pixel R and the (p, q+2)th sub-pixel B (see FIG. 11). Further, data signals having the negative polarity are applied to the (p+2, q)th sub-pixel R, the (p, q+4)th sub-pixel R, the (p+2, q+2)th sub-pixel B, and the (p, q+6)th sub-pixel B (see FIG. 11).

Further, data signals having the negative polarity are applied to the (p, q+1)th sub-pixel G, and the (p, q+3)th sub-pixel W (see FIG. 11). Furthermore, data signals having the positive polarity are applied to the (p+2, q+1)th sub-pixel G, the (p, q+5)th sub-pixel G, the (p+2, q+3)th sub-pixel W, and the (p, q+7)th sub-pixel W (see FIG. 11).

Similarly, in the second field of the x-th frame, data signals having the positive polarity are applied to the (p+1, q)th sub-pixel R and the (p+1, q+2)th sub-pixel B (see FIG. 11). Further, data signals having the negative polarity are applied to the (p+3, q)th sub-pixel R, the (p+1, q+4)th sub-pixel R, the (p+3, q+2)th sub-pixel B, and the (p+1, q+6)th sub-pixel B (see FIG. 11).

Further, data signals having the negative polarity are applied to the (p+1, q+1)th sub-pixel G and the (p+1, q+3)th sub-pixel W (see FIG. 11). Furthermore, data signals having the positive polarity are applied to the (p+3, q+1)th sub-pixel G, the (p+1, q+5)th sub-pixel G, the (p+3, q+3)th sub-pixel W, and the (p+1, q+7)th sub-pixel W (see FIG. 11).

That is, the signal line drive circuit 8 carries out driving in such a manner that polarities of data signals to be applied to sub-pixels which display the identical color and which are the closest to each other in the column direction are inverted among sub-pixels defined by scanning lines to be scanned in the first field.

((x+1)th Frame)

A polarity of data signal which is applied to each sub-pixel in the first field of the (x+1)th frame is opposite to that of the data signal which has been applied to each sub-pixel in the first field of the x-th frame (see FIG. 11). Further, the polarity of a data signal which is applied to each sub-pixel in the second field of the (x+1)th frame is opposite to that of the data signal which has been applied to each sub-pixel in the second field of the x-th frame.

That is, the polarity of a data signal which is applied to each of the selection pixels in a certain field is inverted with respect to that of a data signal which has been applied to each selection pixel in a previous field before the certain field where the selection pixels have been selected.

As described above, the scanning line drive circuit 6 carries out the one-line interlace driving by repeatedly carrying out scanning and non-scanning with respect to all scanning lines and switching, every field, which scanning lines to be scanned.

Further, the signal line drive circuit 8 carries out the one-dot reversal driving as follows. Specifically, the signal line drive circuit 8 applies data signals in such a manner that polarities of data signals are alternately inverted in each set of four sub-pixels which constitute a main pixel and are adjacent to one another in the row direction, and inverts polarities of data signals every main pixel in the row direction.

In other words, in each field, the signal line drive circuit 8 inverts polarities of data signals every four sub-pixels in the row and column directions, which four sub-pixels are constituted by (i) four sub-pixels which constitute a main pixel and are adjacent to one another in the row direction and (i) one sub-pixel in the column direction (i.e., a group of 4×1 selection pixels is determined as a set).

The signal line drive circuit 8 inverts polarity of a data signal to be applied to each sub-pixel constituting a main pixel, and inverts polarities of data signals so that a sub-pixel of a main pixel and a corresponding sub-pixel of an adjacent main pixel have opposite polarities. This makes it possible to achieve an arrangement in which data signals having the same polarity are not applied to sub-pixels which display the identical color in the same row.

(Timing of Scanning Signal and Data Signal)

The following description will discuss a timing of a scanning signal and a data signal in this example.

In the first field of the x-th frame, data signals having the polarities as illustrated in FIG. 11 are started to be supplied to the data signal lines at a substantially same time (time t7) as the p-th scanning line is selected. A potential of a data signal supplied to each data signal line becomes 0 V at a substantially same time as the selection of the p-th scanning line ends. The potential of 0 V remains until the (p+2)th scanning line is selected.

At a substantially same time as the (p+2)th scanning line is selected, data signals having polarities opposite to those of the data signals which have been supplied to the data signal lines at the time t7 are started to be supplied to the data signal lines. A potential of the data signal supplied to each data signal line becomes 0 V at a substantially same time as the selection of the (p+2)th scanning line ends.

Further, at a substantially same time as the (p+1)th scanning line is selected (time t8), data signals having polarities as illustrated in FIG. 11 are started to be supplied to the data signal lines in the second field of the x-th frame. A potential of the data signal supplied to each data signal line becomes 0 V at a substantially same time as the selection of the (p+1)th scanning line ends. The potential of 0 V remains until the (p+3)th scanning line is selected.

At a substantially same time as the (p+3)th scanning line is selected, data signals having polarities opposite to those of the data signals which have been supplied at the time t8 are started to be supplied to the data signal lines. A potential of the data signal supplied to each data signal line becomes 0 V at a substantially same time as the selection of the (p+3)th scanning line ends.

Similarly, at a substantially same time as the scanning lines are sequentially selected in the first field (or the second field) of the (x+1)th frame, data signals having polarities opposite to those of the data signals which have been supplied in the first field (or the second field) of the x-th frame are started to be sequentially supplied to the data signal lines. A potential of the data signal supplied to each data signal line becomes 0 V at a substantially same time as the selection of each of the data signal lines ends.

The above arrangement allows the liquid crystal display device 1 to, when it is not required to carry out display with high quality, simultaneously (i) use interlace driving for power consumption reduction and (ii) display a color image based on a mixture of four colors.

In the case where the above predetermined number is 3, the pixels for displaying the individual colors each display either tone 0 or tone 1. The predetermined number being 3 allows a total of 16 colors to be displayed. Similarly, in the case where the above predetermined number is 5, the pixels each display one of tone 0, tone 1, tone 2, and tone 3. The predetermined number being 5 allows a total of 256 colors to be displayed.

[One-Line Interlace Driving and Two-Dot Reversal Driving]

Figure 12:
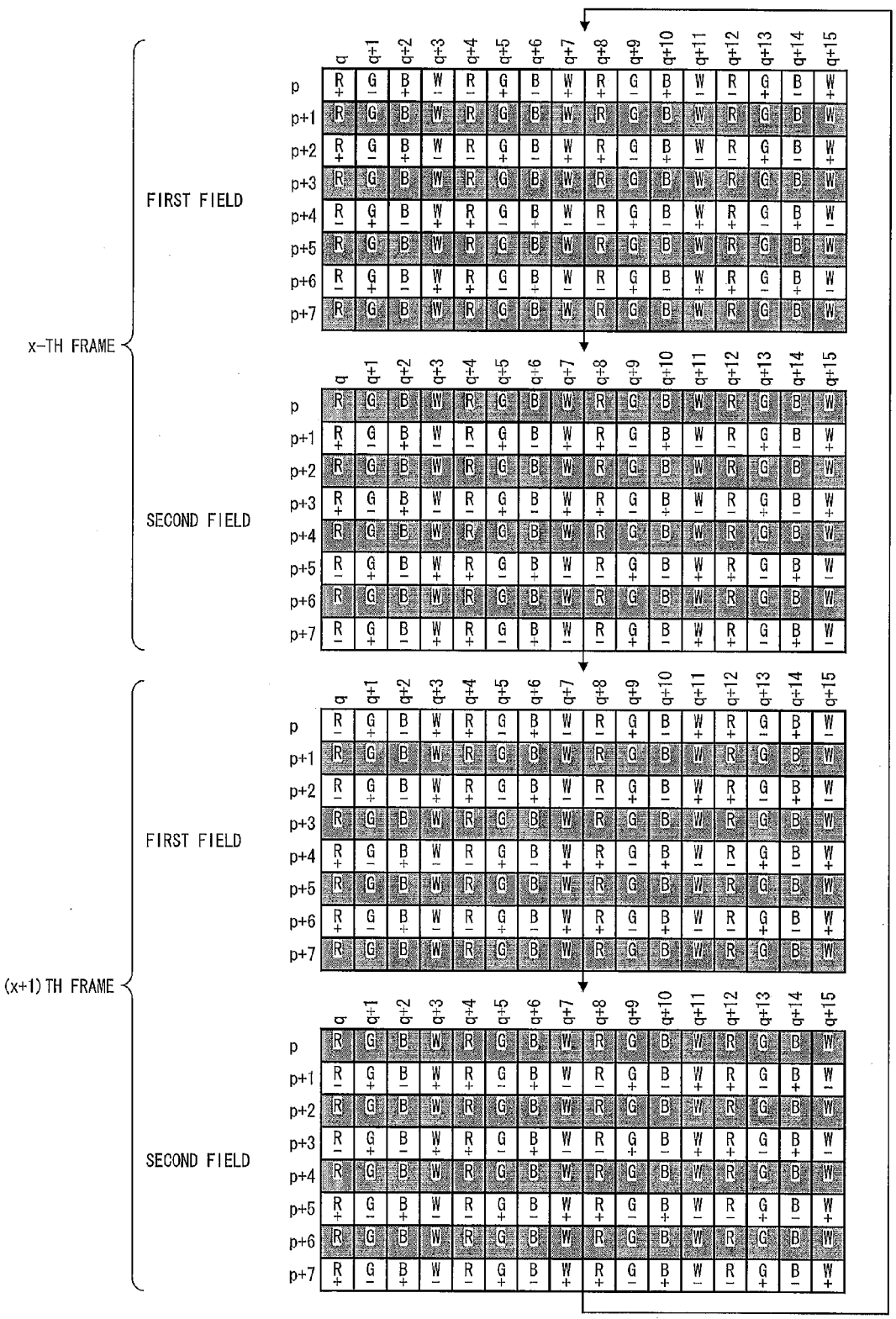
FIG. 12 is a transitional diagram schematically illustrating how a polarity of each sub-pixel is changed in a case where two-dot reversal driving is carried out while one-line interlace driving is carried out in a liquid crystal display device in accordance with another embodiment of the present invention.

The following description will discuss, with reference to FIG. 12, a case where in the first display mode, the one-line interlace driving (n=1) and the two-dot reversal driving (m=2) are carried out in Embodiment 2. FIG. 12 is a transitional diagram schematically illustrating how a polarity of each sub-pixel is changed in a case where the one-line interlace driving and the two-dot reversal driving are carried out in the liquid crystal display device 1 of Embodiment 2.

(x-Th Frame)

In the first field of the x-th frame, the scanning line drive circuit 6 sequentially scans the p-th scanning line, the (p+2)th scanning line, the (p+4)th scanning line, and the (p+6)th scanning line (see FIG. 12). The scanning line drive circuit 6 does not carry out scanning of the (p+1)th, the (p+3)th, the (p+5)th, and the (p+7)th scanning lines which are to be scanned in the second field of the x-th field.

In this way, the scanning line drive circuit 6 scans the first scanning line through the p-th scanning line every other scanning line, and switches, every field, which scanning lines to be scanned.

As illustrated in FIG. 12, during a time period in which the scanning line drive circuit 6 scans the scanning lines, the signal line drive circuit 8 applies data signals in such a manner that polarities of the data signals are alternately inverted in each set of four sub-pixels which constitute a main pixel and are adjacent to one another in the row direction. Further, the signal line drive circuit 8 inverts polarities of data signals every main pixel in the row direction.

In this way, in the first field of the x-th frame, data signals having the positive polarity are applied to the (p, q)th sub-pixel R, the (p+2, q)th sub-pixel R, the (p, q+2)th sub-pixel B, and the (p+2, q+2)th sub-pixel B (see FIG. 12). Further, data signals having the negative polarity are applied to the (p+4, q)th sub-pixel R, the (p+6, q)th sub-pixel R, the (p, q+4)th sub-pixel R, the (p+2, q+4)th sub-pixel R, the (p+4, q+2)th sub-pixel B, the (p+6, q+2)th sub-pixel B, the (p, q+6)th sub-pixel B, and the (p+2, q+6)th sub-pixel B (see FIG. 12).

Further, data signals having the negative polarity are applied to the (p, q+1)th sub-pixel G, the (p+2, q+1)th sub-pixel G, the (p, q+3)th sub-pixel W, and the (p+2, q+3)th sub-pixel W (see FIG. 12). Furthermore, data signals having the positive polarity are applied to the (p+4, q+1)th sub-pixel G, the (p+6, q+1)th sub-pixel G, the (p, q+5)th sub-pixel G, the (p+2, q+5)th sub-pixel G, the (p+4, q+3)th sub-pixel B, the (p+6, q+3)th sub-pixel B, the (p, q+7)th sub-pixel B, and the (p+2, q+7)th sub-pixel W (see FIG. 12).

Similarly, in the second field of the x-th frame, data signals having the positive polarity are applied to the (p+1, q)th sub-pixel R, the (p+3, q)th sub-pixel R, the (p+1, q+2)th sub-pixel B, and the (p+3, q+2)th sub-pixel B (see FIG. 12). Further, data signals having the negative polarity are applied to the (p+5, q)th sub-pixel R, the (p+7, q)th sub-pixel R, the (p+1, q+4)th sub-pixel R, the (p+3, q+4)th sub-pixel R, the (p+5, q+2)th sub-pixel B, the (p+7, q+2)th sub-pixel B, the (p+1, q+6)th sub-pixel B, and the (p+3, q+6)th sub-pixel B (see FIG. 12).

Furthermore, data signals having the negative polarity are applied to the (p+1, q+1)th sub-pixel G, the (p+3, q+1)th sub-pixel G, (p+1, q+3)th sub-pixel W, and the (p+3, q+3)th sub-pixel W (see FIG. 12). Moreover, data signals having the positive polarity are applied to the (p+5, q+1)th sub-pixel G, the (p+7, q+1)th sub-pixel G, the (p+1, q+5)th sub-pixel G, the (p+3, q+5)th sub-pixel G, the (p+5, q+3)th sub-pixel B, the (p+7, q+3)th sub-pixel B, the (p+1, q+7)th sub-pixel B, and the (p+3, q+7)th sub-pixel W (see FIG. 12).

In other words, in each field, the signal line drive circuit 8 inverts polarities of data signals every eight pixels in both the row and column directions, which four pixels are constituted by (i) four sub-pixels which constitute a main pixel in the row direction and (ii) two sub-pixels which are adjacent in the column direction (i.e., a group of 4×2 selected pixels is determined as a set).

((x+1)th Frame)

A polarity of a data signal which is applied to each sub-pixel in the first field of the (x+1)th frame is opposite to that of the data signal which has been applied to the each sub-pixel in the first field of the x-th frame (see FIG. 12). Further, the polarity of a data signal which is applied to each sub-pixel in the second field of the (x+1)th frame is opposite to that of the data signal which has been applied to the each sub-pixel in the second field of the x-th frame.

In this way, the polarity of a data signal applied to each selection pixel in a certain field is inverted with respect to the polarity of a data signal which has been applied to each selection pixel in a previous field before the certain field where the selection pixels have been selected.

As described above, the scanning line drive circuit 6 repeatedly carries out scanning and non-scanning with respect to the scanning lines, and switches, every field, which scanning lines to be scanned. Further, the signal line drive circuit 8 applies data signals in such a manner that polarities are alternately inverted in each set of four sub-pixels which constitute a main pixel and which are adjacent to each other in the row direction, and inverts polarities of data signals every main pixel in the row direction. The signal line drive circuit 8 further inverts, every two sub-pixels which are adjacent to each other in the column direction, polarities of data signals to be applied.

Since the signal line drive circuit 8 inverts polarities of data signals per sub-pixel constituting a main pixel and also inverts polarities of data signals every main pixel, it is possible to prevent data signals having the same polarity from being applied to sub-pixels which display the identical color in one row.

(Timing of Scanning Signal and Data Signal)

The following description will discuss a timing of a scanning signal and a data signal in this example.

At a substantially same time (time t9) as the p-th scanning line is selected, data signals having polarities as illustrated in FIG. 12 are started to be supplied to the data signal lines in the first field of the x-th frame. A potential of the data signal supplied to each data signal line becomes 0 V at a substantially same time as the selection of the p-th scanning line ends. The potential of 0 V remains until the (p+2)th scanning line is selected.

At a substantially same time as the (p+2)th scanning line is selected, data signals having the same polarity as the data signals which have been supplied at the time t9 are started to be supplied to the data signal lines. A potential of the data signal supplied to each of the data signal lines becomes 0 V at a substantially same time as the selection of the (p+2)th scanning line ends. The potential of 0 V remains until the (p+4)th scanning line is selected.

Then, at a substantially same time as the (p+4)th scanning line is selected, data signals having polarities opposite to those of the data signals which have been supplied at the time t9 are started to be supplied to the data signal lines. A potential of the data signal supplied to each data signal line becomes 0 V at a substantially same time as the selection of the (p+2)th scanning line ends.

At a substantially same time (time t10) as selection of the (p+1)th scanning line, in the second field of the x-th frame, data signals having polarities as illustrated in FIG. 12 are started to be supplied to the data signal lines. A potential of the data signal supplied to each data signal line becomes 0 V at a substantially same time as the selection of the (p+1)th scanning line ends. The potential of 0 V remains until the (p+3)th scanning line is selected.

At a substantially same time as selection of the (p+3)th scanning line, data signals having polarities opposite to the polarities of the data signals which have been supplied at the time t10 are started to be supplied to the data signal lines. A potential of the data signal supplied to each data signal line becomes 0 V at a substantially same time as the selection of the (p+3)th scanning line ends.

Similarly, at a substantially same time as sequential selection of the scanning lines, data signals having polarities opposite to those of the data signals which have been supplied in the first field (or the second field) of the x-th frame are started to be sequentially supplied to the data signal lines in the first field (or the second field) of the (x+1)th frame. A potential of the data signal supplied to each data signal line becomes 0 V at a substantially same time the selection of each scanning line ends.

[Two-Line Interlace Driving, One-Dot Reversal Driving]

Figure 13:
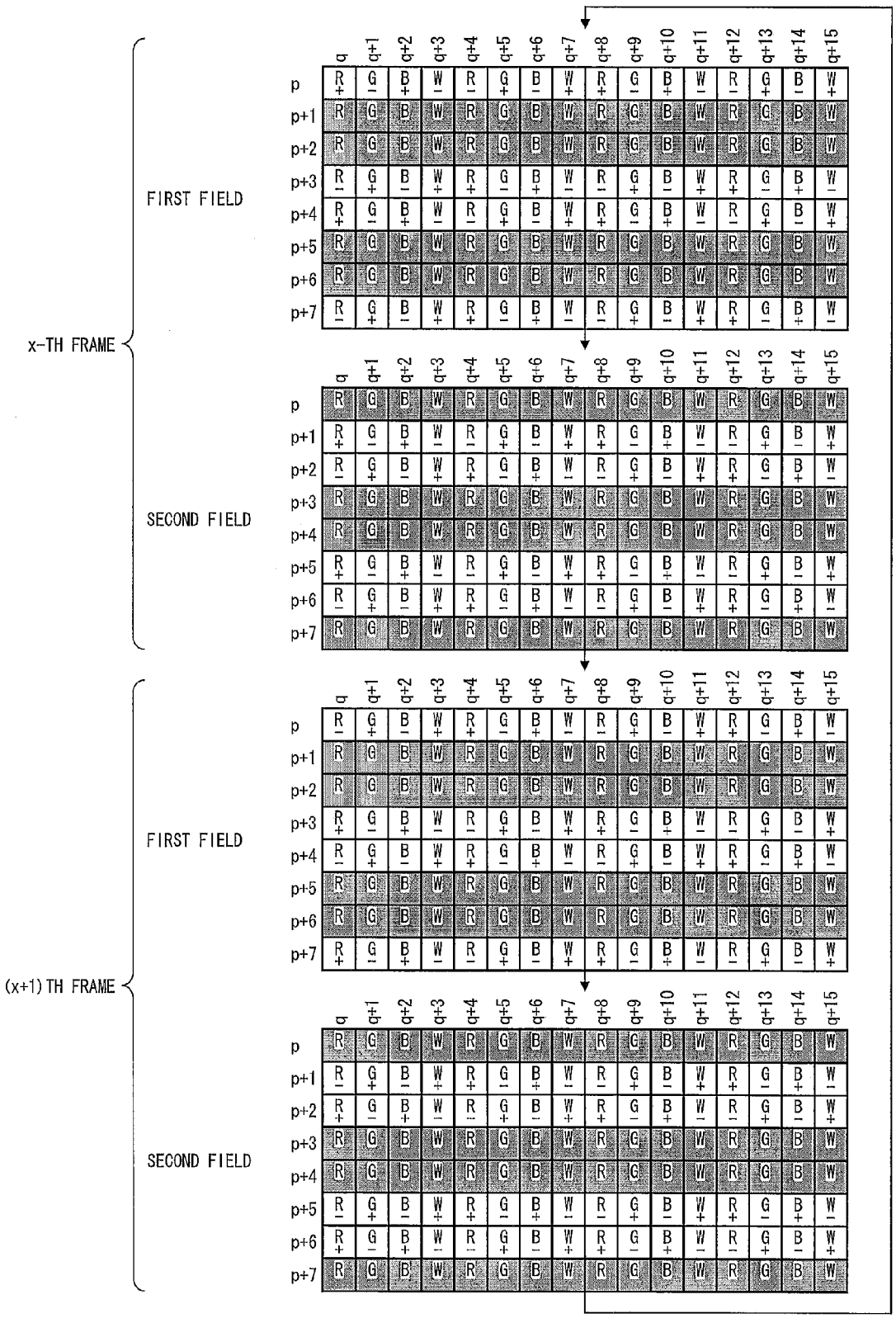
FIG. 13 is a transitional diagram schematically illustrating how a polarity of each sub-pixel is changed in a case where one-dot reversal driving is carried out while two-line interlace driving is carried out in a liquid crystal display device in accordance with another embodiment of the present invention.

The following description will discuss, with reference to FIG. 13, a case where in the first display mode, the two-line interlace driving (n=2) and the one-dot reversal driving (m=2) are carried out in Embodiment 2. FIG. 13 is a transitional diagram schematically illustrating how a polarity of each sub-pixel is changed in a case where the two-line interlace driving and the one-dot reversal driving are carried out in the liquid crystal display device 1 of Embodiment 2.

(x-Th Frame)

In order to carry out the two-line interlace driving, the scanning line drive circuit 6 sequentially scans the p-th scanning line, the (p+3)th scanning line, the (p+4)th scanning line, and the (p+7)th scanning line in the first field of the x-th frame (see FIG. 13). The scanning line drive circuit 6 does not carry out scanning of the (p+2)th, the (p+3)th, the (p+5)th, and the (p+6)th scanning lines which are to be scanned in the second field.

In this way, the scanning line drive circuit 6 carries out scanning every two scanning lines from the first through p-th scanning lines, and switches, every field, which scanning lines to be scanned.

In a case where the scanning line drive circuit 6 scans the scanning lines, the signal line drive circuit 8 applies data signals in such a manner that polarities of the data signals are inverted (see FIG. 13). Further, the signal line drive circuit 8 inverts polarities of data signals every main pixel in the row direction.

The scanning line drive circuit 6 and the signal line drive circuit 8 each carry out driving as described above, so that, in the first field of the x-th frame, data signals having the positive polarity are applied to the (p, q)th sub-pixel R and the (p, q+2)th sub-pixel B (see FIG. 13). Further, data signals having the negative polarity are applied to the (p+3, q)th sub-pixel R, the (p, q+4)th sub-pixel R, the (p+3, q+2)th sub-pixel B, and the (p, q+6)th sub-pixel B (see FIG. 13).

Furthermore, data signals having the negative polarity are applied to the (p, q+1)th sub-pixel G and the (p, q+3)th sub-pixel W (see FIG. 13). Moreover, data signals having the positive polarity are applied to the (p+3, q+1)th sub-pixel G, the (p, q+5)th sub-pixel G, the (p+3, q+3)th sub-pixel W, and the (p, q+7)th sub-pixel W (see FIG. 13).

Similarly, in the second field of the x-th frame, data signals having the positive polarity are applied to the (p+1, q)th sub-pixel R and the (p+1, q+2)th sub-pixel B (see FIG. 13). Further, data signals having the negative polarity are applied to the (p+2, q)th sub-pixel R, the (p+1, q+4)th sub-pixel R, the (p+2, q+2)th sub-pixel B, and the (p+1, q+6)th sub-pixel B (see FIG. 13).

Furthermore, data signals having the negative polarity are applied to the (p+1, q+1)th sub-pixel G and the (p+1, q+3)th sub-pixel W (see FIG. 13). Moreover, data signals having the positive polarity are applied to the (p+2, q+1)th sub-pixel G, the (p+1, q+5)th sub-pixel G, the (p+2, q+3)th sub-pixel W and the (p+1, q+7)th sub-pixel W (see FIG. 13).

In other words, in each field, the signal line drive circuit 8 inverts polarities of data signals in both the row and column directions, which four pixels are constituted by (i) four sub-pixels which constitute a main pixel and are adjacent to one another in the row direction and (i) one sub-pixel in the column direction (i.e., a group of 4×1 selection pixels is determined as a set).

((x+1)th Frame)

A polarity of a data signal which is applied to each sub-pixel in the first field of the (x+1)th frame is opposite to that of the data signal which has been applied to the each sub-pixel in the first field of the x-th frame (see FIG. 13). Further, the polarity of a data signal which is applied to each sub-pixel in the second field of the (x+1)th frame is opposite to that of the data signal which has been applied to the each sub-pixel in the second field of the x-th frame.

That is, the polarity of a data signal applied to each selection pixel in a certain field is inverted with respect to the polarity of a data signal which have been applied to each selection pixel in a previous field before the certain field where the selection pixels have been selected.

As described above, the scanning line drive circuit 6 repeatedly carries out, with respect to all scanning lines, scanning and non-scanning every two scanning lines, and switches, every field, which scanning lines to be scanned.

The signal line drive circuit 8 applies data signals in such a manner that polarities of the data signals are alternately inverted in each set of four sub-pixels which constitute a main pixel and which are adjacent to each other in the row direction, and inverts polarities of data signals every main pixel in the row direction. The signal line drive circuit 8 further inverts polarities of data signals in such a manner that the polarities are alternately inverted in each set of four sub-pixels which are adjacent to one another in the column direction. The signal line drive circuit 8 further inverts polarities of data signals in such a manner that the polarities are inverted every sub-pixel in the column direction. Furthermore, the signal line drive circuit 8 applies a data signal having an inverted polarity on a frame-by-frame basis.

(Timing of Scanning Signal and Data Signal)

The following description will discuss a timing of a scanning signal and a data signal in this example.

At a substantially same time (time t11) as the p-th scanning line is selected, data signals having polarities as illustrated in FIG. 13 are started to be supplied to the data signal lines in the first field of the x-th frame. A potential of the data signal supplied to each data signal line becomes 0 V at a substantially same time as the selection of the p-th scanning line ends. The potential of 0 V remains until the (p+3)th scanning line is selected.

At a substantially same time as the (p+3)th scanning line is selected, data signals having polarities opposite to that of the data signals which have been supplied at the time t11 are started to be supplied to the data signal lines. A potential of the data signal supplied to each data signal line becomes 0 V at a substantially same time as the selection of the (p+4)th scanning line subsequent to the selection of the (p+3)th scanning line ends.

At a substantially same time (time t12) as the (p+1)th scanning line is selected, data signals having polarities as illustrated in FIG. 13 are started to be supplied to the data signal lines in the second field of the x-th frame. A potential of the data signal supplied to each data signal line becomes 0 V at a substantially same time as selection of the (p+2)th scanning line subsequent to the selection of the (p+1)th scanning line ends. The potential of 0 V remains until the (p+5)th scanning line is selected.

Similarly, at a substantially same time as sequential selection of the scanning lines, data signals having polarities opposite to the polarities of the data signals supplied in the first field (or the second field) of the x-th frame are started to be sequentially supplied to the data signal lines in the first field (or the second field) of the (x+1)th frame. A potential of the data signal supplied to each data signal line becomes 0 V at a substantially same time as the selection of each of the scanning lines ends.

[Two-Line Interlace Driving, Two-Dot Reversal Driving]

Figure 14:
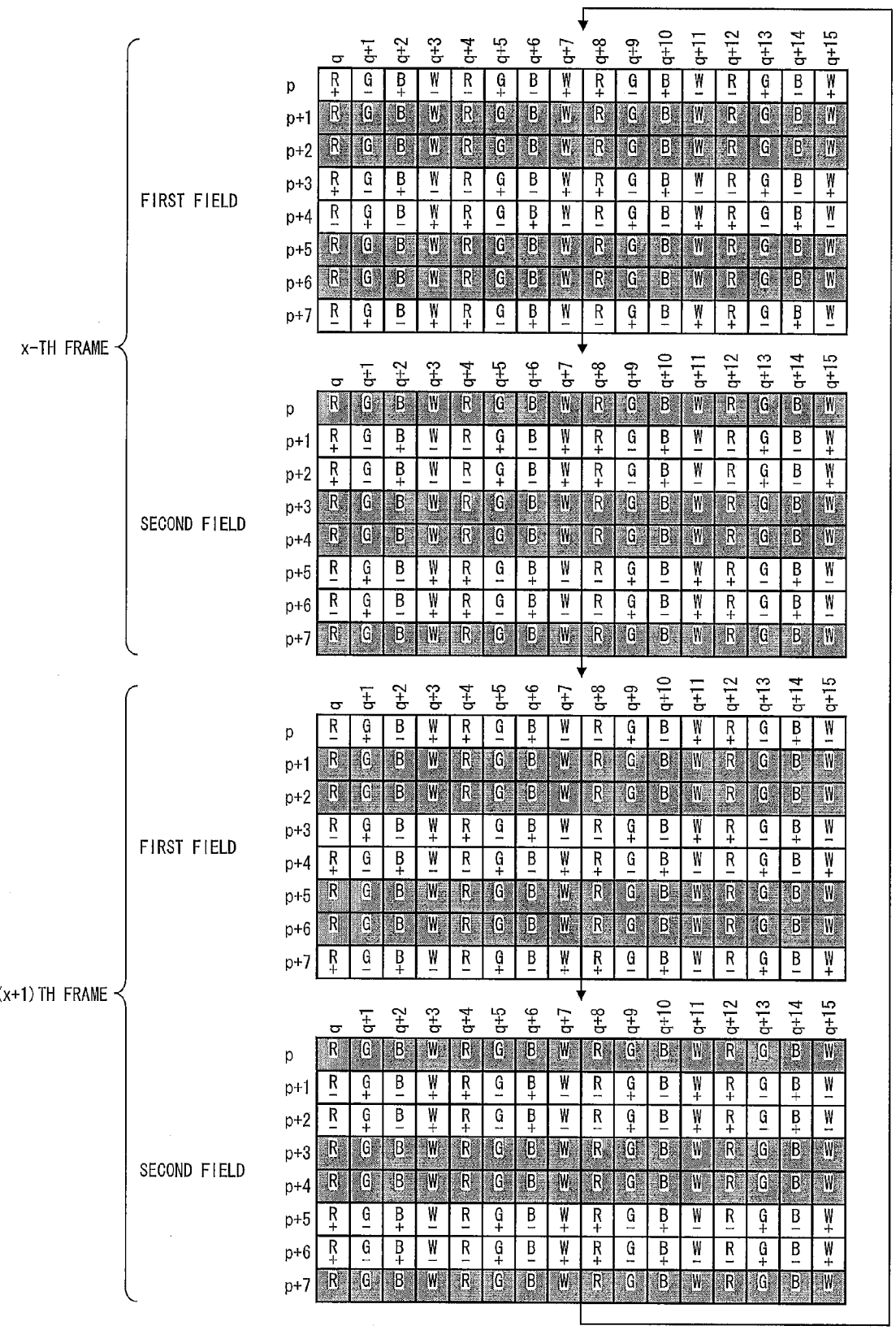
FIG. 14 is a transitional diagram schematically illustrating how a polarity of each sub-pixel is changed in a case where two-dot reversal driving is carried out while two-line interlace driving is carried out in a liquid crystal display device in accordance with another embodiment of the present invention.

The following description will discuss, with reference to FIG. 14, a case where in the first display mode, the two-line interlace driving (n=2) and the two-dot reversal driving (m=2) are carried out in Embodiment 2. FIG. 14 is a transitional diagram schematically illustrating how a polarity of each sub-pixel is changed in a case where the two-line interlace driving and the two-dot reversal driving are carried out in the liquid crystal display device 1 of Embodiment 2.

In order to carry out the two-line interlace driving, the scanning line drive circuit 6 sequentially scans, in the first field of the x-th frame, the p-th scanning line, the (p+3)th scanning line, the (p+4)th scanning line, and the (p+7)th scanning line (see FIG. 14). The scanning line drive circuit 6 does not carry out scanning of the (p+2)th, the (p+3)th, the (p+5)th, and the (p+6)th scanning lines which are to be scanned in the second field of the x-th frame. In this way, the scanning line drive circuit 6 carries out scanning every two scanning lines from the first scanning line through the p-th scanning line.

As illustrated in FIG. 14, in a case where the scanning line drive circuit 6 scans the scanning lines, the signal line drive circuit 8 applies data signals in such a manner that polarities of the data signals are alternately inverted in each set of four sub-pixels which constitute a main pixel and are adjacent to one another in the row direction, and inverts polarities of data signals every main pixel in the row direction.

In other words, in each field, the signal line drive circuit 8 inverts polarities of data signals every eight sub-pixels in both the row and column directions, which eight sub-pixels are constituted by (i) four sub-pixels which constitute a main pixel and are adjacent to one another in the row direction and (i) two sub-pixels in the column direction (i.e., a group of 4×2 selection pixels is determined as a set).

The signal line drive circuit 8 applies data signals in such a manner that polarities of the data signals are alternately inverted in each set of four sub-pixels which constitute a main pixel and are adjacent to one another in the row direction, and inverts polarities of data signals every main pixel in the row direction. The signal line drive circuit 8 further inverts polarities of data signals every two adjacent sub-pixels which are adjacent to each other in the column direction. Furthermore, the signal line drive circuit 8 applies a data signal having an inverted polarity on a frame-by-frame basis.

(Timing of Scanning Signal and Data Signal)

The following description will discuss a timing of a scanning signal and a data signal in this example.

At a substantially same time (time t13) as the p-th scanning line is selected, data signals having polarities as illustrated in FIG. 14 are started to be supplied to the data signal lines in the first field of the x-th frame. A potential of the data signal supplied to each data signal line becomes 0 V at a substantially same time as the selection of the p-th scanning line ends. The potential of 0 V remains until the (p+3)th scanning line is selected.

At a substantially same time as the (p+3)th scanning line is selected, data signals having the same polarity as the data signals which have been supplied at the time t13 are started to be supplied to the data signal lines. A potential of the data signal supplied to each data signal line becomes 0 V at a substantially same time as the selection of the (p+4)th scanning line subsequent to the selection of the (p+3)th scanning line ends.

At a substantially same time (time t14) as the (p+1)th scanning line is selected, data signals having polarities as illustrated in FIG. 14 are started to be supplied to the data signal lines in the second field of the x-th frame. A potential of the data signal supplied to each data signal line becomes 0 V at a substantially same time as the selection of the (p+2)th scanning line subsequent to the selection of the (p+1)th scanning line ends.

Similarly, at a substantially same time as the scanning lines are sequentially selected, data signals having polarities opposite to that of the data signals which have been supplied in the first field (or the second field) of the x-th frame are started to be sequentially supplied to the data signal lines in the first field (or the second field) of the (x+1)th frame. A potential of the data signal supplied to each data signal line becomes 0 V at a substantially same time as the selection of each of the scanning lines ends.

Embodiment 2 has described the case where (i) the two-line interlace driving and the two-dot reversal driving are carried out and (ii) the signal line drive circuit 8 inverts, in the column direction, polarities of data signals every two sub-pixels defined by scanning lines (e.g., the p-th scanning line and the (p+3)th scanning line in FIG. 14), which have not been scanned in the first field of each frame and sandwich adjacent two scanning lines. Embodiment 2 is, however, not limited to such an arrangement. For example, the signal line drive circuit 8 may invert, in the column direction, polarities of data signals every two adjacent sub-pixels which are defined by scanning lines sandwiched between two scanning lines that are not scanned in the first field in each frame.

The following description will discuss, with reference to FIG. 15, a case where in the first display mode, (i) the two-line interlace driving and the two-dot reversal driving are carried out and (ii) polarities of data signals to be applied to sub-pixels are inverted every two adjacent sub-pixels which are defined by scanning lines sandwiched between two scanning lines which have not been scanned in the first field of each frame. FIG. 15 is a transitional diagram schematically illustrating how a polarity of each sub-pixel is changed in a case where (i) the two-line interlace driving and the two-dot reversal driving are carried out in the liquid crystal display device 1 of Embodiment 2, and (ii) polarities of data signals applied to sub-pixels are inverted every two adjacent sub-pixels which are defined by scanning lines sandwiched between two scanning lines which are not scanned in the first field of each frame.

In order to carry out the two-line interlace driving, the scanning line drive circuit 6 sequentially scans, in the first field of the x-th frame, the p-th scanning line, the (p+3)th scanning line, the (p+4)th scanning line, and the (p+7)th scanning line (see FIG. 15). The (p+2)th scanning line, the (p+3)th, the (p+5)th, and the (p+6)th scanning lines, which are to be scanned in the second field of the x-th frame, are not scanned.

In this way, the scanning line drive circuit 6 scans the first scanning line through the p-th scanning line every two scanning lines. That is, the scanning line drive circuit 6 repeatedly carries out, with respect to all scanning lines, scanning and non-scanning every two scanning lines, and switches, every field, which scanning lines to be scanned.

The signal line drive circuit 8 applies data signals in such a manner that polarities of the data signals are alternately inverted in each set of four sub-pixels which constitute a main pixel and are adjacent to one another in the row direction, and inverts polarities of data signals every main pixel in the row direction. Further, the signal line drive circuit 8 inverts polarities of data signals every two sub-pixels defined by scanning lines which are adjacent to each other in the column direction and are sandwiched between scanning lines which are not scanned. Furthermore, the signal line drive circuit 8 applies a data signal to the same sub-pixel so that a polarity of the data signal is inverted on a frame-by-frame basis.

With this arrangement, the polarity of a data signal to be applied to each sub-pixel in the first field of the (x+1)th frame is opposite to that of a data signal which has been applied to the each sub-pixel in the first field of the x-th frame (see FIG. 15). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to that of a data signal which has been applied to the each selection pixel in a previous field before the certain field where the selection pixels have been selected.

Embodiment 3

Embodiment 1 has discussed an example where four sub-pixels constituting a main pixel are arranged such that two sub-pixels are adjacent to each other in the row direction and two sub-pixels are adjacent to each other in the column direction. The present invention is, however, not limited to such an arrangement. For example, it is possible to employ such an arrangement that three sub-pixels are arranged in line in the row direction to constitute a main pixel.

The following description will discuss, with reference to FIGS. 16 through 21, a liquid crystal display device in accordance with still another embodiment of the present invention.

(Arrangement of Pixels)

The following description will discuss, with reference to FIG. 16, an arrangement of three sub-pixels which (i) constitute a main pixel and (ii) are included in a display panel 2 of a liquid crystal display device 1 of Embodiment 3. FIG. 16 is a view illustrating an arrangement of three pixels which (i) constitute a main pixel and (ii) are included in the display panel 2 of the liquid crystal display device 1 of Embodiment 3.

A main pixel includes three sub-pixels, namely, a sub-pixel R, a sub-pixel G, and a sub-pixel B as illustrated in FIG. 16. Further, the three sub-pixels are arranged in line in the row direction. For example, the sub-pixel R, the sub-pixel G, and the sub-pixel B are adjacent to one another in the row direction in this order (see FIG. 16).

Embodiment 3 will discuss an example arrangement in which the sub-pixel R, the sub-pixel G, and the sub-pixel B are adjacent to one another in the row direction in this order. The present invention is, however, not limited to such an arrangement. There are three factorial combinations (i.e., six combinations) for the arrangement of the three sub-pixels, and it is possible to employ any one of the combinations. For example, it is possible to employ such an arrangement that the sub-pixel R, the sub-pixel B, and the sub-pixel G are adjacent to one another in the row direction in this order.

[One-Line Interlace Driving and One-Dot Reversal Driving]

Figure 17:
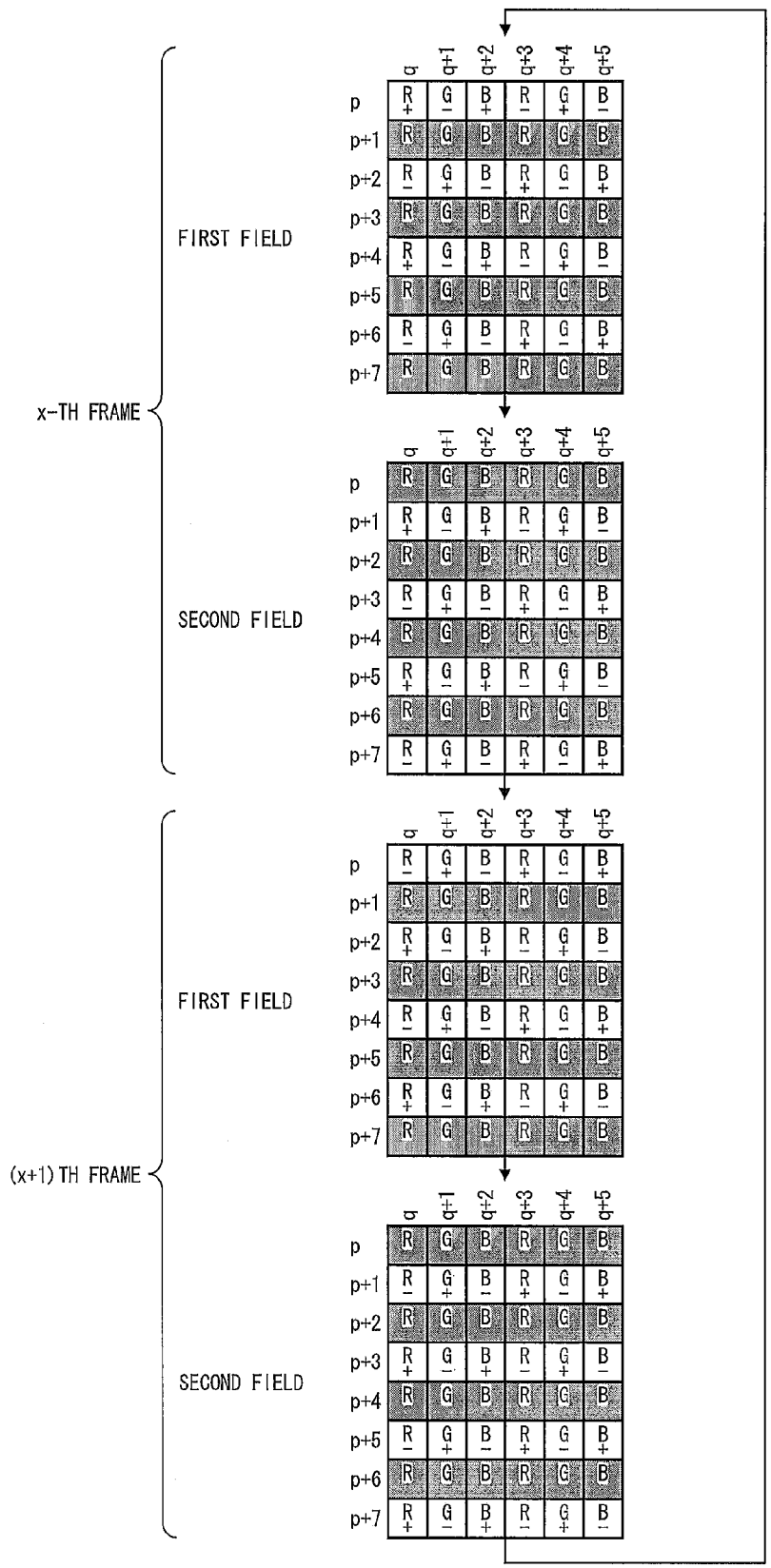
FIG. 17 is a transitional diagram schematically illustrating how a polarity of each sub-pixel is changed in a case where one-dot reversal driving is carried out while one-line interlace driving is carried out in a liquid crystal display device in accordance with still another embodiment of the present invention.

The following description will first discuss, with reference to FIG. 17, a case where in the first display mode, one-line interlace driving (n=1) and one-dot reversal driving (m=1) are carried out. FIG. 17 is a transitional diagram schematically illustrating how a polarity of each sub-pixel is changed in a case where one-dot reversal driving and one-line interlace driving are carried out in the liquid crystal display device 1 of Embodiment 3.

In order to carry out the one-line interlace driving, a p-th scanning line, a (p+2)th scanning line, a (p+4)th scanning line, and a (p+6)th scanning line are scanned in a first field as illustrated in FIG. 17. Further, a (p+1)th scanning line, a (p+3)th scanning line, a (p+5)th scanning line, and a (p+7)th scanning line are scanned in a second field. That is, the scanning lines are scanned every other scanning line in both the first field and the second field.

(x-Th Frame)

As illustrated in FIG. 17, a scanning line drive circuit 6 sequentially drives the p-th scanning line, the (p+2)th scanning line, the (p+4)th scanning line, and the (p+6)th scanning line in a first field of an x-th frame. Here, the scanning line drive circuit 6 does not carry out scanning of the (p+1)th, the (p+3)th, the (p+5)th, and the (p+7)th scanning lines which are to be scanned in a second field of the x-th frame. In this way, the scanning line drive circuit 6 scans the first scanning line through the P-th scanning line every other scanning line.

As illustrated in FIG. 17, in a case where the scanning line drive circuit 6 scans the p-th scanning line in the first field of the x-th frame, a signal line drive circuit 8 supplies data signals having the positive polarity to the q-th data signal line, to the (q+2)th data signal line, and to the (q+4)th data signal line. Further, the signal line drive circuit 8 supplies data signals having the negative polarity to the (q+1)th data signal line, to the (q+3)th data signal line, and to the (q+5)th data signal line.

Further, in a case where the scanning line drive circuit 6 scans the (p+2)th scanning line in the first field of the x-th frame, a signal line drive circuit 8 supplies data signals having the negative polarity to the q-th data signal line, to the (q+2)th data signal line, and to the (q+4)th data signal line. Further, the signal line drive circuit 8 supplies data signals having the positive polarity to the (q+1)th data signal line, to the (q+3)th data signal line, and to the (q+5)th data signal line.

In this example, in a case where the scanning line drive circuit 6 scans the (p+2)th scanning line, the signal line drive circuit 8 applies data signals (described above) having a polarity inverted every sub-pixel in the row direction. Further, in a case where the scanning line drive circuit 6 scans the (p+2)th scanning line, the signal line drive circuit 8 applies data signals having polarity opposite to that of data signals which have been applied when the p-th scanning line.

The scanning line drive circuit 6 and the signal line drive circuit 8 each carry out driving as described above, so that data signals having the positive polarity are applied to the (p, q)th sub-pixel R and the (p, q+2)th sub-pixel B in the first field of the x frame (see FIG. 17). Further, data signals having the negative polarity are applied to the (p+2, q)th sub-pixel R, the (p, q+3)th sub-pixel R, the (p+2, q+2)th sub-pixel B, and the (p, q+5)th sub-pixel B (see FIG. 17).

Moreover, a data signal having the negative polarity is applied to a sub-pixel G at (p, q+1), and data signals having the positive polarity are applied to a sub-pixel G at (p+2, q+1) and a sub-pixel G at (p, q+4) (see FIG. 17).

That is, the signal line drive circuit 8 carries out driving in such a manner that polarities of data signals, to be applied to every adjacent sub-pixels defined by scanning lines scanned in the first field, are inverted. The signal line drive circuit 8 further carries out driving in such a manner that, among sub-pixels defined by scanning lines scanned in the first field, polarities of data signals to be applied to the sub-pixels which display the identical color are inverted every sub-pixel.

Similarly, in the second field of the x-th frame, data signals having the positive polarity are applied to the (p+1, q)th sub-pixel R and the (p+1, q+2)th sub-pixel B (see FIG. 17). Further, data signals having the negative polarity are applied to the (p+3, q)th sub-pixel R, the (p+1, q+3)th sub-pixel R, the (p+3, q+2)th sub-pixel B, and the (p+1, q+5)th sub-pixel B (see FIG. 17).

Moreover, a data signal having the negative polarity is applied to a sub-pixel G at (p+1, q+1), and data signals having the positive polarity are applied to a sub-pixel G at (p+3, q+1) and a sub-pixel G at (p, q+4) (see FIG. 17).

In other words, in each field, the signal line drive circuit 8 inverts polarities of data signals every one sub-pixel in both the row and column directions (i.e., a group of 1×1 selected pixel is determined as a set).

((x+1)th Frame)

In the first field of an (x+1)th frame, the polarity of a data signal which is applied to each sub-pixel is opposite to that of a data signal which has been applied to the each sub-pixel in the first field of the x-th frame (see FIG. 17). Moreover, in the second field of the (x+1)th frame, the polarity of a data signal which is applied to each sub-pixel is opposite to that of a data signal which has been applied to the each sub-pixel in the second field of the x-th frame.

That is, the polarity of a data signal which is applied to each selection pixel in a certain field is inverted with respect to that of a data signal which has been applied to the each selection pixel in a previous field before the certain field where the selection pixels have been selected.

(Timing of Scanning Signal and Data Signal)

The following description will discuss a timing of a scanning signal and a data signal in this example.

At a substantially same time as the p-th scanning line is selected (time t15), data signals having polarities as illustrated in FIG. 17 are started to be supplied to data signal lines in the first field of the x-th frame. Potentials of the data signals thus supplied become 0 V at a substantially same time as the selection of the p-th scanning line ends, and remain 0 V until the (p+2)th scanning line is selected.

At a substantially same time as the (p+2)th scanning line is selected, supply of data signals to data signal lines is started, which data signals have polarities opposite to that of the data signals which have been supplied at the time t15. Potentials of the data signals supplied to the data signal lines become 0 V at a substantially same time as the selection of the (p+2)th scanning line ends.

At a substantially same time as the (p+1)th scanning line is selected (time t16), data signals having polarities as illustrated in FIG. 17 is started to be supplied to data signal lines in the second field of the x-th frame. Potentials of the data signals thus supplied become 0 V at a substantially same time as the selection of the (p+1)th scanning line ends, and remain 0 V until the (p+3)th scanning line is selected.

Supply of data signals to data signal lines is started at a substantially same time as the (p+3)th scanning line is selected, which data signals have polarities opposite to that of the data signals which have been supplied at the time t16. Potentials of the data signals supplied to the data signal lines become 0 V at a substantially same time as the selection of the (p+3)th scanning line ends.

Similarly, at a substantially same time as the scanning lines are sequentially selected, supply of data signals to data signal lines is sequentially started in the first field (or the second field) of the (x+1)th frame, which data signals have polarities opposite to those of the data signals which have been supplied in the first field (or the second field) of the x-th frame. Potentials of the data signals supplied to the data signal lines become 0 V at a substantially same time as the selection of each of the scanning lines ends.

The above arrangement allows the liquid crystal display device 1 to, when it is not required to carry out display with high quality, simultaneously (i) use interlace driving for power consumption reduction and (ii) display a color image based on a mixture of three colors.

In the case where the above predetermined number is 3, the pixels for displaying the individual colors each display either tone 0 or tone 1. The predetermined number being 3 allows a total of eight colors to be displayed. Similarly, in the case where the above predetermined number is 5, the pixels each display one of tone 0, tone 1, tone 2, and tone 3. The predetermined number being 5 allows a total of 64 colors to be displayed.

[One-Line Interlace Driving and Two-Dot Reversal Driving]

Figure 18:
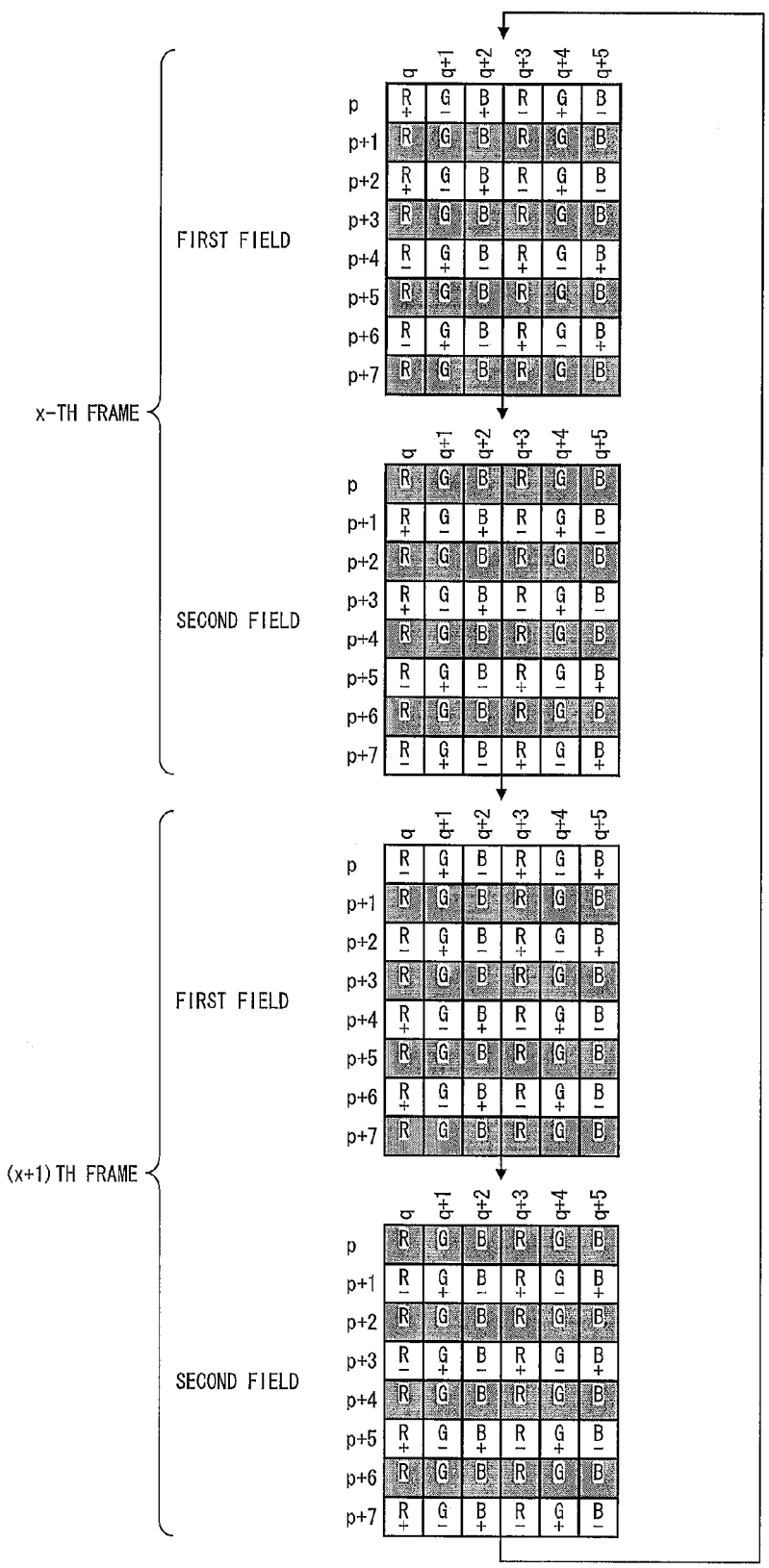
FIG. 18 is a transitional diagram schematically illustrating how a polarity of each sub-pixel is changed in a case where two-dot reversal driving is carried out while one-line interlace driving is carried out in a liquid crystal display device in accordance with still another embodiment of the present invention.

The following description will discuss, with reference to FIG. 18, a case where in the first display mode, one-line interlace driving (n=1) and two-dot reversal driving (m=2) are carried out. FIG. 18 is a transitional diagram schematically illustrating how a polarity of each sub-pixel is changed in the liquid crystal display device 1 of Embodiment 3 in a case where one-line interlace driving and two-dot reversal driving are carried out.

The scanning line drive circuit 6 sequentially scans the p-th, the (p+2)th, the (p+4)th, and the (p+6)th scanning lines in a first field of the x-th frame, as illustrated in FIG. 18. The (p+1)th, the (p+3)th, the (p+5)th, and the (p+7)th scanning lines, which are to be scanned in the second field, are not scanned.

In this way, the scanning line drive circuit 6 scans the first scanning line through the P-th scanning line every other scanning line. That is, the scanning line drive circuit 6 repeatedly carries out, with respect to all scanning lines, scanning and non-scanning every other scanning line, and switches, every field, which scanning lines to be scanned.

At this time, in each field, the signal line drive circuit 8 inverts polarities of data signals every sub-pixel in the row direction, and inverts polarities of data signals every two sub-pixels which are adjacent to each other in the column direction (see FIG. 18). Moreover, the signal line drive circuit 8 inverts polarities of data signals to be applied to sub-pixels on a frame-by-frame basis.

In other words, the signal line drive circuit 8 inverts, in each field, polarities of data signals every two sub-pixels in both the row and column directions, which two sub-pixels are constituted by (i) one sub-pixel in the row direction and (ii) two sub-pixels in the column direction (i.e., a group of 1×2 selected pixels is determined as a set).

With this arrangement, the polarity of a data signal to be applied to each sub-pixel in the first field of the (x+1)th frame is opposite to that of the data signal which has been applied to the each sub-pixel in the first field of the x-th frame (see FIG. 18). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

(Timing of Scanning Signal and Data Signal)

The following description will discuss timing of scanning signals and data signals in the above example.

At a substantially same time as the p-th scanning line is selected (time t17), data signals having polarities as illustrated in FIG. 18 are started to be supplied to data signal lines in the first field of the x-th frame. Potentials of data signals to be supplied to each data signal line become 0 V at a substantially same time as the p-th scanning line is selected, and remain 0 V until the selection of the (p+2)th scanning line ends.

At a substantially same time as the (p+2)th scanning line is selected, supply of data signals to data signal lines is started, which data signals have the same polarity as the data signals which have been supplied at the time t17. Potentials of data signals supplied to the data signal line in the (p+2)th scanning line become 0 V at a substantially same time as the selection of the (p+2)th scanning line ends.

At a substantially same time as the (p+1)th scanning line is selected (time t18), data signals having polarities as illustrated in FIG. 18 are started to be supplied to data signal lines in the second field of the x-th frame. Potentials of the data signals to be supplied to each data signal lines become 0 V at a substantially same time as the selection of the (p+1)th scanning line ends, and remain 0 V until the (p+3)th scanning line is selected.

Supply of data signals to data signal lines is started at a substantially same time as the (p+3)th scanning line is selected, which data signals have the same polarity as data signals which have been supplied at the time t18. Potentials of the data signals supplied to the data signal lines become 0 V at a substantially same time as the selection of the (p+3)th scanning line ends.

Similarly, at a substantially same time as the scanning lines are sequentially selected, supply of data signals to data signal lines is sequentially started in the first field (or the second field) of the (x+1)th frame, which data signals have polarities opposite to that of the data signals which have been supplied in the first field (or the second field) of the x-th frame. Potentials of the data signals supplied to the data signal lines become 0 V at a substantially same time as the selection of each of the scanning lines ends.

[Two-Line Interlace Driving, One-Dot Reversal Driving]

Figure 19:
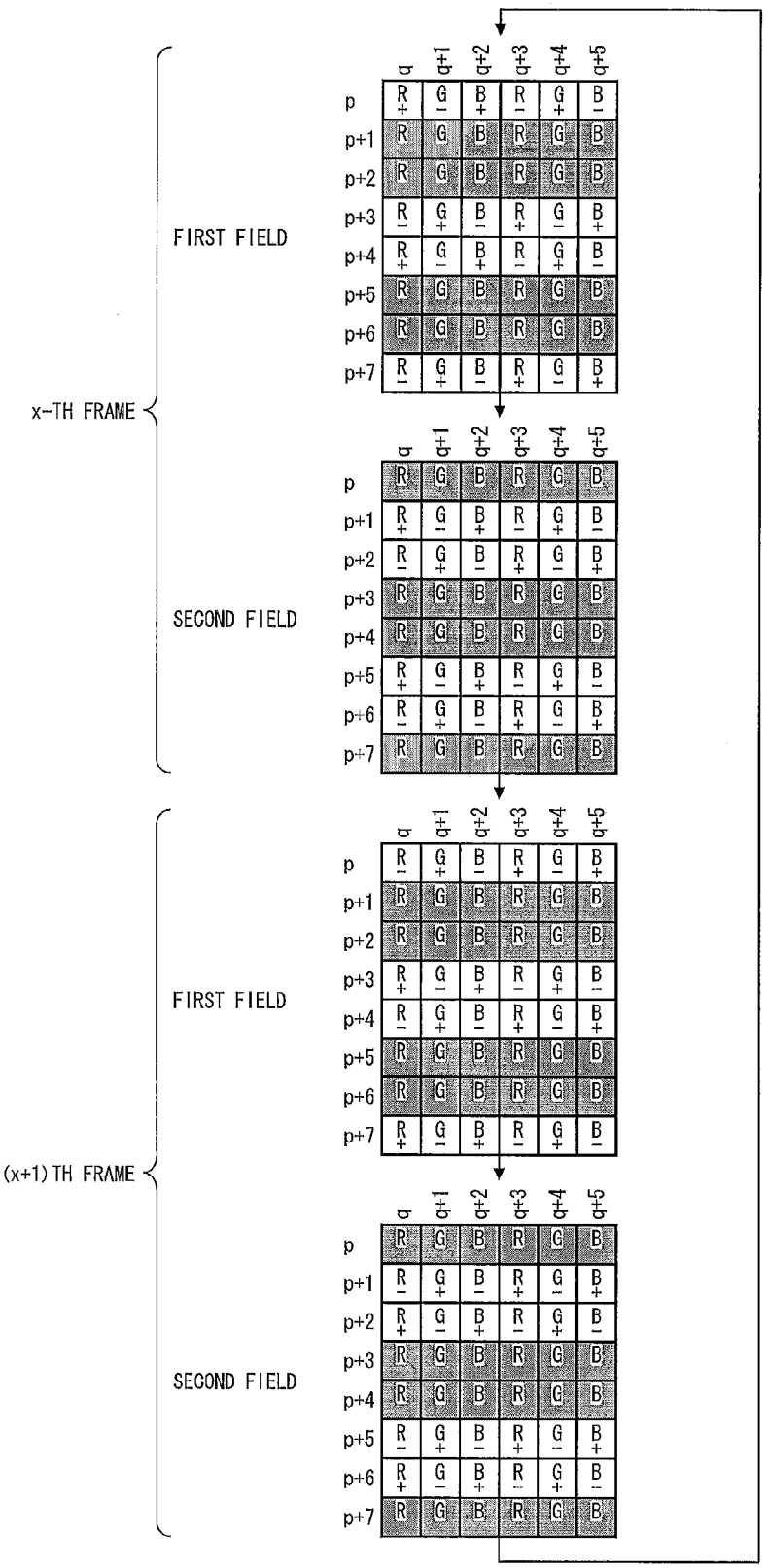
FIG. 19 is a transitional diagram schematically illustrating how a polarity of each sub-pixel is changed in a case where one-dot reversal driving is carried out while two-line interlace driving is carried out in a liquid crystal display device in accordance with still another embodiment of the present invention.

The following description will discuss, with reference to FIG. 19, a case where in the first display mode, two-line interlace driving (n=2) and one-dot reversal driving (m=1) are carried out. FIG. 19 is a transitional diagram schematically illustrating how a polarity of each sub-pixel is changed in the liquid crystal display device 1 of Embodiment 3 in a case where two-line interlace driving and one-dot reversal driving are carried out.

The scanning line drive circuit 6 sequentially scans the p-th, the (p+3)th, the (p+4)th, and the (p+7)th scanning lines in a first field of the x-th frame, as illustrated in FIG. 19. The scanning line drive circuit 6 does not carry out scanning of the (p+1)th, the (p+2)th, the (p+5)th, and the (p+6)th scanning lines which are to be scanned in the second field.

In this way, the scanning line drive circuit 6 scans the first scanning line through the P-th scanning line every two scanning lines. That is, the scanning line drive circuit 6 repeatedly carries out, with respect to all scanning lines, scanning and non-scanning every two scanning lines, and switches, every field, which scanning lines to be scanned.

At this time, the signal line drive circuit 8 (i) applies data signals in such a manner that polarities of the data signals are alternately inverted in each set of three sub-pixels which constitute a main pixel and are adjacent to one another in the row direction, and (ii) inverts polarities of data signals every main pixel in the row direction. Further, the signal line drive circuit 8 inverts polarities of data signals every sub-pixel in the column direction among sub-pixels defined by scanning lines to be scanned in each field.

Therefore, as illustrated in FIG. 19, the signal line drive circuit 8 inverts polarities of data signals so that the polarities are alternatively inverted in each set of sub-pixels which are adjacent in the row and column directions. Moreover, the signal line drive circuit 8 inverts polarities of data signals to be applied to sub-pixels on a frame-by-frame basis.

In other words, in each field, the signal line drive circuit 8 inverts polarities of data signals every one sub-pixel in both the row and column directions (i.e., a group of 1×1 selected pixel is determined as a set).

With this arrangement, the polarity of a data signal to be applied to each sub-pixel in the first field of the (x+1)th frame is opposite to that of the data signal which has been applied to the each sub-pixel in the first field of the x-th frame (see FIG. 19). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

(Timing of Scanning Signal and Data Signal)

The following description will discuss a timing of a scanning signal and a data signal in this example.

At a substantially same time as selection of the p-th scanning line (time t19), data signals having polarities as illustrated in FIG. 19 are started to be supplied to the data signal lines in the first field of the x-th frame. Potentials of the data signals supplied to the data signal lines become 0 V at a substantially same time as the selection of the p-th scanning line ends, and remain 0 V until the (p+3)th scanning line is selected.

At a substantially same time as the (p+3)th scanning line is selected, supply of data signals to the data signal lines is started, which data signals have polarities opposite to those of data signals which have been supplied at the time t19. Potentials of the data signal supplied to the data signal lines become 0 V at a substantially same time as the selection of the (p+4)th scanning line subsequent to the (p+3)th scanning line ends.

At a substantially same time as the (p+1)th scanning line is selected, data signals having polarities illustrated in FIG. 19 are started to be supplied to the data signal lines in the second field of the x-th frame. Potentials of the data signals supplied to the data signal lines become 0 V at a substantially same time as the selection of the (p+2)th scanning line subsequent to the (p+1)th scanning line ends, and remain 0 V until the (p+5)th scanning line is selected.

Similarly, at a substantially same time as scanning lines are sequentially selected, supply of data signals to data signal lines in the first field (or the second field) of the (x+1)th frame is started, which data signals have polarities opposite to those of the data signals which have been supplied in the first field (or the second field) of the x-th frame. Potentials of the data signals supplied to the data signal lines become 0 V at a substantially same time as the selection of each of the scanning lines ends.

[Two-Line Interlace Driving, Two-Dot Reversal Driving]

Figure 20:
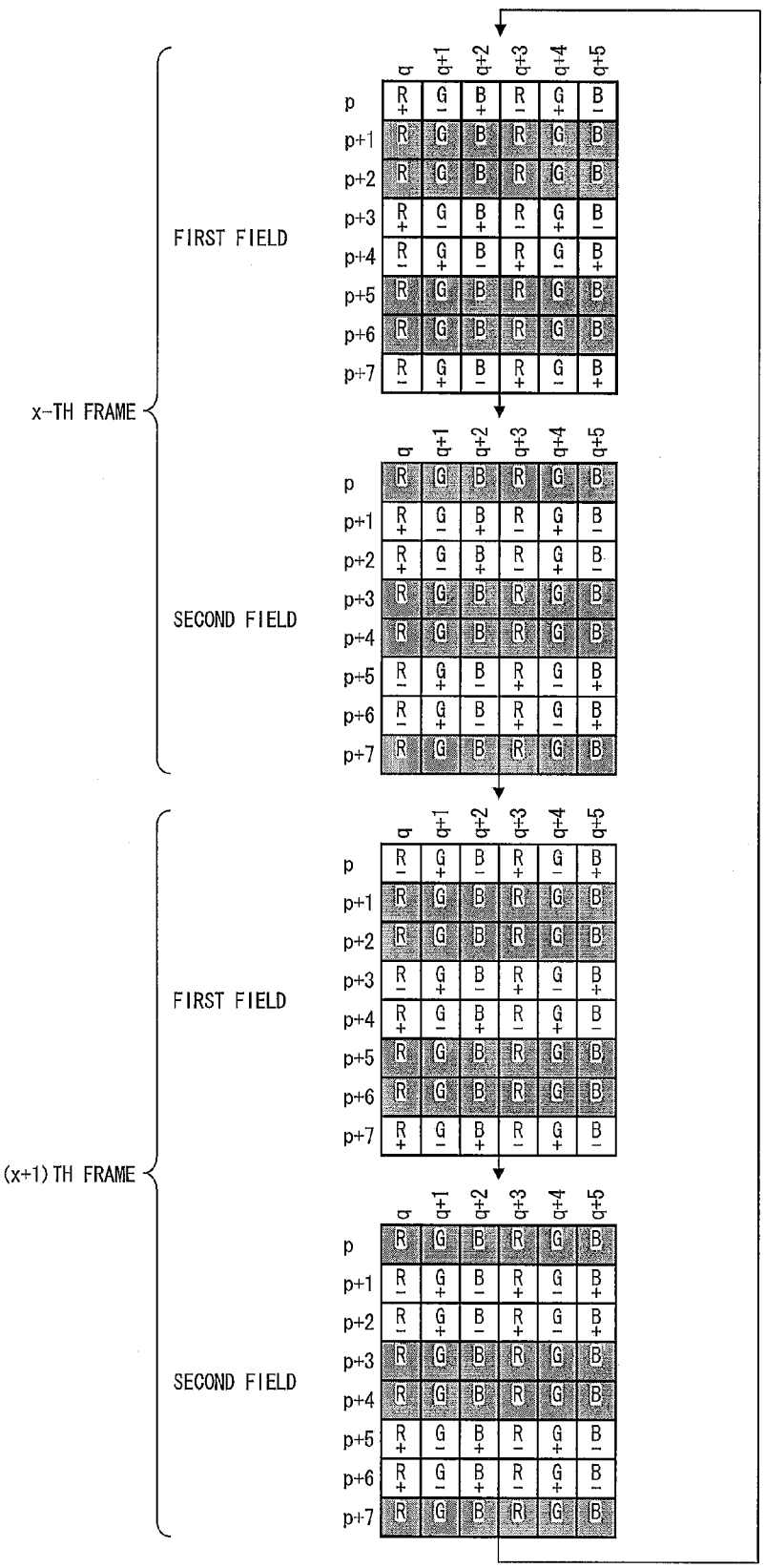
FIG. 20 is a transitional diagram schematically illustrating how a polarity of each sub-pixel is changed in a case where two-dot reversal driving is carried out while two-line interlace driving is carried out in a liquid crystal display device in accordance with still another embodiment of the present invention.

The following description will discuss, with reference to FIG. 20, a case where in the first display mode, the two-line interlace driving (n=2) and the two-dot reversal driving (m=2) are carried out. FIG. 20 is a transitional diagram schematically illustrating how a polarity of each sub-pixel is changed in a case where the two-line interlace driving and the two-dot reversal driving are carried out in the liquid crystal display device 1 of Embodiment 3.

The scanning line drive circuit 6 sequentially scans, in the first field of the x-th frame, the p-th scanning line, the (p+3)th scanning line, the (p+4)th scanning line, and the (p+7)th scanning line (see FIG. 20). The scanning line drive circuit 6 does not carry out scanning of the (p+1)th scanning line, the (p+2)th scanning line, the (p+5)th scanning line, and the (p+6)th scanning line which are to be scanned in the second field.

In this way, the scanning line drive circuit 6 scans the first scanning line through the P-th scanning line every two scanning lines. That is, the scanning line drive circuit 6 repeatedly carries out, with respect to all scanning lines, scanning and non-scanning every two scanning lines, and switches, every field, which scanning lines to be scanned.

At this time, the signal line drive circuit 8 applies data signals in such a manner that polarities of the data signals are alternately inverted in each set of three sub-pixels which constitute a main pixel and are adjacent to one another in the row direction, and inverts polarities of data signals every main pixel in the row direction. Further, the signal line drive circuit 8 inverts polarities of data signals every two sub-pixels which are adjacent in the column direction among sub-pixels defined by scanning lines to be scanned in each field.

Therefore, the signal line drive circuit 8 inverts polarities of data signals every sub-pixel among sub-pixels adjacent to one another in the row direction, and inverts polarities of data signals every two adjacent sub-pixels among sub-pixels in the column direction (see FIG. 20). Moreover, the signal line drive circuit 8 inverts polarities of data signals to be applied to sub-pixels on a frame-by-frame basis.

In other words, in each field, the signal line drive circuit 8 inverts polarities of data signals every two pixels in both the row and column directions, which two pixels are constituted by (i) one sub-pixel in the row direction and (ii) two sub-pixels in the column direction (i.e., a group of 1×2 selected pixels is determined as a set).

With this arrangement, the polarity of a data signal to be applied to each sub-pixel in the first field of the (x+1)th frame is opposite to that of the data signal which has been applied to the each sub-pixel in the first field of the x-th frame (see FIG. 20). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

(Timing of Scanning Signal and Data Signal)

The following description will discuss timing of scanning signals and data signals in the above example.

At a substantially same time as the p-th scanning line is selected (time t20), data signals having polarities as illustrated in FIG. 20 are started to be supplied to data signal lines in the first field of the x-th frame. Potentials of data signals to be supplied to each data signal line become 0 V at a substantially same time as the selection of the p-th scanning line ends, and remain 0 V until the (p+3)th scanning line is selected.

At a substantially same time as the (p+3)th scanning line is selected, supply of data signals to data signal lines is started, which data signals have the same polarity as the data signals which have been supplied at the time t20. Potentials of data signals supplied to the data signal line become 0 V at a substantially same time as the selection of the (p+4)th scanning line subsequent to the (p+3)th scanning line ends.

At a substantially same time as the (p+1)th scanning line is selected, data signals having polarities as illustrated in FIG. 20 are started to be supplied to data signal lines in the second field of the x-th frame. Potentials of the data signals to be supplied to each data signal lines become 0 V at a substantially same time as the selection of the (p+2)th scanning line subsequent to the (p+1)th scanning line ends, and remain 0 V until the (p+5)th scanning line is selected.

Similarly, at a substantially same time as the scanning lines are sequentially selected, supply of data signals to data signal lines is sequentially started in the first field (or the second field) of the (x+1)th frame, which data signals have polarities opposite to that of the data signals which have been supplied in the first field (or the second field) of the x-th frame. Potentials of the data signals supplied to the data signal lines become 0 V at a substantially same time as the selection of each of the scanning lines ends.

Embodiment 3 has described the case where (i) the two-line interlace driving and the two-dot reversal driving are carried out and (ii) the signal line drive circuit 8 inverts, in the column direction, polarities of data signals every two sub-pixels defined by scanning lines (e.g., the p-th scanning line and the (p+3)th scanning line in FIG. 20), which have not been scanned in the first field of each frame and sandwich adjacent two scanning lines. The present invention is, however, not limited to such an arrangement.

For example, the signal line drive circuit 8 may be configured to apply data signals, which have the same polarity, to two sub-pixels which (i) are defined by scanning lines sandwiched between two scanning lines that are not scanned in the first field in each frame and (ii) are adjacent to each other in the column direction. In other words, the signal line drive circuit 8 may invert, in the column direction, polarities of data signals every two adjacent sub-pixels which are defined by scanning lines sandwiched between two scanning lines that are not scanned in the first field of each frame.

Figure 21:
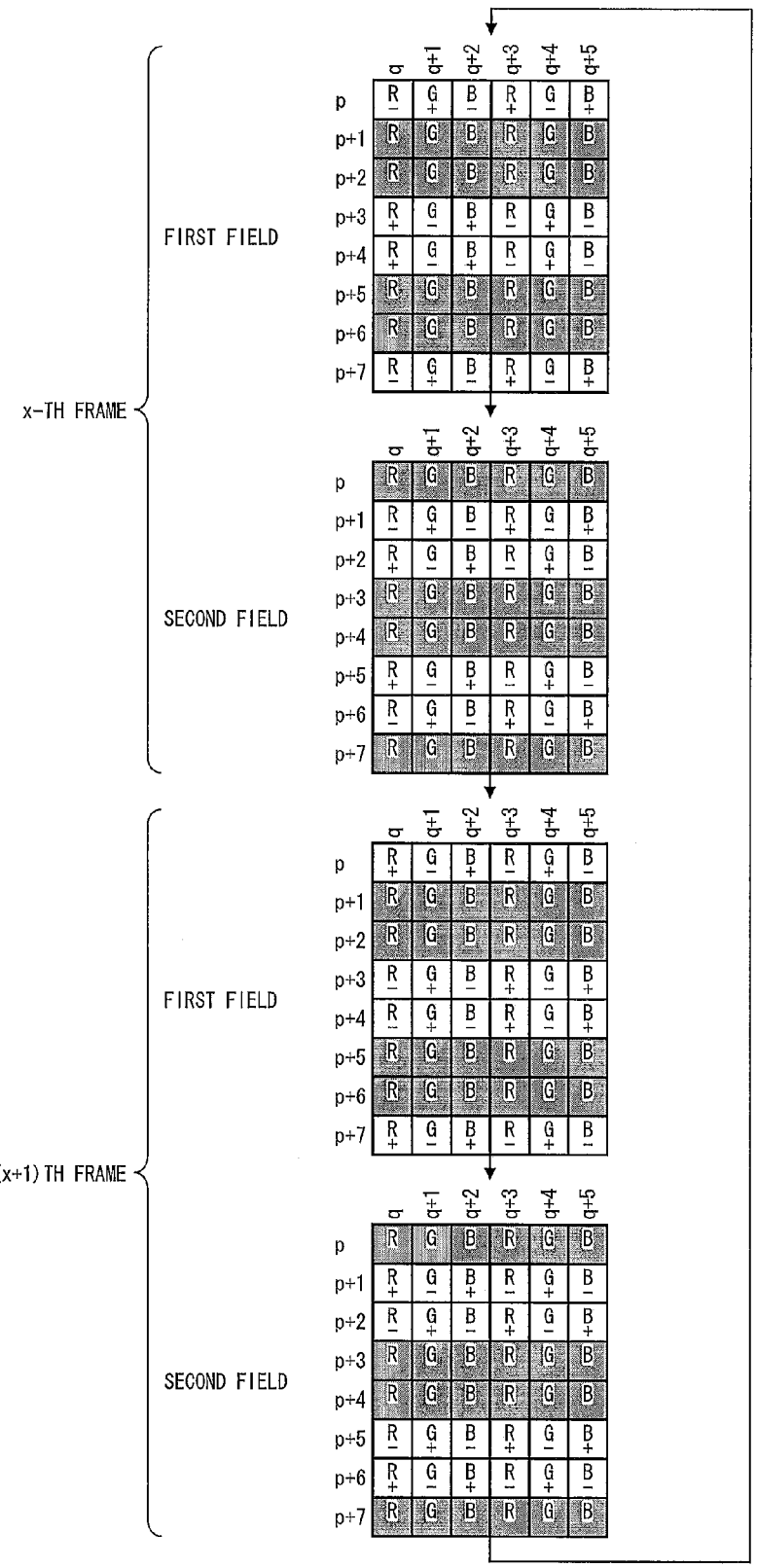
FIG. 21 is a transitional diagram schematically illustrating how a polarity of each sub-pixel is changed in a case where two-dot reversal driving is carried out while two-line interlace driving is carried out in a liquid crystal display device in accordance with still another embodiment of the present invention.

The following description will discuss, with reference to FIG. 21, a case where in the first display mode, (i) the two-line interlace driving and the two-dot reversal driving are carried out and (ii) polarities of data signals to be applied to sub-pixels are inverted, in the column direction, every two adjacent sub-pixels defined by scanning lines that are sandwiched between two scanning lines which have not been scanned in the first field of each frame. FIG. 21 is a transitional diagram schematically illustrating how a polarity of each sub-pixel is changed in a case where (i) the two-line interlace driving and the two-dot reversal driving are carried out in the liquid crystal display device 1 of Embodiment 3, and (ii) polarities of data signals applied to sub-pixels are inverted, in the column direction, every two adjacent sub-pixels which are defined by scanning lines sandwiched between two scanning lines which are not scanned in the first field of each frame.

In order to carry out the two-line interlace driving, the scanning line drive circuit 6 sequentially scans, in the first field of the x-th frame, the p-th scanning line, the (p+3)th scanning line, the (p+4)th scanning line, and the (p+7)th scanning line (see FIG. 21). The (p+2)th, the (p+3)th, the (p+5)th, and the (p+6)th scanning lines, which are to be scanned in the second field of the x-th frame, are not scanned.

In this way, the scanning line drive circuit 6 scans the first scanning line through the p-th scanning line every two scanning lines. That is, the scanning line drive circuit 6 repeatedly carries out, with respect to all scanning lines, scanning and non-scanning every two scanning lines, and switches, every field, which scanning lines to be scanned.

The signal line drive circuit 8 applies data signals in such a manner that polarities of the data signals are alternately inverted in each set of three sub-pixels which constitute a main pixel and which are adjacent to each other in the row direction, and inverts polarities of data signals every main pixel in the row direction. Further, the signal line drive circuit 8 inverts polarities of data signals every two sub-pixels defined by scanning lines which are adjacent to each other in the column direction and are sandwiched between scanning lines which are not scanned.

That is, the signal line drive circuit 8 inverts polarities of data signals so that the polarities are alternately inverted in each set of sub-pixels which are adjacent to each other in the row direction, and inverts polarities of data signals every two adjacent sub-pixels in the column direction (see FIG. 21).

Moreover, the signal line drive circuit 8 inverts polarities of data signals to be applied to sub-pixels on a frame-by-frame basis.

With this arrangement, the polarity of a data signal to be applied to each sub-pixel in the first field of the (x+1)th frame is opposite to that of the data signal which has been applied to the each sub-pixel in the first field of the x-th frame (see FIG. 21). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

Modification Example

Note that, in Embodiment 3, a main pixel may include two sub-pixels, and the two sub-pixels may be adjacent to each other in the row direction. The following description will discuss a modification example of Embodiment 3.

(Arrangement of Pixels)

Figure 22:
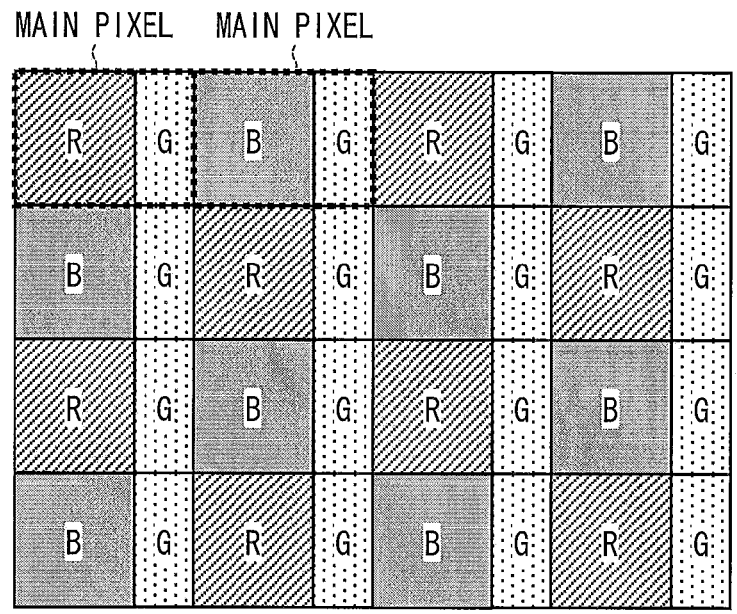
FIG. 22 is a view of an arrangement of two sub-pixels which are included in a display panel of a liquid crystal display device in accordance with further still another embodiment of the present invention and form a main pixel.

The following description will discuss, with reference to FIG. 22, an arrangement of two sub-pixels which (i) constitute a main pixel and (ii) are included in a display panel 2 of a liquid crystal display device 1 of this modification example. FIG. 22 is a view illustrating an arrangement of two pixels which (i) constitute a main pixel and (ii) are included in the display panel 2 of the liquid crystal display device 1 of this modification example.

A certain main pixel includes two sub-pixels, that is, a sub-pixel R and a sub-pixel G, and another main pixel adjacent to the certain main pixel includes another two sub-pixels, that is, a sub-pixel B and a sub-pixel G (see FIG. 22). That is, each main pixel includes (i) a sub-pixel (first pixel) which displays a color different from colors of sub-pixels of an adjacent main pixel and (ii) a sub-pixel (second pixel) which displays the identical color in all main pixels. Note that each of the sub-pixels R and B has a size substantially twice as large as that of the sub-pixel G.

This medication example will discuss a case where each of the sub-pixels R and B has a size substantially twice as large as that of the sub-pixel G. The present invention is, however, not limited to such an arrangement. For example, each of the sub-pixels R and G may have a size substantially twice as large as that of the sub-pixel B. Alternatively, each of the sub-pixels G and B may have a size substantially twice as large as that of the sub-pixel R.

This modification example will discuss a case where two sub-pixels constituting a main pixel are adjacent to each other in the row direction. The present invention is, however, not limited to such an arrangement, and the two sub-pixels may be adjacent to each other in the column direction.

Sub pixels in this modification example can be expressed as follows: a main pixel includes two sub-pixels as a set; two sub-pixels constituting each main picture element display two colors, respectively, of three primary colors; and four sub-pixels constituting adjacent two main picture elements include three sub-pixels which display three primary colors, respectively.

[Two-Line Interlace Driving, Two-Dot Reversal Driving]

The following description will discuss a case where in the first display mode, two-line interlace driving and two-dot reversal driving are carried out in the liquid crystal display device 1 illustrated in FIG. 22.

The scanning line drive circuit 6 sequentially scans, in the first field of the x-th frame, the first scanning line, the fourth scanning line, and the fifth scanning line (not shown) in FIG. 22. The second and the third scanning lines, which are to be scanned in the second field, are not scanned.

In this way, the scanning line drive circuit 6 scans the first scanning line through the P-th scanning line every two scanning lines. That is, the scanning line drive circuit 6 repeatedly carries out, with respect to all scanning lines, scanning and non-scanning every two scanning lines, and switches, every field, which scanning lines to be scanned.

At this time, the signal line drive circuit 8 applies data signals having the same polarity to every two sub-pixels which are adjacent to each other in the row direction, and inverts polarities of data signals every main pixel in the row direction. Further, the signal line drive circuit 8 inverts polarities of data signals every two sub-pixels which are adjacent in the column direction among sub-pixels defined by scanning lines to be scanned in each field.

Therefore, the signal line drive circuit 8 inverts polarities of data signals every main pixel in the row direction, and inverts polarities of data signals every two adjacent sub-pixels in the column direction. Moreover, the signal line drive circuit 8 inverts polarities of data signals to be applied to sub-pixels on a frame-by-frame basis.

In other words, in each field, the signal line drive circuit 8 inverts polarities of data signals every four sub-pixels in both the row and column directions, which four sub-pixels are constituted by (i) two sub-pixels in the row direction and (ii) two sub-pixels in the column direction (i.e., a group of 2×2 selected pixels is determined as a set).

With this arrangement, the polarity of a data signal to be applied to each sub-pixel in the first field of the (x+1)th frame is opposite to that of the data signal which has been applied to the each sub-pixel in the first field of the x-th frame. Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

As above described, two sub-pixels as one unit constitute one main pixel along a scanning line. One sub-pixel of the two sub-pixels constituting a main pixel displays one color of three primary colors. One sub-pixel in each main pixel (picture elements) displays the identical color. The other one sub-pixel of the two sub-pixels in the main pixel displays a color different from a color of a sub-pixel in an adjacent main pixel so that the other one sub-pixel and its adjacent sub-pixel have different colors (i.e., two different colors are alternately displayed by two sub-pixels in adjacent main pixels). That is, the other one sub-pixel displays one of the other two colors, which are not displayed by the second pixel, of the three primary colors. With this arrangement, it is possible to display a color image by mixing three colors, while suppressing power consumption and flickers.

Embodiment 4

Embodiment 1 has described a case where four sub-pixels constituting a main pixel are arranged such that two sub-pixels are aligned in the row direction and the other two sub-pixels are aligned in the column direction. The present invention is, however, not limited to such an arrangement. For example, each main pixel may include three sub-pixels that are aligned in the column direction.

(Arrangement of Pixels)

Figure 23:
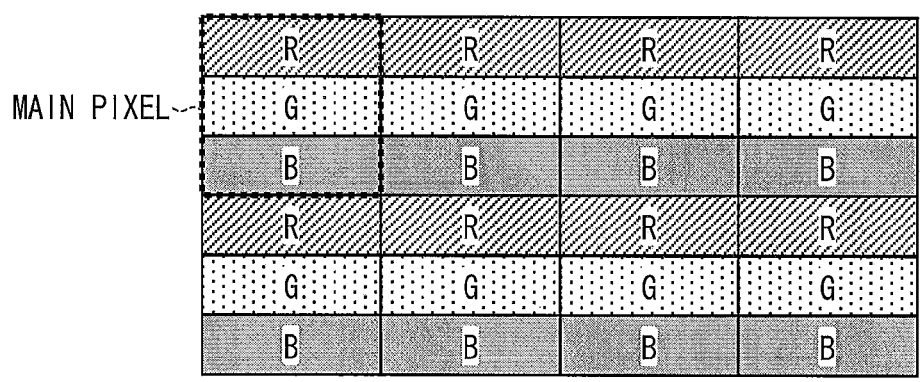
FIG. 23 is a view of an arrangement of three sub-pixels which are included in a display panel of a liquid crystal display device in accordance with further still another embodiment of the present invention and form a main pixel.

The following description will discuss, with reference to FIG. 23, an arrangement of three sub-pixels which (i) constitute a main pixel and (ii) are included in a display panel 2 of a liquid crystal display device 1 of Embodiment 4. FIG. 23 is a view illustrating an arrangement of two pixels which (i) constitute a main pixel and (ii) are included in the display panel 2 of the liquid crystal display device 1 of Embodiment 3.

The following description will discuss, with reference to FIGS. 23 through 27, a liquid crystal display device in accordance with yet another embodiment of the present invention.

A main pixel includes three sub-pixels, that is, a sub-pixel R, a sub-pixel G, and a sub-pixel B as illustrated in FIG. 23. The three sub-pixels are aligned in the column direction in an order of, for example, the sub-pixel R, the sub-pixel G, and the sub-pixel B in the column direction as illustrated in FIG. 23.

Embodiment 4 will discuss a case where the sub-pixel R, the sub-pixel G, and the sub-pixel B are arranged in this order in the row direction. The present invention is, however, not limited to such an arrangement. The three sub-pixels can be arranged in three factorial combinations, that is, in six combinations. For example, the sub-pixel R, the sub-pixel B, and the sub-pixel G may be adjacent to one another in this order in the row direction.

[One-Line Interlace Driving and One-Dot Reversal Driving]

Figure 24:
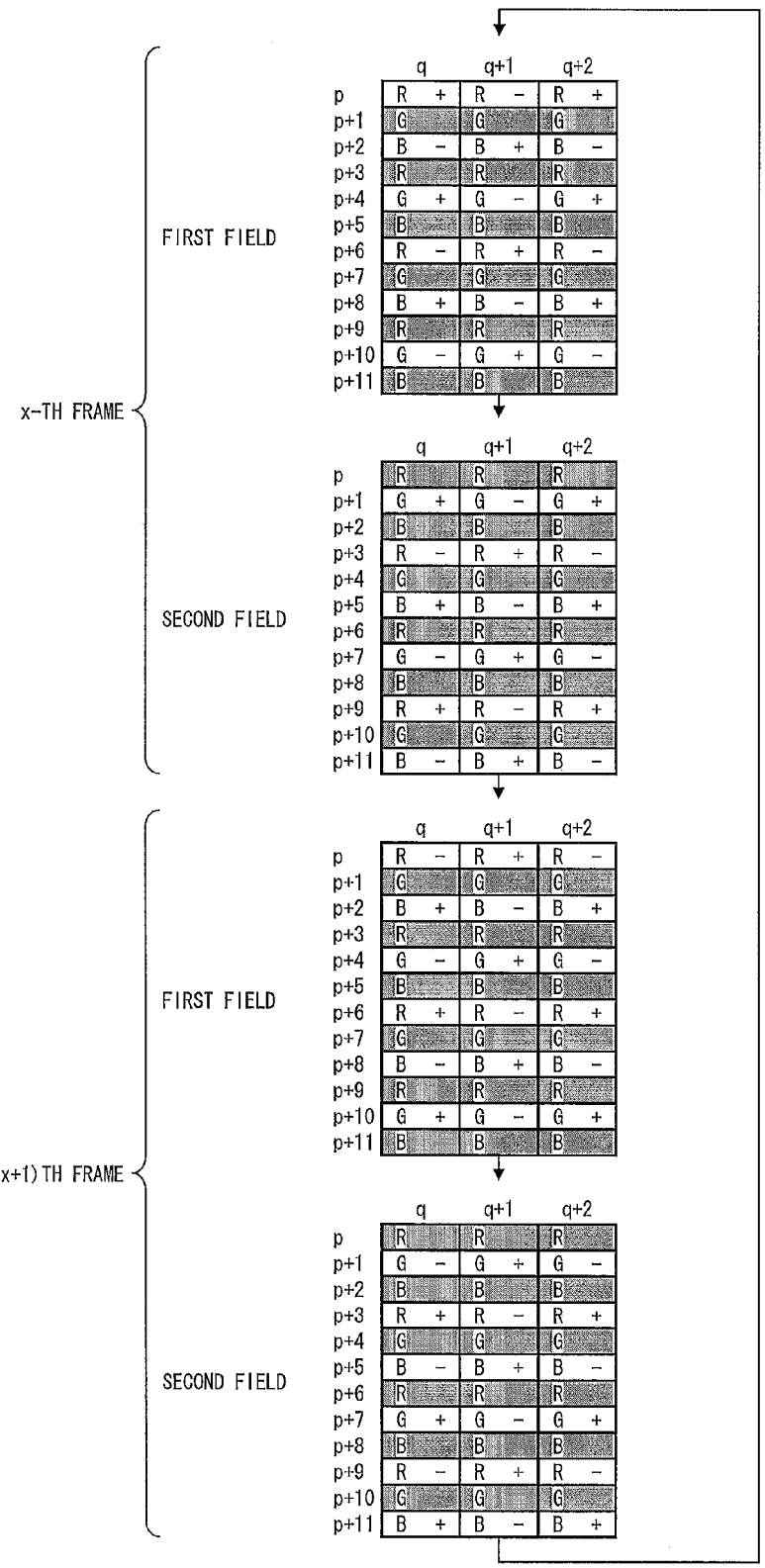
FIG. 24 is a transitional diagram schematically illustrating how a polarity of each sub-pixel is changed in a case where one-dot reversal driving is carried out while one-line interlace driving is carried out in a liquid crystal display device in accordance with still another embodiment of the present invention.

The following description will first discuss, with reference to FIG. 24, a case where in the first display mode, one-line interlace driving (n=1) and one-dot reversal driving (m=1) are carried out. FIG. 24 is a transitional diagram schematically illustrating how a polarity of each sub-pixel is changed in a case where one-dot reversal driving and one-line interlace driving are carried out in the liquid crystal display device 1 of Embodiment 4.

In order to carry out the one-line interlace driving, a p-th scanning line, a (p+2)th scanning line, a (p+4)th scanning line, a (p+6)th scanning line, a (p+8)th scanning line, and a (p+10)th scanning line are scanned in a first field as illustrated in FIG. 24. Further, a (p+1)th scanning line, a (p+3)th scanning line, a (p+5)th scanning line, a (p+7)th scanning line, a (p+9)th scanning line, and a (p+11)th scanning line are scanned in a second field. That is, the scanning lines are scanned every other scanning line in both the first field and the second field.

(x-Th Frame)

As illustrated in FIG. 24, a scanning line drive circuit 6 sequentially drives the p-th scanning line, the (p+2)th scanning line, the (p+4)th scanning line, the (p+6)th scanning line, the (p+8)th scanning line, and the (p+10)th scanning line in a first field of an x-th frame. Here, the scanning line drive circuit 6 does not carry out scanning of the (p+1)th, the (p+3)th, the (p+5)th, and the (p+7)th, the (p+9)th, and the (p+11)th scanning lines which are to be scanned in a second field of the x-th frame. In this way, the scanning line drive circuit 6 scans the first scanning line through the P-th scanning line every other scanning line.

As illustrated in FIG. 24, in a case where the scanning line drive circuit 6 scans the p-th scanning line in the first field of the x-th frame, a signal line drive circuit 8 supplies data signals having the positive polarity to the q-th data signal line and to the (q+2)th data signal line. Further, the signal line drive circuit 8 supplies data signals having the negative polarity to the (q+1)th data signal line.

Further, in a case where the scanning line drive circuit 6 scans the (p+2)th scanning line in the first field of the x-th frame, a signal line drive circuit 8 supplies data signals having the negative polarity to the q-th data signal line and to the (q+2)th data signal line. Further, the signal line drive circuit 8 supplies data signals having the positive polarity to the (q+1)th data signal line.

In this example, in a case where the scanning line drive circuit 6 scans the p-th scanning line, the signal line drive circuit 8 applies data signals (described above) having a polarity inverted every sub-pixel in the row direction. Further, in a case where the scanning line drive circuit 6 scans the (p+2)th scanning line, the signal line drive circuit 8 applies data signals having polarities opposite to that of data signals which have been applied when the p-th scanning line.

The scanning line drive circuit 6 and the signal line drive circuit 8 each carry out driving as described above, so that data signals having the positive polarity are applied to (p, q)th sub-pixel R and the (p+4, q)th sub-pixel G in the first field of the x frame as illustrated in FIG. 24. Further, data signals having the negative polarity are applied to the (p+6, q)th sub-pixel R, the (p, q+1)th sub-pixel R, the (p+10, q)th sub-pixel G, and the (p+4, q+2)th sub-pixel G as illustrated in FIG. 24.

Moreover, a data signal having the negative polarity is applied to the (p+2, q)th sub-pixel B as illustrated in FIG. 24, and data signals having the positive polarity are applied to the (p+8, q)th sub-pixel B and to the (p+2, q+2)th sub-pixel B.

That is, the signal line drive circuit 8 carries out driving in such a manner that, among sub-pixels defined by scanning lines scanned in each field, polarities of data signals to be applied to the sub-pixels are inverted every sub-pixel. Further, among sub-pixels which display the identical color among sub-pixel defined by scanning lines scanned in each field, the signal line drive circuit 8 further carries out driving in such a manner that polarities of data signals to be applied to the sub-pixels are inverted every sub-pixel.

Similarly, data signals having the positive polarity are applied to the (p+1, q)th sub-pixel G and to the (p+5, q)th sub-pixel B in the second field of the x-th frame as illustrated in FIG. 24. Moreover, data signals having the negative polarity are applied to the (p+7, q)th sub-pixel G, the (p+11, q)th sub-pixel G, the (p+1, q+1)th sub-pixel B, and the (p+5, q+1)th sub-pixel B as illustrated in FIG. 24.

Moreover, a data signal having the negative polarity is applied to the (p+3, q) sub-pixel R as illustrated in FIG. 24, and data signals having the positive polarity are applied to the (p+9, q)th sub-pixel R and to the (p+3, q+1)th sub-pixel R.

In other words, in each field, the signal line drive circuit 8 inverts polarities of data signals every one sub-pixel in both the row and column directions (i.e., a group of 1×1 selected pixel is determined as a set).

((x+1)th Frame)

In the first field of an (x+1)th frame, the polarity of a data signal which is applied to each sub-pixel is opposite to that of a data signal which has been applied to the each sub-pixel in the first field of the x-th frame (see FIG. 24). Moreover, in the second field of the (x+1)th frame, the polarity of a data signal which is applied to each sub-pixel is opposite to that of a data signal which has been applied to the each sub-pixel in the second field of the x-th frame.

That is, the polarity of a data signal which is applied to each selection pixel in a certain field is inverted with respect to that of a data signal which has been applied to the each selection pixel in a previous field before the certain field where the selection pixels have been selected.

(Timing of Scanning Signal and Data Signal)

The following description will discuss a timing of a scanning signal and a data signal in this example.

At a substantially same time as the p-th scanning line is selected (time t21), data signals having polarities as illustrated in FIG. 24 are started to be supplied to data signal lines in the first field of the x-th frame. Potentials of the data signals thus supplied become 0 V at a substantially same time as the selection of the p-th scanning line ends, and remain 0 V until the (p+2)th scanning line is selected.

At a substantially same time as the (p+2)th scanning line is selected, supply of data signals to data signal lines is started, which data signals have polarities opposite to that of the data signals which have been supplied at the time t21. Potentials of the data signals supplied to the data signal lines become 0 V at a substantially same time as the selection of the (p+2)th scanning line ends.

At a substantially same time as the (p+1)th scanning line is selected (time t22), data signals having polarities as illustrated in FIG. 24 is started to be supplied to data signal lines in the second field of the x-th frame. Potentials of the data signals thus supplied become 0 V at a substantially same time as the selection of the (p+1)th scanning line ends, and remain 0 V until the (p+3)th scanning line is selected.

Supply of data signals to data signal lines is started at a substantially same time as the (p+3)th scanning line is selected, which data signals have polarities opposite to that of the data signals which have been supplied at the time t21. Potentials of the data signals supplied to the data signal lines become 0 V at a substantially same time as the selection of the (p+3)th scanning line ends.

Similarly, at a substantially same time as the scanning lines are sequentially selected, supply of data signals to data signal lines is sequentially started in the first field (or the second field) of the (x+1)th frame, which data signals have polarities opposite to that of the data signals which have been supplied in the first field (or the second field) of the x-th frame. Potentials of the data signals supplied to the data signal lines become 0 V at a substantially same time as the selection of each of the scanning lines ends.

The above arrangement allows the liquid crystal display device 1 to, when it is not required to carry out display with high quality, simultaneously (i) use interlace driving for power consumption reduction and (ii) display a color image based on a mixture of three colors.

In the case where the above predetermined number is 3, the pixels for displaying the individual colors each display either tone 0 or tone 1. The predetermined number being 3 allows a total of eight colors to be displayed. Similarly, in the case where the above predetermined number is 5, the pixels each display one of tone 0, tone 1, tone 2, and tone 3. The predetermined number being 5 allows a total of 64 colors to be displayed.

[One-Line Interlace Driving and Three-Dot Reversal Driving]

Figure 25:
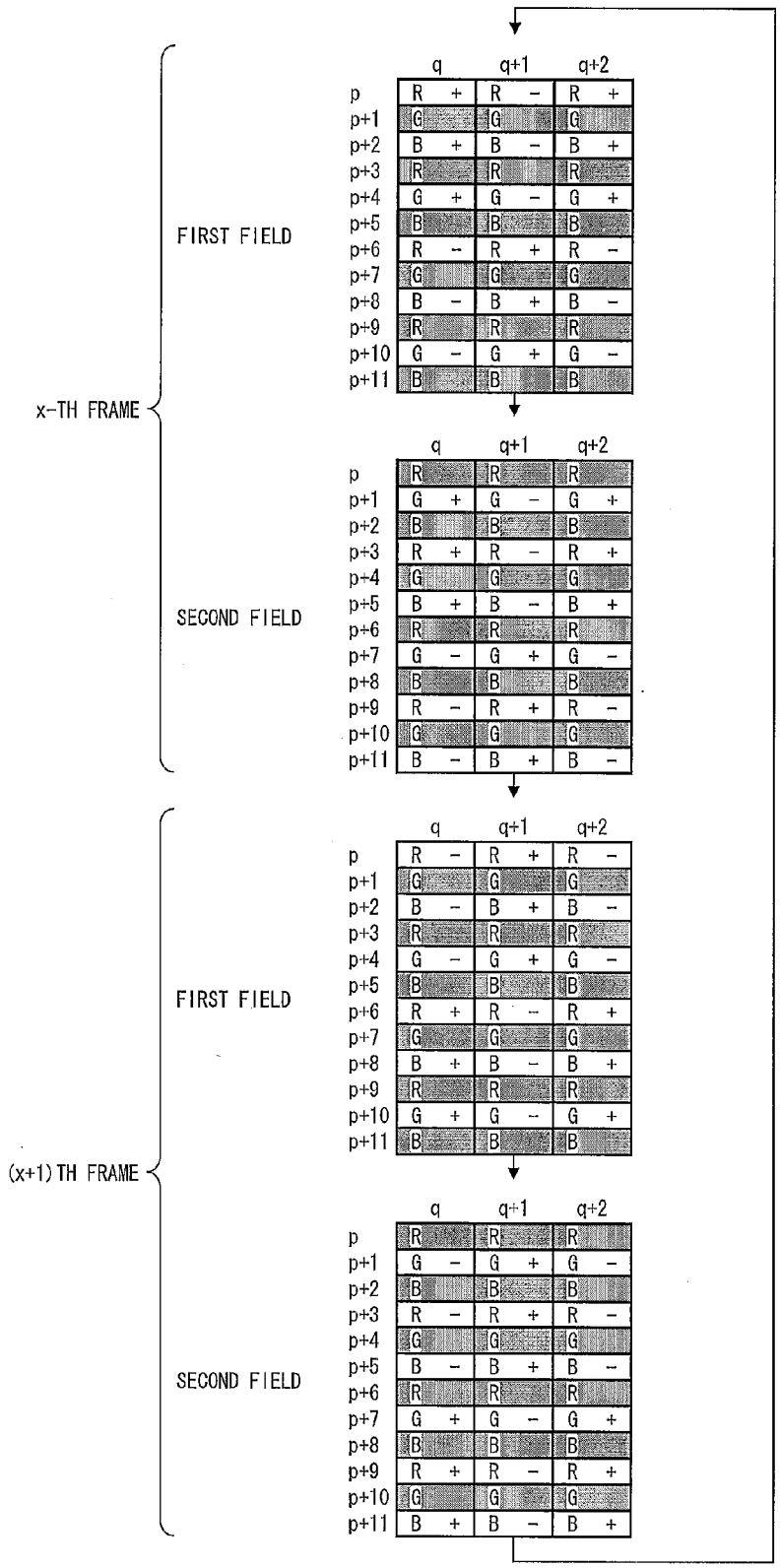
FIG. 25 is a transitional diagram schematically illustrating how a polarity of each sub-pixel is changed in a case where three-dot-reversal driving is carried out while one-line interlace driving is carried out in a liquid crystal display device in accordance with still another embodiment of the present invention.

The following description will discuss, with reference to FIG. 25, a case where in the first display mode, one-line interlace driving (n=1) and three-dot reversal driving (m=3) are carried out. FIG. 25 is a transitional diagram schematically illustrating how a polarity of each sub-pixel is changed in the liquid crystal display device 1 of Embodiment 4 in a case where one-line interlace driving and three-dot reversal driving are carried out.

The scanning line drive circuit 6 sequentially scans the p-th, the (p+2)th, the (p+4)th, the (p+6)th, the (p+8)th, and the (p+10)th scanning lines in a first field of the x-th frame, as illustrated in FIG. 25. The (p+1)th, the (p+3)th, the (p+5)th, the (p+7)th, the (p+9)th, and the (p+11)th scanning lines, which are to be scanned in the second field, are not carried out.

In this way, the scanning line drive circuit 6 scans the first scanning line through the P-th scanning line every other scanning line. That is, the scanning line drive circuit 6 repeatedly carries out, with respect to all scanning lines, scanning and non-scanning every other scanning line, and switches, every field, which scanning lines to be scanned.

At this time, in each field, the signal line drive circuit 8 inverts polarities of data signals so that the polarities are alternately inverted in each set of sub-pixels which are adjacent to each other in the row direction, and inverts polarities of data signals every three adjacent sub-pixels in the column direction (see FIG. 25). Moreover, the signal line drive circuit 8 inverts polarities of data signals to be applied to sub-pixels on a frame-by-frame basis.

In other words, in each field, the signal line drive circuit 8 inverts polarities of data signals every three sub-pixels in both the row and column directions, which three sub-pixels are constituted by (i) one sub-pixel in the row direction and (ii) three sub-pixels in the column direction (i.e., a group of 1×3 selected pixels is determined as a set).

With this arrangement, the polarity of a data signal to be applied to each sub-pixel in the first field of the (x+1)th frame is opposite to that of the data signal which has been applied to the each sub-pixel in the first field of the x-th frame (see FIG. 25). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

(Timing of Scanning Signal and Data Signal)

The following description will discuss timing of scanning signals and data signals in the above example.

At a substantially same time as the p-th scanning line is selected (time t23), data signals having polarities as illustrated in FIG. 25 are started to be supplied to data signal lines in the first field of the x-th frame. Potentials of data signals to be supplied to each data signal line become 0 V at a substantially same time as the selection of the p-th scanning line ends, and remain 0 V until the (p+2)th scanning line is selected.

At a substantially same time as the (p+2)th scanning line is selected, supply of data signals to data signal lines is started, which data signals have the same polarity as the data signals which have been supplied at the time t23. Potentials of data signals supplied to the data signal line in the (p+2)th scanning line become 0 V at a substantially same time as the selection of the (p+2)th scanning line ends.

At a substantially same time as the (p+1)th scanning line is selected, data signals having polarities as illustrated in FIG. 25 are started to be supplied to data signal lines in the second field of the x-th frame. Potentials of the data signals to be supplied to each data signal lines become 0 V at a substantially same time as the selection of the (p+1)th scanning line ends, and remain 0 V until the (p+3)th scanning line is selected.

Similarly, at a substantially same time as the scanning lines are sequentially selected, supply of data signals to data signal lines is sequentially started in the first field (or the second field) of the (x+1)th frame, which data signals have polarities opposite to those of the data signals which have been supplied in the first field (or the second field) of the x-th frame. Potentials of the data signals supplied to the data signal lines become 0 V at a substantially same time as the selection of each of the scanning lines ends.

[Three-Line Interlace Driving and One-Dot Reversal Driving]

Figure 26:
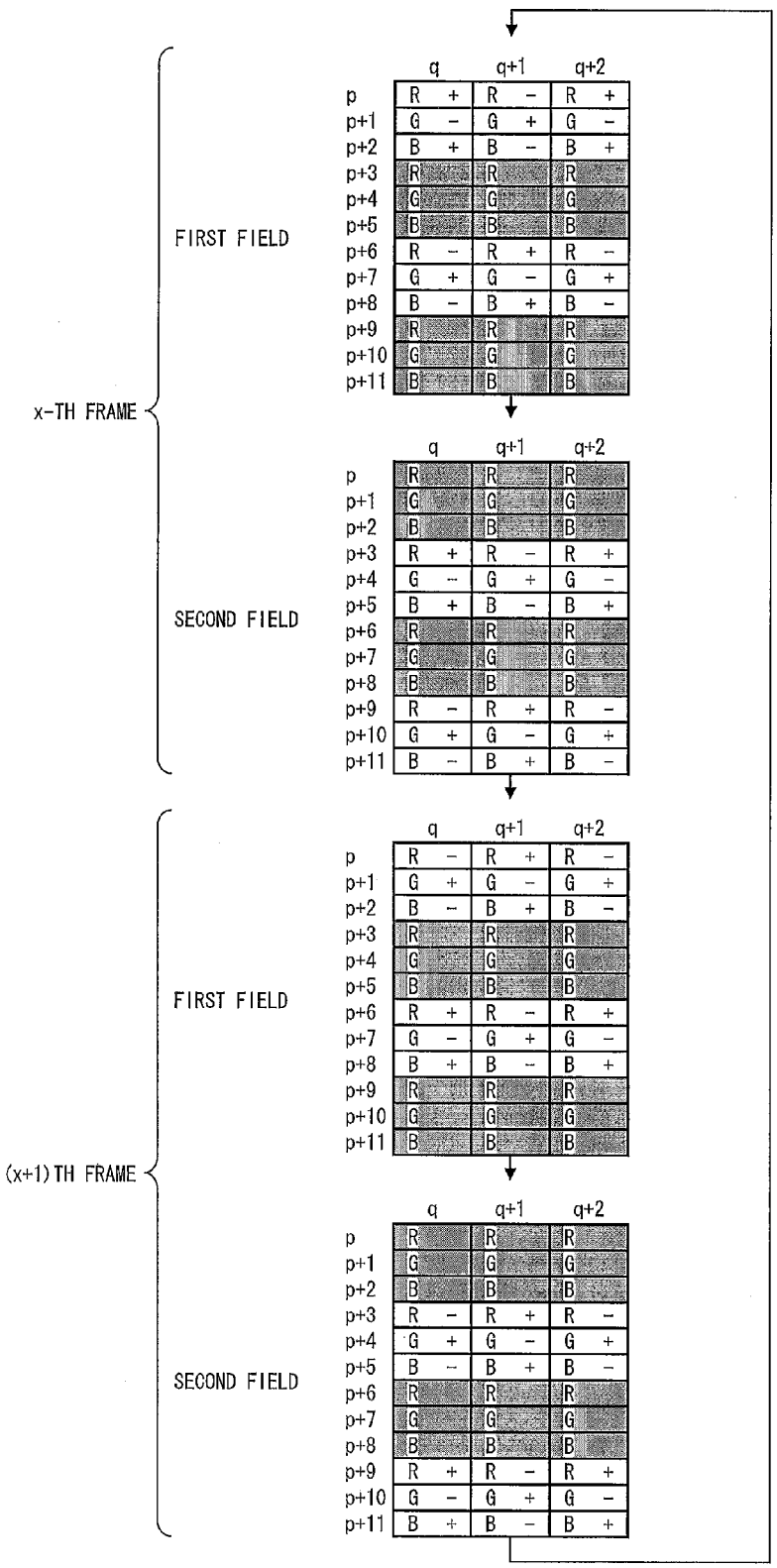
FIG. 26 is a transitional diagram schematically illustrating how a polarity of each sub-pixel is changed in a case where one-dot reversal driving is carried out while three-line interlace driving is carried out in a liquid crystal display device in accordance with still another embodiment of the present invention.

The following description will discuss, with reference to FIG. 26, a case where in the first display mode, three-line interlace driving (n=3) and one-dot reversal driving (m=1) are carried out. FIG. 26 is a transitional diagram schematically illustrating how a polarity of each sub-pixel is changed in the liquid crystal display device 1 of Embodiment 4 in a case where three-line interlace driving and one-dot reversal driving are carried out.

The scanning line drive circuit 6 sequentially scans the p-th, the (p+1)th, the (p+2)th, the (p+6)th, the (p+7)th, and the (p+8)th scanning lines in a first field of the x-th frame, as illustrated in FIG. 26. The (p+3)th, the (p+4)th, the (p+5)th, the (p+9)th, the (p+10)th, the (p+11)th scanning lines, which are to be scanned in the second field, are not scanned.

In this way, the scanning line drive circuit 6 scans the first scanning line through the P-th scanning line every three scanning lines. That is, the scanning line drive circuit 6 repeatedly carries out, with respect to all scanning lines, scanning and non-scanning every three scanning lines, and switches, every field, which scanning lines to be scanned.

At this time, the signal line drive circuit 8 (i) applies data signals in such a manner that polarities of the data signals are alternately inverted in each set of three sub-pixels which constitute a main pixel and are adjacent to one another in the column direction, and (ii) inverts polarities of data signals every sub-pixel in the row direction. Further, the signal line drive circuit 8 inverts polarities of data signals in such a manner that the polarities are inverted every main pixel in the column direction among sub-pixels defined by scanning lines to be scanned in each field.

Therefore, as illustrated in FIG. 26, the signal line drive circuit 8 inverts polarities of data signals so that the polarities are alternately inverted in each set of sub-pixels which are adjacent in the row and column directions. Moreover, the signal line drive circuit 8 inverts polarities of data signals to be applied to sub-pixels on a frame-by-frame basis.

In other words, in each field, the signal line drive circuit 8 inverts polarities of data signals every one sub-pixel in both the in the row direction and column directions (i.e., a group of 1×1 selected pixel is determined as a set).

With this arrangement, the polarity of a data signal to be applied to each sub-pixel in the first field of the (x+1)th frame is opposite to that of the data signal which has been applied to the each sub-pixel in the first field of the x-th frame (see FIG. 26). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

(Timing of Scanning Signal and Data Signal)

The following description will discuss timing of scanning signals and data signals in the above example.

At a substantially same time as the p-th scanning line is selected (time t24), data signals having polarities as illustrated in FIG. 26 are started to be supplied to data signal lines in the first field of the x-th frame. Potentials of data signals to be supplied to each data signal line become 0 V at a substantially same time as the selection of the (p+2)th scanning line subsequent to the p-th and the (p+1)th scanning lines ends, and remain 0 V until the (p+6)th scanning line is selected.

At a substantially same time as the (p+6)th scanning line is selected, supply of data signals to the data signal lines is started, which data signals have polarities opposite to those of data signals which have been supplied at the time t24. Potentials of the data signal supplied to the data signal lines become 0 V at a substantially same time as the selection of the (p+8)th scanning line subsequent to the (p+6)th and (p+7)th scanning lines ends.

At a substantially same time as the (p+3)th scanning line is selected, data signals having polarities illustrated in FIG. 26 are started to be supplied to the data signal lines in the second field of the x-th frame. Potentials of the data signals supplied to the data signal lines become 0 V at a substantially same time as the selection of the (p+5)th scanning line subsequent to the (p+3)th and (p+4)th scanning line ends, and remain 0 V until the (p+9)th scanning line is selected.

Similarly, at a substantially same time as scanning lines are sequentially selected, supply of data signals to data signal lines in the first field (or the second field) of the (x+1)th frame is started, which data signals have polarities opposite to that of the data signals which have been supplied in the first field (or the second field) of the x-th frame. Potentials of the data signals supplied to the data signal lines become 0 V at a substantially same time as the selection of each of the scanning lines ends.

[Three-Line Interlace Driving and Three-Dot Reversal Driving]

Figure 27:
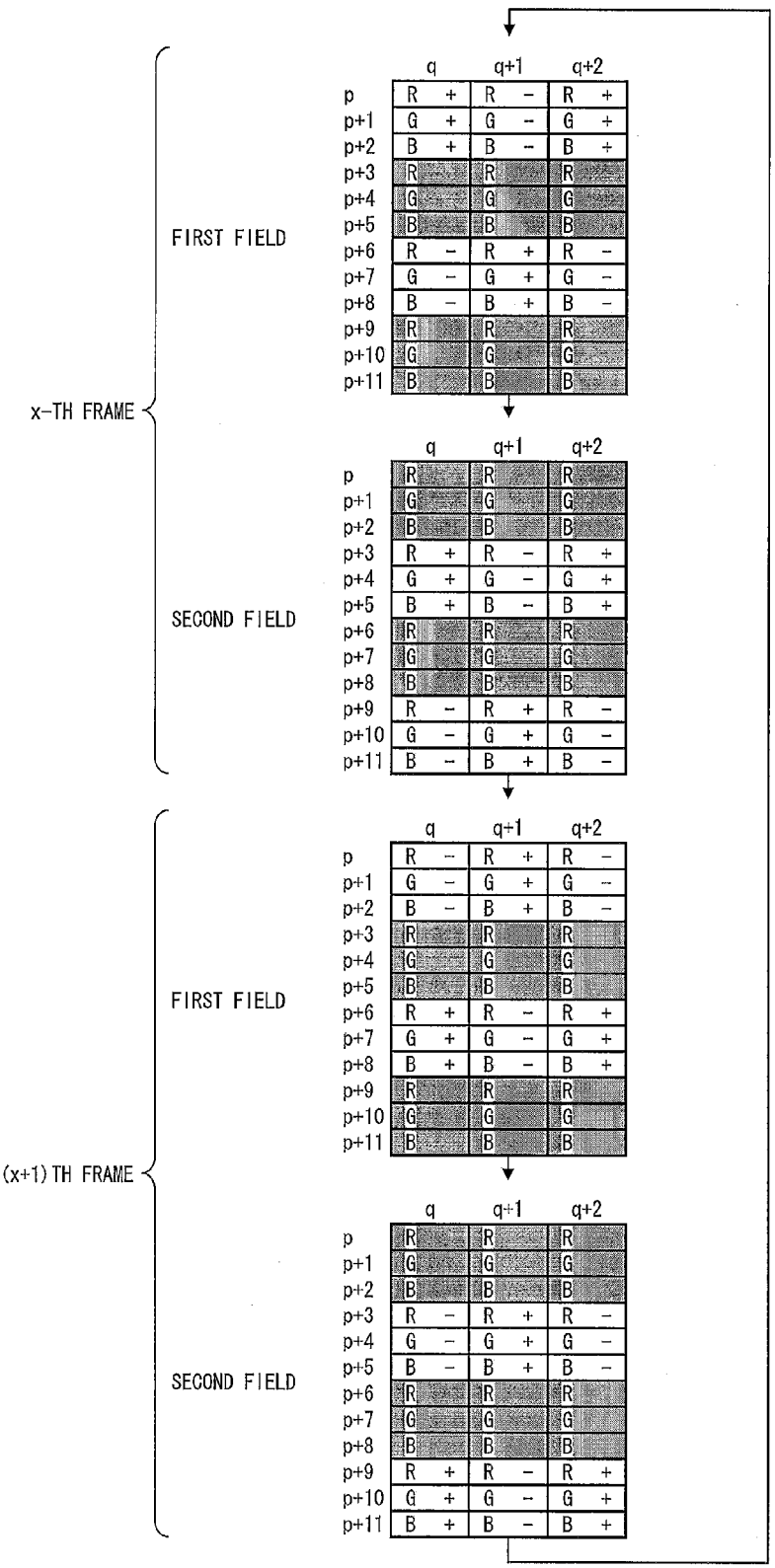
FIG. 27 is a transitional diagram schematically illustrating how a polarity of each sub-pixel is changed in a case where three-dot-reversal driving is carried out while three-line interlace driving is carried out in a liquid crystal display device in accordance with still another embodiment of the present invention.
Figure 28:
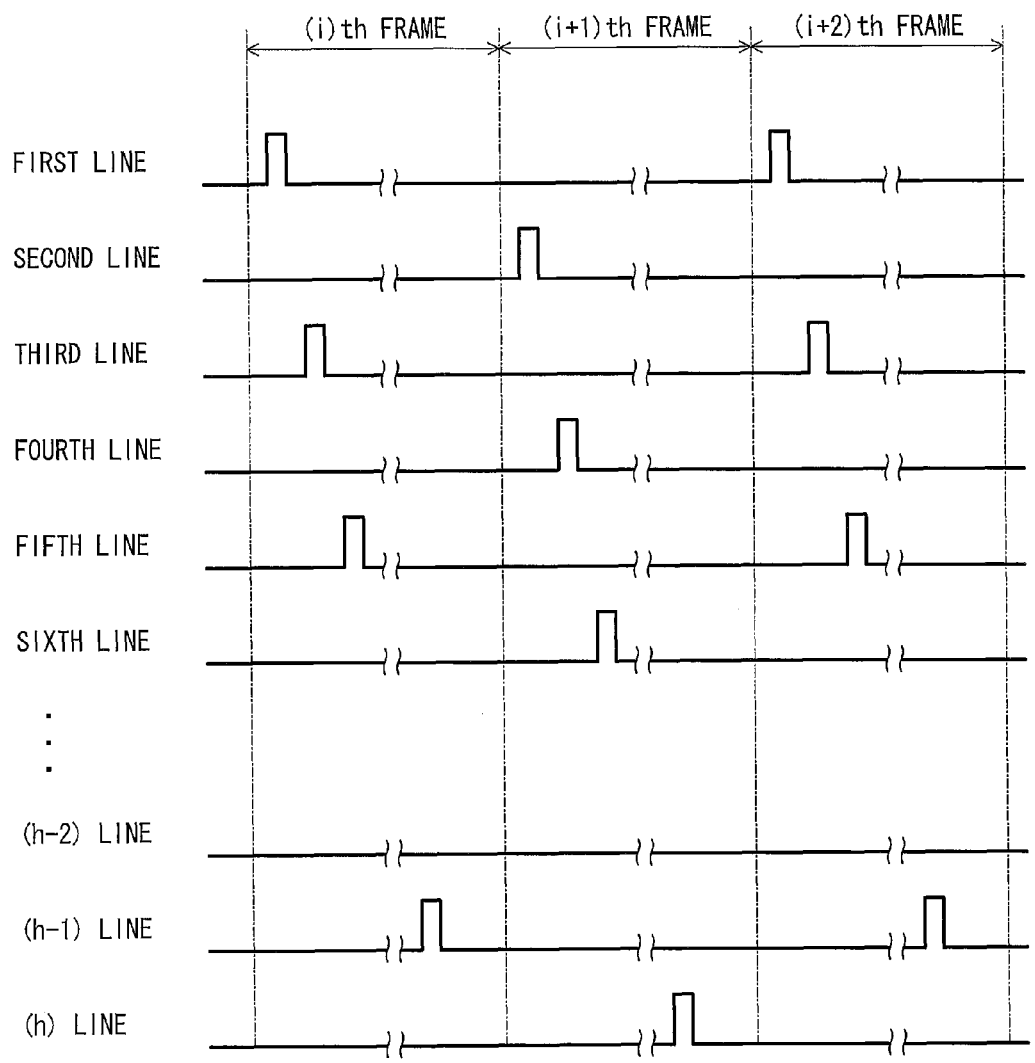
FIG. 28 is a timing chart in a case where, in a flat display device disclosed in Patent Literature 1 which carries out scanning every other scanning line and two frames form a single image.

The following description will discuss, with reference to FIG. 27, a case where in the first display mode, three-line interlace driving (n=3) and three-dot reversal driving (m=3) are carried out. FIG. 27 is a transitional diagram schematically illustrating how a polarity of each sub-pixel is changed in the liquid crystal display device 1 of Embodiment 4 in a case where three-line interlace driving and three-dot reversal driving are carried out.

The scanning line drive circuit 6 sequentially scans the p-th, the (p+1)th, the (p+2)th, the (p+6)th, the (p+7)th, and the (p+8)th scanning lines in a first field of the x-th frame, as illustrated in FIG. 27. The (p+3)th, the (p+4)th, the (p+5)th, the (p+9)th, the (p+10)th, the (p+11)th scanning lines, which are to be scanned in the second field, are not scanned.

In this way, the scanning line drive circuit 6 scans the first scanning line through the P-th scanning line every three scanning lines. That is, the scanning line drive circuit 6 repeatedly carries out, with respect to all scanning lines, scanning and non-scanning every three scanning lines, and switches, every field, which scanning lines to be scanned.

At this time, the signal line drive circuit 8 (i) applies data signals having the same polarity to every three sub-pixels which are adjacent to one another in the column direction and which constitute a main pixel, and (ii) inverts polarities of data signals every sub-pixel among sub-pixels adjacent to one another in the row direction. Further, the signal line drive circuit 8 inverts polarities of data signals every main pixel in the column direction.

Therefore, the signal line drive circuit 8 (i) applies data signals so that sub-pixels, which are adjacent to each other in the column direction and which constitute a main pixel, have the same polarity, (ii) inverts polarities of data signals so that sub-pixels constituting a main pixel have polarities opposite to those of sub-pixels constituting another main pixel, and (iii) inverts polarities of data signals every sub-pixel in the row direction.

In other words, in each field, the signal line drive circuit 8 inverts polarities of data signals every three sub-pixels in both the row and column directions, which three sub-pixels are constituted by (i) one sub-pixel in the row direction and (ii) three sub-pixels in the column direction (i.e., a group of 1×3 selected pixels is determined as a set).

With this arrangement, the polarity of a data signal to be applied to each sub-pixel in the first field of the (x+1)th frame is opposite to that of the data signal which has been applied to the each sub-pixel in the first field of the x-th frame (see FIG. 27). Further, the polarity of a data signal to be applied to each sub-pixel in the second field of the (x+1)th frame is opposite to that of a data signal which has been applied to the each sub-pixel in the second field of the x-th frame.

That is, the polarity of a data signal to be applied to each selection pixel in a certain field is inverted with respect to the polarity of a data signal which has been applied to the each selection pixel in a previous field before the certain field where the selection pixels have been selected.

(Timing of Scanning Signal and Data Signal)

The following description will discuss timing of scanning signals and data signals in the above example.

At a substantially same time as the p-th scanning line is selected (time t25), data signals having polarities as illustrated in FIG. 27 are started to be supplied to data signal lines in the first field of the x-th frame. Potentials of data signals to be supplied to each data signal line become 0 V at a substantially same time as the selection of the (p+2)th scanning line subsequent to the p-th and the (p+1)th scanning lines ends, and remain 0 V until the (p+6)th scanning line is selected.

At a substantially same time as the (p+6)th scanning line is selected, supply of data signals to the data signal lines is started, which data signals have polarities opposite to those of data signals which have been supplied at the time t25. Potentials of the data signal supplied to the data signal lines become 0 V at a substantially same time as the selection of the (p+8)th scanning line subsequent to the (p+6)th and (p+7)th scanning lines ends.

At a substantially same time as the (p+3)th scanning line is selected, data signals having polarities illustrated in FIG. 27 are started to be supplied to the data signal lines in the second field of the x-th frame. Potentials of the data signals supplied to the data signal lines become 0 V at a substantially same time as the selection of the (p+5)th scanning line subsequent to the (p+3)th and (p+4)th scanning line ends, and remain 0 V until the (p+9)th scanning line is selected.

Similarly, at a substantially same time as scanning lines are sequentially selected, data signals having polarities opposite to those of the data signals which have been supplied in the first field (or the second field) of the x-th frame are applied to data signal lines in the first field (or the second field) of the (x+1)th frame. Potentials of the data signals supplied to the data signal lines become 0 V at a substantially same time as the selection of each of the scanning lines ends.

(Properties of TFT Including Oxide Semiconductor)

The switching elements (TFTs) are not particularly limited in Embodiments 1 to 4. It is possible to employ a switching element including a semiconductor layer made from a so-called oxide semiconductor. Examples of the oxide semiconductor encompass IGZO (InGaZnOx).

The following description will discuss, with reference to FIG. 29, respective properties of switching elements each including an oxide semiconductor. FIG. 29 is a graph illustrating the respective properties of various switching elements. Specifically, FIG. 29 illustrates the respective properties of, as switching elements, (i) a TFT including a semiconductor layer made of an oxide semiconductor (that is, a TFT including an oxide semiconductor), (ii) a TFT including a-Si (amorphous silicon), and (iii) a TFT including LTPS (low-temperature polysilicon).

The graph of FIG. 29 indicates, (i) along its abscissa (Vgh), the voltage value of an ON voltage supplied to the gate of each TFT and, (ii) along its ordinate (Id), the amount of a current between the source and drain of each TFT.

In particular, "TFT-on" in FIG. 29 indicates a period during which a TFT is in the ON state in response to the voltage value of an ON voltage, whereas "TFT-off" in FIG. 29 indicates a period during which a TFT is in the OFF state in response to the voltage value of an ON voltage.

As illustrated in FIG. 29, On-state electron mobility of a switching element which is made of an oxide semiconductor is approximately 20 to 50 times higher than that of a switching element which is made from a-Si. Further, the switching element which is made of an oxide semiconductor is extremely superior in an on-state property to the switching element which is made from a-Si. Therefore, by using the switching element which is made of an oxide semiconductor, it is easy to set a refresh rate to a high value (for example, 60 Hz or more).

In the display panel 2 provided in the liquid crystal display device 1 according to Embodiments 1 to 4, a switching element made of an oxide semiconductor having such an excellent on-state property is employed in each pixel. This makes it possible to drive pixels with use of smaller switching elements. It is therefore possible to decrease an area where the switching element occupies in each pixel in the display panel 2. That is, it is possible to increase an aperture ratio in each pixel, which results in increasing transmittance of backlight. As a result, it is possible to employ a backlight which consumes low power and reduce brightness of backlight. This makes it possible to reduce power consumption.

Further, because the switching element is excellent in the on-state property, it is possible to further shorten a storing time of source signals with respect to pixels. This makes it possible to easily increase the refresh rate of the display panel 2.

Further, as illustrated in FIG. 29, a leak current of the switching element made of an oxide semiconductor in an off-state is substantially one-hundredth of that of a switching element made from a-Si, that is, the switching element made of an oxide semiconductor scarcely generates a leak current. That is, the switching element made from the oxide semiconductor has an excellent off-state property. As described above, because the switching element made of an oxide semiconductor has an excellent off-state property, it is easy to set the refresh rate to a low value (for example, 30 Hz or less).

In the display panel 2 in accordance with Embodiments 1 to 4, each pixel includes a switching element made of an oxide semiconductor having an excellent off-state property. Therefore, it is possible to maintain, for a long time, a state in which source signals are stored in a plurality of pixels provided in the display panel 2. This makes it possible to easily reduce the refresh rate of the display panel 2.

(Supplemental Notes)

A display device according to one embodiment of the present invention is, as described above, a display device including: a display panel including: a plurality of gate lines; a plurality of data lines provided so as to intersect the plurality of gate lines; and a plurality of pixels provided so as to correspond to intersections of the plurality of gate lines and the plurality of data lines; a gate line driving circuit for supplying a gate signal to the plurality of gate lines; a data line driving circuit for supplying a data signal to the plurality of data lines; and controlling means for controlling the gate signal and the data signal, the controlling means, (i) in a first display mode, in which a number of tones that each pixel is capable of displaying is smaller than a predetermined number, controlling the gate signal and the data signal by an interlace driving method, by which a single frame includes a plurality of fields obtained by selecting every other gate line, and (ii) in a second display mode, in which the number of tones that each pixel is capable of displaying is equal to or greater than the predetermined number, controlling the gate signal and the data signal by a progressive driving method, by which the plurality of gate lines are selected sequentially.

The display device having the above arrangement switches between (i) operation in the first display mode, in which the number of tones that each pixel is capable of displaying is smaller than a predetermined number, and (ii) operation in the second display mode, in which the number of tones that each pixel is capable of displaying is equal to or greater than the predetermined number. Further, the controlling means controls the gate line driving circuit and the data line driving circuit such that the display device uses (i) an interlace driving method when the data line driving circuit operates in the first display mode and (ii) a progressive driving method when the data line driving circuit operates in the second display mode.

With the above arrangement, the controlling means allows, (i) in the second display mode (in which the number of tones that each pixel is capable of displaying is equal to or greater than the predetermined number), that is, in the case where high-quality display is required, progressive driving to be carried out for high display quality, and (ii) in the first display mode (in which the number of tones that each pixel is capable of displaying is smaller than the predetermined number), that is, in the case where high-quality display is not necessarily required, interlace driving to be carried out for power consumption reduction.

As described above, the display device switches, depending on the number of tones that each pixel is capable of displaying, between an interlace driving method and a progressive driving method. This arrangement allows the display device to (i) carry out display with high quality in the case where it is required to carry out high-quality display and (ii) reduce power consumption in the case where it is not necessarily required to carry out high-quality display.

In the case where, for instance, the predetermined number is 3, the number of tones that each pixel is capable of displaying in the first display mode is 2. Thus, in this case, each pixel displays either of tone 0 and tone 1. Similarly, in the case where the predetermined number is 5, each pixel displays one of tone 0, tone 1, tone 2, and tone 3.

The display device according to one embodiment of the present invention may preferably be arranged such that the controlling means inverts, for each preset number of selected pixels in a direction along the plurality of gate lines and a direction along the plurality of data lines, a polarity of the data signal to be applied to selected pixels selected for a certain field; and the controlling means inverts a polarity of the data signal to be applied to each selected pixel for the certain field with respect to a polarity of the data signal having been applied to the each selected pixel in a field for which the each selected pixel was selected and which is immediately previous to the certain field.

According to the arrangement, in a direction along the plurality of gate lines and in a direction along the plurality of data lines, the controlling means controls the data line driving circuit so as to invert polarities of data signals every predetermined number of selected pixels, which data signals are to be applied to every predetermined number of selected pixels which are selected for a certain field. With this arrangement, it is possible to reduce occurring of flickers.

Further, the controlling means controls the data line driving circuit so as to invert polarities of the data signals to be applied to the predetermined number of selected pixels which are selected for the certain field so that the polarities are opposite to those of data signals which had been applied to the predetermined number of selected pixels in a previous field before the certain field where the predetermined number of selected pixels were selected. With this arrangement, it is possible to reduce pixel burn-in.

The above arrangement allows the display device to (i) carry out display with high quality when it is required to carry out high-quality display and (ii) use interlace driving for power consumption reduction when it is not required to carry out high-quality display. The above arrangement further allows occurring of flickers to be reduced by use of dot-reversal driving.

The display device according to one embodiment of the present invention may preferably be arranged such that each four of the plurality of pixels make up a picture element as a set; and each picture element is made up of four pixels that respectively display three primary colors and a color obtained by combining at least two of the three primary colors.

The above arrangement allows the display device to, when it is not required to carry out display with high quality, simultaneously (i) use interlace driving for power consumption reduction and (ii) display a color image based on a mixture of four colors.

In the case where the above predetermined number is 3, the pixels for displaying the individual colors each display either tone 0 or tone 1. The predetermined number being 3 allows a total of 16 colors to be displayed. Similarly, in the case where the above predetermined number is 5, the pixels each display one of tone 0, tone 1, tone 2, and tone 3. The predetermined number being 5 allows a total of 256 colors to be displayed.

The display device according to one embodiment of the present invention may preferably be arranged such that the each picture element is made up of four pixels including (i) two pixels present along the plurality of gate lines and (ii) two pixels present along the plurality of data lines.

The display device according to one embodiment of the present invention may preferably be arranged such that the each picture element is made up of four pixels present along the plurality of gate lines.

The display device according to one embodiment of the present invention may preferably be arranged such that each three of the plurality of pixels make up a picture element as a set; and each picture element is made up of three pixels that respectively display three primary colors.

The above arrangement allows the display device to, when it is not required to carry out display with high quality, simultaneously (i) use interlace driving for power consumption reduction and (ii) display a color image based on a mixture of three colors.

In the case where the above predetermined number is 3, the pixels for displaying the individual colors each display either tone 0 or tone 1. The predetermined number being 3 allows a total of eight colors to be displayed. Similarly, in the case where the above predetermined number is 5, the pixels each display one of tone 0, tone 1, tone 2, and tone 3. The predetermined number being 5 allows a total of 64 colors to be displayed.

The display device according to one embodiment of the present invention may preferably be arranged such that the picture element is made up of three pixels present along the plurality of gate lines.

The display device according to one embodiment of the present invention may preferably be arranged such that each picture element is made up of three pixels present along the plurality of data lines.

The display device according to one embodiment of the present invention may preferably be arranged such that the predetermined number is three.

The display device according to one embodiment of the present invention may preferably be arranged such that the data line driving circuit supplies the data signal such that the data signal has a polarity which is inverted for each m pixels (where m is an integer of 1 or greater), among the plurality of pixels, that display an identical color and that are closest to each other in a column direction and which is inverted for each set of pixels, among the plurality of pixels, that display an identical color and that are closest to each other in a row direction.

The display device according to one embodiment of the present invention may preferably be arranged such that the data line driving circuit supplies the data signal having a polarity inverted for each set of pixels, among the plurality of pixels, that display an identical color and that are closest to each other in a column direction and a row direction.

The display device according to one embodiment of the present invention may preferably be arranged such that the data line driving circuit supplies the data signal such that the data signal has a polarity which is inverted for each two pixels, among the plurality of pixels, that display an identical color and that are closest to each other in a column direction and which is inverted for each set of pixels, among the plurality of pixels, that display an identical color and that are closest to each other in a row direction.

The display device according to one embodiment of the present invention may preferably be arranged such that the display panel includes a switching element having a semiconductor layer made of an oxide semiconductor.

According to the arrangement, it is easy to change a frame period, that is, a refresh rate by employing switching elements each including a semiconductor layer made of an oxide semiconductor having an excellent on-state property and an excellent off-state property.

The display device according to one embodiment of the present invention may preferably be arranged such that the oxide semiconductor is IGZO.

The display device according to one embodiment of the present invention may preferably be arranged such that the display device is a liquid crystal display device.

A driving device according to one embodiment of the present invention for driving a display device is a driving device for driving a display panel including a plurality of gate lines, a plurality of data lines provided so as to intersect the plurality of gate lines, and a plurality of pixels provided so as to correspond to intersections of the plurality of gate lines and the plurality of data lines, the driving device including: a gate line driving circuit for supplying a gate signal to the plurality of gate lines; a data line driving circuit for supplying a data signal to the plurality of data lines; and controlling means for controlling the gate signal and the data signal, the controlling means, (i) in a first display mode, in which a number of tones that each pixel is capable of displaying is smaller than a predetermined number, controlling the gate signal and the data signal by an interlace driving method, by which a single frame includes a plurality of fields obtained by selecting every other gate line, and (ii) in a second display mode, in which the number of tones that each pixel is capable of displaying is equal to or greater than the predetermined number, controlling the gate signal and the data signal by a progressive driving method, by which the plurality of gate lines are selected sequentially.

The display device having the above arrangement switches between (i) operation in the first display mode, in which the number of tones that each pixel is capable of displaying is smaller than a predetermined number, and (ii) operation in the second display mode, in which the number of tones that each pixel is capable of displaying is equal to or greater than the predetermined number. Further, the controlling means controls the gate line driving circuit and the data line driving circuit such that the display device uses (i) an interlace driving method when the data line driving circuit operates in the first display mode and (ii) a progressive driving method when the data line driving circuit operates in the second display mode.

With the above arrangement, the controlling means allows, (i) in the second display mode (in which the number of tones that each pixel is capable of displaying is equal to or greater than the predetermined number), that is, in the case where high-quality display is required, progressive driving to be carried out for high display quality, and (ii) in the first display mode (in which the number of tones that each pixel is capable of displaying is smaller than the predetermined number), that is, in the case where high-quality display is not necessarily required, interlace driving to be carried out for power consumption reduction.

As described above, the display device switches, depending on the number of tones that each pixel is capable of displaying, between an interlace driving method and a progressive driving method. This arrangement allows the display device to (i) carry out display with high quality in the case where it is required to carry out high-quality display and (ii) reduce power consumption in the case where it is not necessarily required to carry out high-quality display.

In the case where, for instance, the predetermined number is 3, the number of tones that each pixel is capable of displaying in the first display mode is 2. Thus, in this case, each pixel displays either of tone 0 and tone 1. Similarly, in the case where the predetermined number is 5, each pixel displays one of tone 0, tone 1, tone 2, and tone 3.

A driving method according to one embodiment of the present invention for driving a display device is a driving method for driving a display panel including a plurality of gate lines, a plurality of data lines provided so as to intersect the plurality of gate lines, and a plurality of pixels provided so as to correspond to intersections of the plurality of gate lines and the plurality of data lines, the driving method including the step of: carrying out, (i) in a first display mode, in which a number of tones that each pixel is capable of displaying is smaller than a predetermined number, control by an interlace driving method, by which a single frame includes a plurality of fields obtained by selecting every other gate line, and (ii) in a second display mode, in which the number of tones that each pixel is capable of displaying is equal to or greater than the predetermined number, control by a progressive driving method, by which the plurality of gate lines are selected sequentially.

The display device having the above arrangement switches between (i) operation in the first display mode, in which the number of tones that each pixel is capable of displaying is smaller than a predetermined number, and (ii) operation in the second display mode, in which the number of tones that each pixel is capable of displaying is equal to or greater than the predetermined number. Further, the display device uses (i) an interlace driving method when the data line driving circuit operates in the first display mode and (ii) a progressive driving method when the data line driving circuit operates in the second display mode.

The above arrangement allows, (i) in the second display mode (in which the number of tones that each pixel is capable of displaying is equal to or greater than the predetermined number), that is, in the case where high-quality display is required, progressive driving to be carried out for high display quality, and (ii) in the first display mode (in which the number of tones that each pixel is capable of displaying is smaller than the predetermined number), that is, in the case where high-quality display is not necessarily required, interlace driving to be carried out for power consumption reduction.

As described above, the display device switches, depending on the number of tones that each pixel is capable of displaying, between an interlace driving method and a progressive driving method. This arrangement allows the display device to (i) carry out display with high quality in the case where it is required to carry out high-quality display and (ii) reduce power consumption in the case where it is not necessarily required to carry out high-quality display.

In the case where, for instance, the predetermined number is 3, the number of tones that each pixel is capable of displaying in the first display mode is 2. Thus, in this case, each pixel displays either of tone 0 and tone 1. Similarly, in the case where the predetermined number is 5, each pixel displays one of tone 0, tone 1, tone 2, and tone 3.

The present invention is not limited to the description of the embodiments above, and can be modified in numerous ways by a skilled person as long as such modification falls within the scope of the claims. An embodiment derived from a proper combination of technical means disclosed in different embodiments is also encompassed in the technical scope of the present invention.

INDUSTRIAL APPLICABILITY

A display device of the present invention can be suitably applied to television receivers, personal computers, car navigation systems, portable phones, smartphones, digital cameras, digital video cameras, etc.

REFERENCE SIGNS LIST

1 liquid crystal display device (display device)
2 display panel (liquid crystal display panel)
4 timing controller (controlling means)
6 scan line driving circuit (gate line driving circuit)
8 signal line driving circuit (data line driving circuit)
10 common electrode driving circuit
13 power supply generation circuit

The invention claimed is:
1. A display device comprising:
a display panel including:
  a plurality of gate lines;
  a plurality of data lines provided so as to intersect the plurality of gate lines; and
  a plurality of pixels provided so as to correspond to intersections of the plurality of gate lines and the plurality of data lines;
a gate line driving circuit for supplying a gate signal to the plurality of gate lines;
a data line driving circuit for supplying a data signal to the plurality of data lines; and
controlling means for controlling the gate signal and the data signal,
the controlling means, (i) in a first display mode, in which a number of tones that each pixel is capable of displaying is smaller than a predetermined number of tones, controlling the gate signal and the data signal by an interlace driving method, by which a single frame includes a plurality of fields obtained by selecting every other gate line, and (ii) in a second display mode, in which the number of tones that each pixel is capable of displaying is greater than the predetermined number of tones, controlling the gate signal and the data signal by a progressive driving method, by which the plurality of gate lines are selected sequentially, and the predetermined number is three.

2. The display device according to claim 1, wherein:
the controlling means inverts, for each preset number of selected pixels in a direction along the plurality of gate lines and a direction along the plurality of data lines, a polarity of the data signal to be applied to selected pixels selected for a certain field; and
the controlling means inverts a polarity of the data signal to be applied to each selected pixel for the certain field with respect to a polarity of the data signal having been applied to said each selected pixel in a field for which said each selected pixel was selected and which is immediately previous to the certain field.

3. The display device according to claim 1 or 2, wherein:
each four of the plurality of pixels make up a picture element as a set; and
each picture element is made up of four pixels that respectively display three primary colors and a color obtained by combining at least two of the three primary colors.

4. The display device according to claim 3, wherein:
said each picture element is made up of four pixels including (i) two pixels present along the plurality of gate lines and (ii) two pixels present along the plurality of data lines.

5. The display device according to claim 3, wherein:
said each picture element is made up of four pixels present along the plurality of gate lines.

6. The display device according to claim 1 or 2, wherein:
each three of the plurality of pixels make up a picture element as a set; and
each picture element is made up of three pixels that respectively display three primary colors.

7. The display device according to claim 6, wherein:
said picture element is made up of three pixels present along the plurality of gate lines.

8. The display device according to claim 6, wherein:
each picture element is made up of three pixels present along the plurality of data lines.

9. The display device according to claim 1, wherein:
the data line driving circuit supplies the data signal such that the data signal has a polarity which is inverted for each m pixels (where m is an integer of 1 or greater), among the plurality of pixels, that display an identical color and that are closest to each other in a column direction and which is inverted for each set of pixels, among the plurality of pixels, that display an identical color and that are closest to each other in a row direction.

10. The display device according to claim 1, wherein:

the data line driving circuit supplies the data signal having a polarity inverted for each set of pixels, among the plurality of pixels, that display an identical color and that are closest to each other in a column direction and a row direction.

11. The display device according to claim 1, wherein:

the data line driving circuit supplies the data signal such that the data signal has a polarity which is inverted for each two pixels, among the plurality of pixels, that display an identical color and that are closest to each other in a column direction and which is inverted for each set of pixels, among the plurality of pixels, that display an identical color and that are closest to each other in a row direction.

12. The display device according to claim 1, wherein:

the display panel includes a switching element having a semiconductor layer made of an oxide semiconductor.

13. The display device according to claim 12, wherein:

the oxide semiconductor is InGaZnOx.

14. The display device according to claim 1, wherein:

the display device is a liquid crystal display device.

15. A driving device for driving a display panel including a plurality of gate lines, a plurality of data lines provided so as to intersect the plurality of gate lines, and a plurality of pixels provided so as to correspond to intersections of the plurality of gate lines and the plurality of data lines, the driving device comprising:

a gate line driving circuit for supplying a gate signal to the plurality of gate lines;

a data line driving circuit for supplying a data signal to the plurality of data lines; and controlling means for controlling the gate signal and the data signal, the controlling means, (i) in a first display mode, in which a number of tones that each pixel is capable of displaying is smaller than a predetermined number of tones, controlling the gate signal and the data signal by an interlace driving method, by which a single frame includes a plurality of fields obtained by selecting every other gate line, and (ii) in a second display mode, in which the number of tones that each pixel is capable of displaying is greater than the predetermined number of tones, controlling the gate signal and the data signal by a progressive driving method, by which the plurality of gate lines are selected sequentially, and the predetermined number is three.

16. A driving method for driving a display panel including a plurality of gate lines, a plurality of data lines provided so as to intersect the plurality of gate lines, and a plurality of pixels provided so as to correspond to intersections of the plurality of gate lines and the plurality of data lines, the driving method comprising the step of:

carrying out, (i) in a first display mode, in which a number of tones that each pixel is capable of displaying is smaller than a predetermined number of tones, control by an interlace driving method, by which a single frame includes a plurality of fields obtained by selecting every other gate line, and (ii) in a second display mode, in which the number of tones that each pixel is capable of displaying is greater than the predetermined number of tones, control by a progressive driving method, by which the plurality of gate lines are selected sequentially, and the predetermined number is three.

* * * * *